(12) United States Patent
Ichino et al.

(10) Patent No.: US 11,905,348 B2
(45) Date of Patent: Feb. 20, 2024

(54) ETHYLENE/ALPHA-OLEFIN/NON-CONJUGATED POLYENE COPOLYMER, METHOD FOR PRODUCING THE SAME, AND USE THEREOF

(71) Applicant: MITSUI CHEMICALS, INC., Tokyo (JP)

(72) Inventors: Kotaro Ichino, Ichihara (JP); Yoshiharu Kikuchi, Sodegaura (JP); Keisuke Shishido, Ichikawa (JP); Junpei Tanaka, Sodegaura (JP); Mitsunao Arino, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 733 days.

(21) Appl. No.: 16/979,998

(22) PCT Filed: Mar. 20, 2018

(86) PCT No.: PCT/JP2018/010951
§ 371 (c)(1),
(2) Date: Sep. 11, 2020

(87) PCT Pub. No.: WO2019/180802
PCT Pub. Date: Sep. 26, 2019

(65) Prior Publication Data
US 2021/0009730 A1 Jan. 14, 2021

(51) Int. Cl.
*C08F 210/18* (2006.01)
*B60C 1/00* (2006.01)
*C08F 4/6592* (2006.01)
*C08K 3/36* (2006.01)
*C08L 9/06* (2006.01)
*C08L 23/16* (2006.01)

(52) U.S. Cl.
CPC .......... *C08F 210/18* (2013.01); *B60C 1/0008* (2013.01); *B60C 1/0016* (2013.01); *B60C 1/0025* (2013.01); *C08F 4/6592* (2013.01); *C08K 3/36* (2013.01); *C08L 9/06* (2013.01); *C08L 23/16* (2013.01); *B60C 2001/005* (2013.01)

(58) Field of Classification Search
CPC .... C08F 210/18; C08F 4/6592; B60C 1/0008; B60C 1/0016; B60C 1/0025; B60C 2001/005; C08K 3/36; C08L 9/06; C08L 23/16
See application file for complete search history.

(56) References Cited

U.S. PATENT DOCUMENTS

| | | |
|---|---|---|
| 159,662 A | 2/1875 | Foss |
| 2,823,218 A | 2/1958 | Speier et al. |
| 2,970,150 A | 1/1961 | Bailey |
| 3,159,601 A | 12/1964 | Ashby |
| 3,516,946 A | 6/1970 | Modic |
| 3,775,452 A | 11/1973 | Karstedt |
| 3,814,780 A | 6/1974 | Woodhall |
| 4,078,131 A | 3/1978 | De Zarauz |
| 4,892,851 A | 1/1990 | Ewen et al. |
| 4,990,640 A | 2/1991 | Tsutsui et al. |
| 5,026,798 A | 6/1991 | Canich |
| 5,055,438 A | 10/1991 | Canich |
| 5,057,475 A | 10/1991 | Canich et al. |
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,198,401 A | 3/1993 | Turner et al. |
| 5,223,467 A | 6/1993 | Razavi |
| 5,223,468 A | 6/1993 | Razavi |

(Continued)

FOREIGN PATENT DOCUMENTS

| | | |
|---|---|---|
| EP | 0 235 381 A2 | 9/1987 |
| EP | 2 711 380 A1 | 3/2014 |

(Continued)

OTHER PUBLICATIONS

US 5,168,111 A, 12/1992, Canich (withdrawn)

(Continued)

*Primary Examiner* — Angela C Scott
(74) *Attorney, Agent, or Firm* — Foley & Lardner LLP

(57) ABSTRACT

An object of the present invention is to provide a novel ethylene/α-olefin/non-conjugated polyene copolymer containing a certain non-conjugated polyene such as VNB as a copolymerization component, having a low long-chain branching content, excellent in cure characteristics in the case of crosslinking by using peroxide, and having good processability. The ethylene/α-olefin/non-conjugated polyene copolymer according to the present invention has constitutional units derived from ethylene (A), an α-olefin (B) having 3 to 20 carbon atoms, and a non-conjugated polyene (C) having a total of two or more partial structures selected from the group consisting of the following general formulas (I) and (II) in a molecule, and satisfies certain requirements.

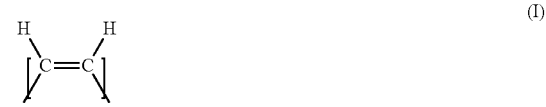

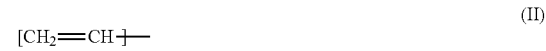

39 Claims, 1 Drawing Sheet

(56) References Cited

U.S. PATENT DOCUMENTS

| | | |
|---|---|---|
| 5,225,500 A | 7/1993 | Elder et al. |
| 5,227,440 A | 7/1993 | Canich et al. |
| 5,241,025 A | 8/1993 | Hlatky et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | Lapointe |
| 5,334,677 A | 8/1994 | Razavi et al. |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,547,675 A | 8/1996 | Canich |
| 5,561,092 A | 10/1996 | Ewen et al. |
| 5,589,556 A | 12/1996 | Razavi |
| 5,599,761 A | 2/1997 | Turner |
| 5,614,457 A | 3/1997 | Ewen et al. |
| 5,621,126 A | 4/1997 | Canich et al. |
| 5,631,391 A | 5/1997 | Canich |
| 5,663,249 A | 9/1997 | Ewen et al. |
| 5,723,560 A | 3/1998 | Canich |
| 5,763,549 A | 6/1998 | Elder et al. |
| 5,801,113 A | 9/1998 | Jejelowo et al. |
| 5,807,939 A | 9/1998 | Elder et al. |
| 5,883,202 A | 3/1999 | Ewen et al. |
| 6,121,395 A | 9/2000 | Turner |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| RE37,400 E | 10/2001 | Canich |
| 6,355,592 B1 | 3/2002 | Hlatky et al. |
| RE37,788 E | 7/2002 | Canich |
| 6,423,795 B1 | 7/2002 | Canich et al. |
| 6,617,466 B1 | 9/2003 | Canich |
| 6,632,898 B1 | 10/2003 | Canich |
| 6,939,928 B1 | 9/2005 | Kawai et al. |
| 7,041,841 B1 | 5/2006 | Canich |
| 7,163,907 B1 | 1/2007 | Canich et al. |
| 7,205,364 B1 | 4/2007 | Canich |
| 7,226,886 B2 | 6/2007 | Jayaratne et al. |
| 7,312,283 B2 | 12/2007 | Martin et al. |
| RE40,234 E | 4/2008 | Canich |
| 7,393,965 B2 | 7/2008 | Tohi et al. |
| 7,449,533 B2 | 11/2008 | Kawai et al. |
| 7,521,572 B2 | 4/2009 | Jayaratne et al. |
| 7,569,646 B1 | 8/2009 | Canich |
| 7,625,982 B2 | 12/2009 | Martin et al. |
| 7,741,419 B2 | 6/2010 | Tohi et al. |
| 7,829,645 B2 | 11/2010 | Windmuller et al. |
| 7,910,763 B2 | 3/2011 | Jayaratne et al. |
| RE42,957 E | 11/2011 | Ewen et al. |
| 8,124,707 B2 | 2/2012 | Windmuller et al. |
| 8,318,873 B2 | 11/2012 | Jayaratne et al. |
| 8,507,621 B2 | 8/2013 | Jayaratne et al. |
| 9,382,356 B2 | 7/2016 | Tohi et al. |
| 10,131,726 B2 | 11/2018 | Ichino et al. |
| 10,435,494 B2 | 10/2019 | Ichino et al. |
| 2005/0228155 A1 | 10/2005 | Kawai et al. |
| 2006/0161013 A1 | 7/2006 | Tohi et al. |
| 2006/0178491 A1 | 8/2006 | Canich |
| 2006/0205900 A1 | 9/2006 | Windmuller et al. |
| 2006/0270812 A1 | 11/2006 | Tohi et al. |
| 2007/0043176 A1 | 2/2007 | Martin et al. |
| 2007/0043182 A1 | 2/2007 | Martin et al. |
| 2007/0060722 A1 | 3/2007 | Jayaratne et al. |
| 2007/0219320 A1 | 9/2007 | Ichino et al. |
| 2008/0004460 A1 | 1/2008 | Jayaratne et al. |
| 2008/0188621 A1 | 8/2008 | Ichino et al. |
| 2008/0220193 A1 | 9/2008 | Tohi et al. |
| 2009/0198078 A1 | 8/2009 | Jayaratne et al. |
| 2009/0209672 A1 | 8/2009 | Ebata et al. |
| 2011/0021732 A1 | 1/2011 | Windmuller et al. |
| 2011/0190460 A1 | 8/2011 | Jayaratne et al. |
| 2013/0053523 A1 | 2/2013 | Jayaratne et al. |
| 2016/0280819 A1 | 9/2016 | Tohi et al. |
| 2016/0355622 A1 | 12/2016 | Ichino et al. |
| 2018/0244896 A1 | 8/2018 | Ichino et al. |
| 2018/0319917 A1 | 11/2018 | Ichino et al. |

FOREIGN PATENT DOCUMENTS

| | | |
|---|---|---|
| JP | S52-032093 | 3/1977 |
| JP | S62-121711 A | 6/1987 |
| JP | S62-138509 | 6/1987 |
| JP | H01-501950 A | 7/1989 |
| JP | H01-502036 A | 7/1989 |
| JP | H02-078687 A | 3/1990 |
| JP | H03-179005 A | 8/1991 |
| JP | H03-179006 A | 8/1991 |
| JP | H03-207703 A | 9/1991 |
| JP | H03-207704 A | 9/1991 |
| JP | 2000-212194 A | 8/2000 |
| JP | 2001-023025 A | 1/2001 |
| JP | 3506548 B2 | 3/2004 |
| JP | 2004-168744 A | 6/2004 |
| JP | 2004-175759 A | 6/2004 |
| JP | 2007-521371 A | 8/2007 |
| JP | 2009-504901 | 2/2009 |
| JP | 2011-231260 | 11/2011 |
| JP | 2019-059894 A | 4/2019 |
| KR | 20000005326 A | 11/2005 |
| WO | WO-01/27124 A1 | 4/2001 |
| WO | WO-2005/100410 A1 | 10/2005 |
| WO | WO-2005/105912 A | 11/2005 |
| WO | WO-2005/105913 A1 | 11/2005 |
| WO | WO-2006/123759 A1 | 11/2006 |
| WO | WO-2009/081792 A1 | 2/2009 |
| WO | WO-2009/072503 A1 | 6/2009 |
| WO | WO-2009/081794 A1 | 7/2009 |
| WO | WO-2015/122495 A1 | 8/2015 |
| WO | WO-2016/158661 A1 | 10/2016 |

OTHER PUBLICATIONS

International Searching Authority, "International Search Report," issued in connection with International Patent Application No. PCT/JP2018/010951, dated Jun. 12, 2018.

International Searching Authority, "Written Opinion," issued in connection with International Patent Application No. PCT/JP2018/010951, dated Jun. 12, 2018.

Journal of Organometallic Chemistry, vol. 509, No. 1, 1996, p. 63.

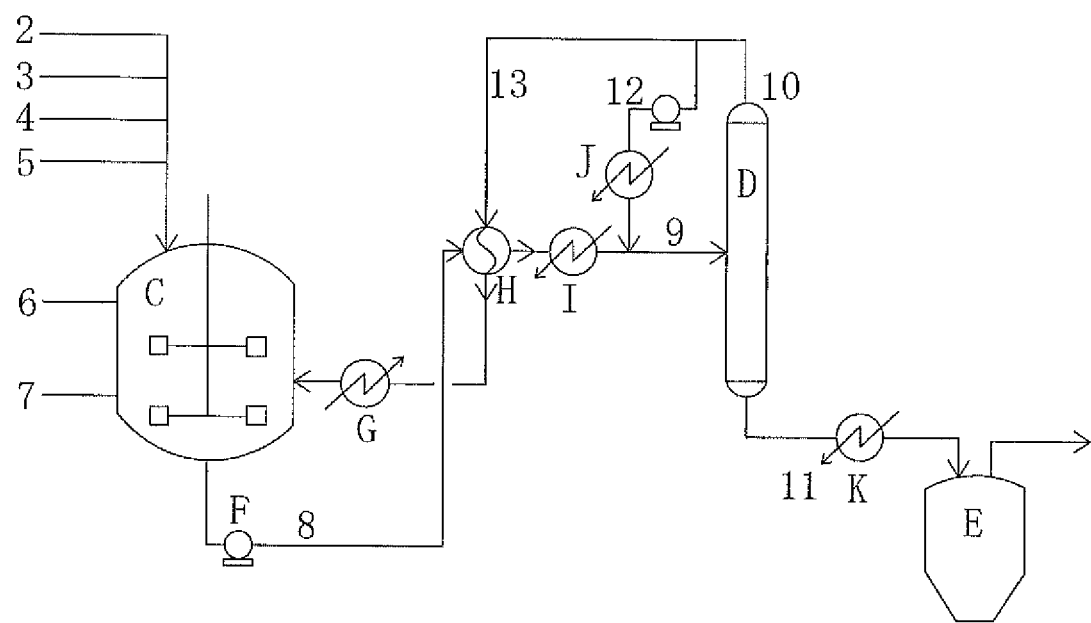

ETHYLENE/ALPHA-OLEFIN/NON-CONJUGATED POLYENE COPOLYMER, METHOD FOR PRODUCING THE SAME, AND USE THEREOF

CROSS-REFERENCE TO RELATED APPLICATIONS

The present application claims priority under 37 U.S.C. § 371 to International Patent Application No. PCT/JP2018/010951, filed Mar. 20, 2018. The content of this application is hereby incorporated by reference in its entirety.

TECHNICAL FIELD

The present invention relates to a new ethylene/α-olefin/non-conjugated polyene copolymer, a method for producing the ethylene/α-olefin/non-conjugated polyene copolymer, and use thereof.

BACKGROUND ART

Ethylene/α-olefin-based rubbers represented by ethylene/propylene/non-conjugated diene copolymer rubber (EPDM) have no unsaturated bond in the main chain of the molecular structure thereof and hence exhibit excellent heat resistance and weather resistance as compared with general-purpose conjugated diene-based rubbers, and have been widely used in applications such as automobile components, wire materials, construction and civil engineering materials, industrial materials and components, and modifiers for various resins.

It is known, when ethylene/α-olefin-based rubbers are crosslinked by using peroxide, and in particular, when they contain a non-conjugated polyene such as 5-vinyl-2-norbornene (hereinafter referred to as "VNB") as a copolymerization component, they exhibit a high crosslinking rate.

However, ternary copolymers of ethylene/α-olefin/VNB produced by using existing catalysts have many long-chain branches derived from terminal vinyl groups of VNB. In this case, since many terminal vinyl groups of VNB in the copolymers are consumed, the effect of improving the crosslinking rate is insufficient, and furthermore, long-chain branches could reduce the processability during molding or physical properties after processing in some cases. Such long-chain branches occur when vanadium-based catalysts are used, and in particular, the long-chain branching content tends to increase when metallocene-based catalysts are used for polymerization.

Patent Literature 1 and Patent Literature 2 disclose an ethylene-based copolymer containing constitutional units derived from ethylene, α-olefin, and VNB, polymerized by using metallocene-based catalysts, and Patent Literature 1 discloses that the copolymer is suitable for foam molding, whereas Patent Literature 2 discloses that a rubber molded body being excellent in surface appearance, strength characteristics, heat aging resistance, and light resistance, and having a low compression set can be molded. However, the ethylene-based copolymers obtained by using these techniques have a high long-chain branching content.

Patent Literature 3 discloses a method for producing a polymer containing monomer units of ethylene, α-olefin, VNB, and 5-ethylidene-2-norbornene (ENB) by using a compound of a Group 4 metal having a single cyclopentadienyl ligand and a monosubstituted nitrogen ligand, aluminoxane, and a catalyst activator, as a catalyst system, and also discloses the production of an EPDM polymer having a high VNB content and a low degree of branching. However, the EPDM polymer disclosed in Patent Literature 3 has a problem in that the molded article obtained by using thereof does not have enough heat aging resistance due to too many dienes per molecule in the copolymer.

In such a situation, there has been desired development of a novel ethylene/α-olefin-based rubber containing a non-conjugated polyene such as VNB as a copolymerization component and having a small long-chain branching content.

Styrene butadiene rubber (SBR) is conventionally widely used in tire applications, for example, in automobiles. Diene-based rubbers such as styrene butadiene rubber have insufficient weather resistance in a single use thereof, and hence when they are used in applications used outdoors for a long period of time, for example, in tires, an amine-based age resistor or a paraffin-based wax is usually added thereto and used to improve the weather resistance. However, in diene-based rubber products in which an amine-based age resistor, a paraffin-based wax, or the like is blended, these components may bleed out to the surface thereof, and discoloration may occur on the surface thereof over time. In addition, deterioration of appearance such as discoloration or powdering due to bleed out is caused during the storage in the storefront, which may result in a decrease in the commercial value. For these reasons, the improvement of the weather resistance by rubber components themselves has been desired.

In order to solve such problems, studies have been made to improve the weather resistance by blending an ethylene/propylene/diene rubber (EPDM) into styrene butadiene rubber, but there has been a problem in that the styrene butadiene rubber and EPDM are likely to cause phase separation during thermal crosslinking, resulting in insufficient fatigue resistance.

The present applicant proposes a rubber composition containing a random copolymer rubber consisting of structural units derived from ethylene, α-olefin, a certain triene compound; a diene-based rubber, carbon black, and a vulcanizing agent (see Patent Literature 4). Since the ethylene/α-olefin/triene random copolymer rubber exhibits a high vulcanization rate similar to that of the diene-based rubber, this rubber composition is unlikely to cause phase separation with the diene-based rubber without compromising excellent mechanical strength characteristics originally possessed by the diene-based rubber, and is suitable for tire side-wall applications.

The present applicant has also found that a rubber composition obtained by mixing a composition containing a non-conjugated polyene-based copolymer having a structural unit derived from an α-olefin and a structural unit derived from a non-conjugated polyene, and a softener with a diene-based rubber is suitable for the formation of a tire excellent in braking performance and fuel consumption performance, and has proposed this composition (see Patent Literatures 5 and 6).

In recent years, the production of tires mainly adopts a step of forming a non-crosslinked composition containing a diene-based rubber such as styrene/butadiene-based rubber and natural rubber as the main component into a sheet-like shape, or the like, subsequently crosslinking only the surface with an electron beam to prevent sagging, and then assembling into a tire shape, followed by sulfur crosslinking.

Further, diene-based rubbers such as natural rubber (NR), styrene-butadiene rubber (SBR), and butadiene rubber (BR) are known as a rubber excellent in dynamic fatigue resistance and dynamic characteristics and used as a raw material rubber for automobile tires and anti-vibration rubber. However, the environment in which these rubber products are used has been greatly changed nowadays and the improvement in heat resistance and weather resistance of the rubber products is required. For example, automobile tire treads and tire side-walls are particularly required to have weather resistance. However, there has conventionally been no rubber that retains excellent mechanical characteristics, fatigue resistance, and dynamic characteristics, all of which are possessed by current diene-based rubbers, and also has good weather resistance.

For these reasons, various studies have been made on the blend type rubber composition of a diene-based rubber excellent in mechanical characteristics, dynamic fatigue resistance, and dynamic characteristics and an ethylene/α-olefin having 3 to 20 carbon atoms/non-conjugated polyene copolymer such as ethylene/propylene/non-conjugated diene copolymer rubber (EPDM) excellent in heat resistance and weather resistance. However, since the level of the dynamic characteristics of the ethylene/α-olefin having 3 to 20 carbon atoms/non-conjugated polyene copolymer and the level of the dynamic characteristics of the diene-based rubber are different with each other, the blend type rubber composition exhibiting uniform physical properties has not conventionally been obtained. Here, dynamic characteristics in automobile tires are related to whether the subject material deteriorates fuel economy or not, and the index thereof is expressed by the tan δ (loss tangent) value, and a lower tan δ value means more excellent dynamic characteristics.

On the other hand, regarding anti-vibration rubber products for automobiles, it becomes difficult for an anti-vibration rubber product based on natural rubber, which is the currently-used diene-based rubber, to achieve the fatigue resistance applicable to practical use with an increase of the temperature in engine rooms. Therefore, the development of a novel rubber material having not only excellent heat resistance, but also mechanical characteristics, dynamic characteristics, and fatigue resistance similar to or greater than those of diene-based rubbers is desired.

In general, the crosslinking density needs to be increased in order to improve the dynamic characteristics. However, when it is intended to make the dynamic characteristics of the ethylene/α-olefin having 3 to 20 carbon atoms/non-conjugated polyene copolymer similar to the dynamic characteristics of diene-based rubbers such as NR by using existing techniques, the crosslinking density becomes too high, resulting in deterioration of mechanical characteristics such as tensile fracture elongation and making it difficult to achieve both dynamic characteristics and mechanical characteristics.

In addition, in order to improve anti-vibration characteristics, that is, to reduce the dynamic magnification in an anti-vibration rubber made of an ethylene/α-olefin/non-conjugated polyene copolymer, it has been thought to be effective to use a copolymer having a high molecular weight, to suppress the amount of filler used, and to increase the crosslinking density, and various methods for achieving them has been studied.

However, there has been a problem in that the ethylene/α-olefin/non-conjugated polyene copolymer with a high molecular weight is difficult to be kneaded because of the high viscosity of the polymer itself. In order to improve anti-vibration characteristics, the crosslinking density needs to be increased as aforementioned, but there has been also a problem in that this may reduce mechanical properties such as elongation. Among anti-vibration rubber products, anti-vibration rubbers for automobiles, in particular, those used in applications such as muffler hanger need to have particularly high heat resistance.

In such a situation, the present applicant proposes an ethylene/α-olefin/non-conjugated polyene copolymer containing a certain non-conjugated polyene such as VNB as a copolymerization component, having a low long-chain branching content, and excellent in cure characteristics in the case of crosslinking with a peroxide; a crosslinked molded article made of the copolymer, the molded article having an improved weather resistance of the rubber components such as styrene/butadiene-based rubber and natural rubber without causing phase separation during production, being prevented from deterioration of the appearance, and being excellent in weather resistance; and a resin composition containing the copolymer suitable for the production of the anti-vibration rubber product, the resin composition having a crosslinking density easy to be increased, excellent anti-vibration characteristics, elongation properties unlikely to deteriorate in the case of increasing the crosslinking density, sufficient strength even with a molecular weight within a range for easy kneading, and excellent heat resistance (see Patent Literature 7).

However, since the ethylene/α-olefin/non-conjugated polyene copolymer obtained in Patent Literature 7 has a low molecular weight distribution (Mw/Mn) of about 2, processability, and the like are not always sufficient. In the EPDM polymer, which contains a large amount of conventional low molecular weight components, the crosslinking density is reduced to cause problems such as stickiness.

CITATION LIST

Patent Literature

Patent Literature 1
Japanese Patent Laid-Open No. 2011-231260
Patent Literature 2
International Publication No. WO 2009/072503
Patent Literature 3
Japanese Translation of PCT International Application Publication No. 2007-521371
Patent Literature 4
Japanese Patent Laid-Open No. 2001-123025
Patent Literature 5
International Publication No. WO 2005/105912
Patent Literature 6
International Publication No. WO 2005/105913
Patent Literature 7
International Publication No. WO 2015/122495

SUMMARY OF INVENTION

Technical Problem

An object of the present invention is to provide a novel ethylene/α-olefin/non-conjugated polyene copolymer containing a certain non-conjugated polyene such as VNB as a copolymerization component, having a low long-chain branching content, excellent in cure characteristics in the case of crosslinking with a peroxide, and having good processability; a method for producing the ethylene/α-olefin/non-conjugated polyene copolymer, and use thereof.

Another object of the present invention is to provide a crosslinked molded article having an improved weather resistance of the rubber components such as styrene/butadiene-based rubber and natural rubber without causing phase separation during production, being prevented from deterioration of the appearance, and excellent in weather resistance.

Further, an object of the present invention is to provide a resin composition having a crosslinking density easy to be increased, excellent in anti-vibration characteristics, having elongation properties unlikely to deteriorate in the case of increasing the crosslinking density, able to provide sufficient strength even with a molecular weight within a range for easy kneading, excellent in heat resistance, and suitable for the production of the anti-vibration rubber product; and the anti-vibration rubber product.

Solution to Problem

As a result of intensive studies to solve the above problems, the present inventors have found that an ethylene/α-olefin/non-conjugated polyene copolymer obtained by carrying out the copolymerization under special conditions with the use of a certain catalyst has a wide molecular weight distribution exhibiting bimodality, contains a constitutional unit derived from a certain non-conjugated polyene such as VNB, has a low long-chain branching content, can be crosslinked by a peroxide at a high rate, has good processability, and is excellent in characteristics after crosslinking; and thus have completed the present invention.

The present inventors have also found that a crosslinked molded article obtained by crosslinking a composition containing the above ethylene/α-olefin/non-conjugated polyene copolymer and a rubber component such as diene-based rubber can be obtained without causing phase separation during production, in particular, during crosslinking, and is also excellent in weather resistance, and thus have completed the present invention.

The ethylene/α-olefin/non-conjugated polyene copolymer according to the present invention has constitutional units derived from ethylene (A), an α-olefin (B) having 3 to 20 carbon atoms, and a non-conjugated polyene (C) having a total of two or more partial structures selected from the group consisting of the following general formulas (I) and (II) in a molecule, and satisfying the following requirements (i) to (vii).

[Chem. 1]

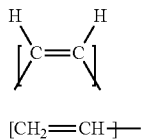

(i) A molar ratio of ethylene/α-olefin is 40/60 to 99.9/0.1.
(ii) A weight fraction of the constitutional unit derived from the non-conjugated polyene (C) is 0.07 wt % to 10 wt % per 100 wt % of the ethylene/α-olefin/non-conjugated polyene copolymer.
(iii) A weight average molecular weight (Mw) of the ethylene/α-olefin/non-conjugated polyene copolymer, a weight fraction of the constitutional unit derived from the non-conjugated polyene (C) (weight fraction of (C) (wt %)), and a molecular weight of the non-conjugated polyene (C) (molecular weight of (C)) satisfy the following expression (1).

$$4.5 \leq Mw \times \text{Weight fraction of } (C)/100/\text{Molecular weight of } (C) \leq 40 \qquad \text{Expression (1)}$$

(iv) A ratio $P(\eta^*_{(\omega=0.1)}/\eta^*_{(\omega=100)})$ of a complex viscosity $\eta^*_{(\omega=0.1)}$ at a frequency $\omega=0.1$ rad/s (Pa·sec) to a complex viscosity $\eta^*_{(\omega=100)}$ at a frequency $\omega=100$ rad/s (Pa·sec), both obtained from linear viscoelasticity measurement (190° C.) by using a rheometer, an intrinsic viscosity [η], and the weight fraction of the constitutional unit derived from the non-conjugated polyene (C) (weight fraction of (C)) satisfy the following expression (2).

$$P/([\eta]^{2.9}) \leq \text{Weight fraction of } (C) \times 6 \qquad \text{Expression (2)}$$

(v) A ratio of a weight average molecular weight (Mw) to a number average molecular weight (Mn) (molecular weight distribution; Mw/Mn) measured by gel permeation chromatography (GPC) is in the range of 8 to 30.
(vi) The number average molecular weight (Mn) is 30,000 or less.
(vii) Two or more peaks are shown in a chart obtained by GPC measurement and an area of the peak appearing on the side having the smallest molecular weight is 20% or less of the total peak area.

Advantageous Effects of Invention

The present invention can provide a novel ethylene/α-olefin/non-conjugated polyene copolymer containing a certain non-conjugated polyene such as VNB as a copolymerization component, having a low long-chain branching content, and excellent in cure characteristics in the case of crosslinking with a peroxide; a method for producing the ethylene/α-olefin/non-conjugated polyene copolymer, and use thereof.

The ethylene/α-olefin/non-conjugated polyene copolymer according to the present invention is excellent in moldability, crosslinking characteristics, cure characteristics, and processability, and the resulting molded article is well-balanced in physical properties such as mechanical characteristics and also excellent in heat aging resistance. In particular, the ethylene/α-olefin/non-conjugated polyene copolymer according to the present invention exhibits an unexpected significant effect that it has a high crosslinking density after crosslinking despite having good processability due to containing low molecular weight components.

The present invention can also provide a crosslinked molded article causing no phase separation, exhibiting excellent weather resistance even when used in applications exposed to outside air or daylight for a long period of time, and causing no worsening of the appearance due to bleed out, for example, of additives, and can provide a method for producing thereof. In addition, according to the method for producing a crosslinked molded article of the present invention, crosslinking by using a composition extremely excellent in crosslinkability enables to crosslink only by electron beam, so that crosslinking at high temperature for a long period of time can be avoided and the phase separation inside the crosslinked molded article can be prevented, and the resulting crosslinked molded article is excellent in mechanical characteristics and surface properties, also excellent in weather resistance, and suitably used in applications requiring weather resistance such as applications for tire members and applications for materials for covering wires.

Further, the present invention can provide a molded article having a crosslinking density easy to be increased, elongation properties unlikely to decrease even in the case of increasing the crosslinking density, and sufficient strength and heat resistance even with a molecular weight within a range for easy kneading, so that a resin composition suitable for the production of the anti-vibration rubber product can is provided. That is, the present invention can provide a resin composition and an anti-vibration rubber product, which have a noticeable effect capable of achieving both anti-vibration characteristics and heat aging resistance at the same time, and well-balanced in kneadability and mechanical characteristics such as anti-vibration characteristics and elongation. In addition, the anti-vibration rubber product of the present invention has good rubber properties, excellent in anti-vibration characteristics, excellent in heat resistance, and suitably used for the anti-vibration rubber products for automobiles, in particular, in applications requiring a high heat resistance such as muffler hanger.

BRIEF DESCRIPTION OF DRAWING

The Figure is a schematic diagram of a continuous polymerization apparatus used in Examples.

DESCRIPTION OF EMBODIMENTS

Hereafter, the present invention will be described in detail.

[Ethylene/α-Olefin/Non-Conjugated Polyene Copolymer]

The ethylene/α-olefin/non-conjugated polyene copolymer of the present invention (ethylene/α-olefin/non-conjugated polyene copolymer (S)) has constitutional units derived from ethylene (A), an α-olefin (B) having 3 to 20 carbon atoms, and a non-conjugated polyene (C) having a total of two or more partial structures selected from the group consisting of the following general formulas (I) and (II) in a molecule.

[Chem. 2]

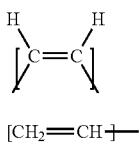

Examples of the α-olefin (B) having 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among these, α-olefins having 3 to 8 carbon atoms such as propylene, 1-butene, 1-hexene, and 1-octene are preferable, and propylene is particularly preferable. Such α-olefins are preferable because they have relatively low raw material costs, the resulting ethylene/α-olefin/non-conjugated polyene copolymer exhibits excellent mechanical nature, and furthermore, a molded article having rubber elasticity can be obtained. These α-olefins may be used singly or in combination of two or more kinds thereof.

That is, the ethylene/α-olefin/non-conjugated polyene copolymer of the present invention contains at least one constitutional unit derived from the α-olefin (B) having 3 to 20 carbon atoms, and may contain constitutional units derived from two or more α-olefins (B) having 3 to 20 carbon atoms.

Examples of the non-conjugated polyene (C) having a total of two or more partial structures selected from the group consisting of the above general formulas (I) and (II) in a molecule include 5-vinyl-2-norbornene (VNB), norbornadiene, 1,4-hexadiene, and dicyclopentadiene. Among these, the non-conjugated polyene (C) preferably contains VNB, and the non-conjugated polyene (C) is more preferably VNB because of its easy availability, its good crosslinking reactivity with a peroxide during crosslinking reaction after polymerization, and easy improvement in thermal resistance of its polymerized composition. The non-conjugated polyene (C) may be used singly or in combination of two or more kinds thereof.

The ethylene/α-olefin/non-conjugated polyene copolymer of the present invention may further contain, in addition to the constitutional units derived from the ethylene (A), the α-olefin (B) having 3 to 20 carbon atoms, and the non-conjugated polyene (C), a constitutional unit derived from a non-conjugated polyene (D) having only one partial structure selected from the group consisting of the general formulas (I) and (II) in a molecule. The non-conjugated polyene (D) may be used singly or in combination of two or more kinds thereof.

Examples of such a non-conjugated polyene (D) include 5-ethylidene-2-norbornene (ENB), 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, and 5-(1, 2,3-trimethyl-4-pentenyl)-2-norbornene. Among these, ENB is preferable because of its easy availability, a high reactivity with sulfur or a vulcanizing accelerator during crosslinking reaction after polymerization, easy control of the crosslinking rate, and easy availability of good mechanical properties.

When the ethylene/α-olefin/non-conjugated polyene copolymer of the present invention contains a constitutional unit derived from the non-conjugated polyene (D) having only one partial structure selected from the group consisting of the general formulas (I) and (II) in a molecule, its ratio is not particularly limited within a range that does not impair the object of the present invention, and the constitutional unit is usually contained in a weight fraction of 0 to 20 wt %, preferably 0 to 8 wt %, more preferably 0.01 to 8 wt % (provided that the sum of the weight fractions of (A), (B), (C), and (D) is 100 wt %).

As described above, the ethylene/α-olefin/non-conjugated polyene copolymer of the present invention is a copolymer having constitutional units derived from the ethylene (A), the α-olefin (B) having 3 to 20 carbon atoms, the above non-conjugated polyene (C), and if necessary, the above non-conjugated polyene (D), and satisfying the following requirements (i) to (vii).

(i) A molar ratio of ethylene/α-olefin is 40/60 to 99.9/0.1.
(ii) A weight fraction of the constitutional unit derived from the non-conjugated polyene (C) is 0.07 wt % to 10 wt %.
(iii) A weight average molecular weight (Mw) of the ethylene/α-olefin/non-conjugated polyene copolymer, a weight fraction of the constitutional unit derived from the non-conjugated polyene (C) (weight fraction of (C)

(wt %)), and a molecular weight of the non-conjugated polyene (C) (molecular weight of (C)) satisfy the following expression (1).

$$4.5 \leq Mw \times \text{Weight fraction of } (C)/100/\text{Molecular weight of } (C) \leq 40 \quad \text{Expression (1)}$$

(iv) A ratio $P(\eta^*(\omega_{=0.1})/\eta^*(\omega_{=100}))$ of a complex viscosity $\eta^*(\omega_{=0.1})$ at a frequency $\omega=0.1$ rad/s (Pa·sec) to a complex viscosity $\eta^*(\omega_{=100})$ at a frequency $\omega=100$ rad/s (Pa·sec), both obtained from linear viscoelasticity measurement (190° C.) by using a rheometer, an intrinsic viscosity [$\eta$], and the weight fraction of the constitutional unit derived from the non-conjugated polyene (C) (weight fraction of (C)) satisfy the following expression (2).

$$P/([\eta]^{2.9}) \leq \text{Weight fraction of } (C) \times 6 \quad \text{Expression (2)}$$

(v) A ratio of a weight average molecular weight (Mw) to a number average molecular weight (Mn) (molecular weight distribution; Mw/Mn) measured by gel permeation chromatography (GPC) is in the range of 8 to 30.
(vi) The number average molecular weight (Mn) is 30,000 or less.
(vii) Two or more peaks are shown in a chart obtained by GPC measurement and an area of the peak appearing on the side having the smallest molecular weight is 20% or less of the total peak area.

As used herein, the "α-olefin having 3 to 20 carbon atoms" is simply referred to as the "α-olefin".

<Requirement (i)>

The requirement (i) specifies that the molar ratio of ethylene/α-olefin in the ethylene/α-olefin/non-conjugated polyene copolymer of the present invention satisfies 40/60 to 99.9/0.1, and this molar ratio is preferably 50/50 to 90/10, more preferably 55/45 to 85/15, further preferably 55/45 to 78/22. When such an ethylene/α-olefin/non-conjugated polyene copolymer of the present invention is used as a raw material for a crosslinked molded article, it is preferable that the resulting crosslinked molded article exhibits excellent rubber elasticity and excellent mechanical strength and flexibility.

The amount of ethylene (the content of the constitutional unit derived from the ethylene (A)) and the amount of α-olefin (the content of the constitutional unit derived from the α-olefin(B)) in the ethylene/α-olefin/non-conjugated polyene copolymer can be determined by $^{13}$C-NMR.

<Requirement (ii)>

The requirement (ii) specifies that the weight fraction of the constitutional unit derived from the non-conjugated polyene (C) in the ethylene/α-olefin/non-conjugated polyene copolymer of the present invention is in the range of 0.07 wt % to 10 wt % in 100 wt % of the ethylene/α-olefin/non-conjugated polyene copolymer (that is, 100 wt % in total of the weight fractions of all the constitutional units). This weight fraction of the constitutional unit derived from the non-conjugated polyene (C) is preferably 0.1 wt % to 8.0 wt %, more preferably 0.5 wt % to 5.0 wt %.

It is preferable because when the ethylene/α-olefin/non-conjugated polyene copolymer of the present invention satisfies the requirement (ii), the ethylene/α-olefin/non-conjugated polyene copolymer of the present invention has sufficient hardness and exhibits excellent mechanical characteristics, and when it is crosslinked by using peroxide, the ethylene/α-olefin/non-conjugated polyene copolymer of the present invention becomes suitable for the production of the crosslinked molded article due to its high crosslinking rate.

The amount of the non-conjugated polyene (C) (the content of the constitutional unit derived from the non-conjugated polyene (C)) in the ethylene/α-olefin/non-conjugated polyene copolymer can be determined by $^{13}$C-NMR.

<Requirement (iii)>

The requirement (iii) specifies that the weight average molecular weight (Mw) of the ethylene/α-olefin/non-conjugated polyene copolymer, the weight fraction of the constitutional unit derived from the non-conjugated polyene (C) in the copolymer (weight fraction of (C): wt %), and the molecular weight of the non-conjugated polyene (C) (molecular weight of (C)) satisfies the following relational expression (1) in the ethylene/α-olefin/non-conjugated polyene copolymer of the present invention.

$$4.5 \leq Mw \times \text{Weight fraction of } (C)/100/\text{Molecular weight of } (C) \leq 40 \quad \text{Expression (1)}$$

It is preferable because when the ethylene/α-olefin/non-conjugated polyene copolymer of the present invention satisfies the requirement (iii), the content of the structural unit derived from the non-conjugated polyene (C) such as VNB is appropriate and exhibits a sufficient crosslinking performance, and when a crosslinked molded article is produced by using the ethylene/α-olefin/non-conjugated polyene copolymer of the present invention, the crosslinking rate is excellent and the molded article after crosslinking exhibits excellent mechanical characteristics.

It is desirable that the ethylene/α-olefin/non-conjugated polyene copolymer of the present invention more preferably satisfies the following relational expression (1').

$$4.5 \leq Mw \times \text{Weight fraction of } (C)/100/\text{Molecular weight of } (C) \leq 35 \quad \text{Expression (1')}$$

The weight average molecular weight (Mw) of the ethylene/α-olefin/non-conjugated polyene copolymer can be determined as a numerical value in terms of polystyrene, which is measured by gel permeation chromatography (GPC).

When "Mw×weight fraction of (C)/100/molecular weight of (C)" satisfies the aforementioned expression (1) or (1'), the ethylene/α-olefin/non-conjugated polyene copolymer of the present invention has an appropriate degree of crosslinking, and use thereof enables to produce a molded article well-balanced in mechanical properties and heat aging resistance. When the "Mw×weight fraction of (C)/100/molecular weight of (C)" is too low, the crosslinkability may be insufficient and the crosslinking rate may be slowed, and when it is too high, excessive generation of crosslinking is caused, which may deteriorate mechanical properties.

<Requirement (iv)>

The requirement (iv) specifies that the ratio $P(\eta^*(\omega_{=0.1})/\eta^*(\omega_{=100}))$ of the complex viscosity $\eta^*(\omega_{=0.1})$ at a frequency $\omega=0.1$ rad/s (Pa·sec) to the complex viscosity $\eta^*(\omega_{=100})$ at a frequency $\omega=100$ rad/s (Pa·sec), both obtained from linear viscoelasticity measurement (190° C.) by using a rheometer in the ethylene/α-olefin/non-conjugated polyene copolymer of the present invention, the intrinsic viscosity [$\eta$], and the weight fraction of the constitutional unit derived from the non-conjugated polyene (C) (weight fraction of (C): wt %) satisfies the following expression (2).

$$P/([\eta]^{2.9}) \leq \text{Weight fraction of } (C) \times 6 \quad \text{Expression (2)}$$

wherein the ratio $P(\eta^*(\omega_{=0.1})/\eta^*(\omega_{=100}))$ of the complex viscosity $\eta^*(\omega_{=0.1})$ at a frequency $\omega=0.1$ rad/s to the complex viscosity $\eta^*(\omega_{=100})$ at a frequency $\omega=100$ rad/s represents the frequency dependence of the viscosity, and $P/([\eta]^{2.9})$ which corresponds to the left side of the expression (2) tends to show higher values when there are a large number of long-chain branches, though short-chain branches or the molecular weight affects the values. In general, the ethylene/α-olefin/non-conjugated polyene copolymer containing a larger amount of the constitutional unit derived from the non-conjugated polyene tends to contain a large number of long-chain branches, but the ethylene/α-olefin/non-conjugated polyene copolymer of the present invention is considered to be able to satisfy the above expression (2) due to its fewer long-chain branches than the conventionally known ethylene/α-olefin/non-conjugated polyene copolymer. In the present invention, the P value is a ratio (η*ratio) determined based on the complex viscosity at 0.1 rad/s and the complex viscosity at 100 rad/s determined by using a viscoelasticity measuring apparatus Ares (manufactured by Rheometric Scientific) under measurement conditions of 190° C., at a strain of 1.0%, and at different frequencies.

The ethylene/α-olefin/non-conjugated polyene copolymer of the present invention preferably satisfies the following expression (2').

$$P/([\eta]^{2.9}) \leq \text{Weight fraction of } (C) \times 5.7 \qquad \text{Expression (2')}$$

The intrinsic viscosity [η] means a value measured in decalin at 135° C.

<Requirement (v)>

The requirement (v) specifies that in the ethylene/α-olefin/non-conjugated polyene copolymer of the present invention, a ratio of a weight average molecular weight (Mw) to a number average molecular weight (Mn) (molecular weight distribution; Mw/Mn) measured by gel permeation chromatography (GPC) is in the range of 8 to 30. This molecular weight distribution (Mw/Mn) is preferably in the range of 9 to 28, more preferably 10 to 26.

When the ethylene/α-olefin/non-conjugated polyene copolymer of the present invention satisfies the requirement (v), it contains low molecular weight components in appropriate amounts, resulting in good processability.

The weight average molecular weight (Mw) and the number average molecular weight of the ethylene/α-olefin/non-conjugated polyene copolymer can be determined as a numerical value in terms of polystyrene, which is measured by gel permeation chromatography (GPC).

<Requirement (vi)>

The requirement (vi) specifies that the number average molecular weight (Mn) of the ethylene/α-olefin/non-conjugated polyene copolymer of the present invention is 30,000 or less. The number average molecular weight (Mn) is preferably in the range of 3,000 to 26,000, more preferably 6,000 to 23,000.

When the ethylene/α-olefin/non-conjugated polyene copolymer of the present invention satisfies the requirement (vi), it contains low molecular weight components in appropriate amounts, resulting in good processability.

<Requirement (vii)>

The requirement (vii) specifies that two or more peaks are shown in a chart of the ethylene/α-olefin/non-conjugated polyene copolymer of the present invention obtained by GPC measurement, and an area of the peak appearing on the side having the smallest molecular weight is 20% or less of the total peak area. The area of the peak appearing on the side having the smallest molecular weight with respect to the total peak area is preferably 2 to 18%, more preferably 3 to 16%.

When the ethylene/α-olefin/non-conjugated polyene copolymer of the present invention satisfies the requirement (vii), the molecular weight distribution of the copolymer exhibits multimodality such as bimodality and contains high molecular weight components and low molecular weight components in appropriate amounts, resulting in good processability.

The ethylene/α-olefin/non-conjugated polyene copolymer of the present invention is preferable that the number of long-chain branches per 1000 carbon atoms ($LCB_{1000c}$) and the natural logarithm of the weight average molecular weight (Mw) [Ln(Mw)], obtained by using 3D-GPC, satisfy the following expression (3).

$$LCB_{1000c} \leq 1 - 0.07 \times Ln(Mw) \qquad \text{Expression (3)}$$

The above expression (3) specifies the upper limit value of the long-chain branching content per carbon units of the ethylene/α-olefin/non-conjugated polyene copolymer.

Such an ethylene/α-olefin/non-conjugated polyene copolymer is preferable because the ratio of the long-chain branch contained is low, it is excellent in cure characteristics in the case of crosslinking with a peroxide, and the molded article obtained by using thereof is excellent in heat aging resistance.

The ethylene/α-olefin/non-conjugated polyene copolymer of the present invention more preferably satisfies the following expression (3').

$$LCB_{1000c} \leq 1 - 0.071 \times Ln(Mw) \qquad \text{Expression (3')}$$

wherein Mw and the number of long-chain branches per 1000 carbon atoms ($LCB_{1000c}$) can be determined by a structural analysis using 3D-GPC. In the present description, they were specifically determined as follows.

By using a 3D-high temperature GPC apparatus PL-GPC 220 (manufactured by Polymer Laboratories, Ltd.), the absolute molecular weight distribution and simultaneously, the intrinsic viscosity was determined by a viscometer. The main measurement conditions are as follows.

Detector: differential refractometer/built in GPC apparatus

Two-angle light scattering detector, Model PD2040 (manufactured by Precison Detectors Inc.)

Bridge viscometer, Model PL-BV400 (manufactured by Polymer Laboratories, Ltd.)

Column: TSKgel GMHHR-H(S)HT×2+TSKgel GMHHR-M(S)×1 (each having internal diameter 7.8 mmφ×length 300 mm per column)

Temperature: 140° C.

Mobile phase: 1,2,4-trichlorobenzene (containing 0.025% BHT)

Injection volume: 0.5 mL

Sample concentration: ca 1.5 mg/mL

Sample filtration: filtered by a sintered filter with a pore diameter of 1.0 µm

The dn/dc value necessary for determining the absolute molecular weight is determined for respective samples from a dn/dc value of standard polystyrene (molecular weight 190000) of 0.053 and a response intensity of a differential refractometer per unit injection mass.

Based on a relationship between the intrinsic viscosity obtained by a viscometer and the absolute molecular weight obtained by a light scattering detector, the long-chain branching parameter g'i is calculated for respective eluting components from the expression (v-1).

[Math. 1]

$$g'^i = \frac{[\eta]^{i,br}}{[\eta]^{i,lin}} \qquad (v\text{-}1)$$

[η]i, br: Actual measured intrinsic viscosity of i-th sliced component

[η]i, Iin: Intrinsic viscosity in a case of assuming that i-th sliced component does not have a long-chain branching structure and only has a short-chain branching structure wherein relational expressions of [η]=KM$^v$; v=0.725 are applied. These expressions are called Mark-Houwink-Sakurada equation, and K represents a solvent constant, and M represents an average molecular weight.

In addition, each average value is calculated as g' by the following expressions (v-2), (v-3), and (v-4). Trendlines assumed to have only short-chain branches are determined for respective samples.

[Math. 2]

$$\text{Number average long-chain branching parameter } g'^m = \frac{\sum(C^i/M^i \times g'^i)}{\sum(C^i/M^i)} \quad (v\text{-}2)$$

$$\text{Weight average long-chain branching parameter } g'^w = \frac{\sum(C^i \times g'^i)}{\sum C^i} \quad (v\text{-}3)$$

$$z\text{-Average long-chain branching parameter } g'^z = \frac{\sum(C^i \times M^{i2} \times g'^i)}{\sum(C^i \times M^{i2})} \quad (v\text{-}4)$$

$C^i$: Concentration for respective eluting components
$M^i$: Absolute molecular weight for respective eluting components Further, g'w is used to calculate the number of branching points per molecular chain BrNo, the number of long-chain branches per 1000 carbons $LCB_{1000c}$, and the degree of branching per unit molecular weight λ are calculated. The Zimm-Stockmayer expression (v-5) is used to calculate BrNo and the expressions (v-6) and (v-7) are used to calculate $LCB_{1000c}$ and λ. The g represents a long-chain branching parameter determined based on the radius of gyration Rg and the following simple correlation between g and g' determined based on the intrinsic viscosity is made.

$$g = g'^{(1/\varepsilon)}$$

ε (structure factor)=0.5 to 1.5 (usually 0.75)
wherein various values are proposed for ε in accordance with the form of a molecule, but herein, ε=1 (that is, g'=g) is assumed for the calculation.

[Math. 3]

$$g'^w = \frac{1}{\sqrt{\sqrt{1 + BrNo/7} + 4 \times BrNo/9\pi}} \quad (V\text{-}5)$$

$$\lambda = BrNo/M \quad (V\text{-}6)$$

$$LCB_{1000C} = \lambda \times 14000 \quad (V\text{-}7)$$

wherein the value 14000 represents the molecular weight of 1000 methylene ($CH_2$) units.

The ethylene/α-olefin/non-conjugated polyene copolymer of the present invention preferably has an intrinsic viscosity [η] of 0.1 to 5 dL/g, more preferably 0.5 to 5.0 dL/g, further preferably 0.9 to 4.0 dL/g.

The weight average molecular weight (Mw) of the ethylene/α-olefin/non-conjugated polyene copolymer of the present invention is preferably 10,000 to 600,000, more preferably 30,000 to 500,000, further preferably 50,000 to 400,000.

The ethylene/α-olefin/non-conjugated polyene copolymer of the present invention preferably satisfies the above intrinsic viscosity [η] and the above weight average molecular weight (Mw).

According to the ethylene/α-olefin/non-conjugated polyene copolymer of the present invention, the non-conjugated polyene (C) preferably contains VNB, and the non-conjugated polyene (C) is more preferably VNB. That is, in the expression (1) and the expression (2) described above, and the expression (4) described later, the "weight fraction of (C)" is preferably the "weight fraction of VNB" (wt %).

The ethylene/α-olefin/non-conjugated polyene copolymer of the present invention preferably contains, in addition to the structural units derived from the above (A), (B), and (C) as described above, also the constitutional unit derived from the non-conjugated polyene (D) in a weight fraction of 0 wt % to 20 wt % (provided that the sum of the weight fractions of (A), (B), (C), and (D) is 100 wt %). In this case, the following requirement (viii) is preferably satisfied.

<Requirement (viii)>

The weight average molecular weight (Mw) of the ethylene/α-olefin/non-conjugated polyene copolymer, the weight fraction of the constitutional unit derived from the non-conjugated polyene (C) (weight fraction of (C) (wt %)), the weight fraction of the constitutional unit derived from the non-conjugated polyene (D) (weight fraction of (D) (wt %)), the molecular weight of the non-conjugated polyene (C) (molecular weight of (C)), and a molecular weight of the non-conjugated polyene (D) (molecular weight of (D)) satisfy the following expression (4).

4.5≤Mw×{(Weight fraction of(C)/100/Molecular weight of(C))+(Weight fraction of(D)/100/Molecular weight of (D))}≤45   Expression (4)

The expression (4) specifies the content of the non-conjugated diene in a molecule of the copolymer (the sum of (C) and (D)).

It is preferable because when the ethylene/α-olefin/non-conjugated polyene copolymer containing the structural unit derived from the above (D) satisfies the expression (4), the molded article obtained by the ethylene/α-olefin/non-conjugated polyene copolymer exhibits excellent mechanical properties and heat aging resistance.

When the requirement (viii) is not satisfied and "Mw×{(weight fraction of (C)/100/molecular weight of (C))+(weight fraction of (D)/100/molecular weight of (D))}" in the expression (4) is too low, that is, the content of the non-conjugated diene is too low, crosslinking may not be enough to obtain appropriate mechanical properties, and when the content of the non-conjugated diene is too high, crosslinking may be excessive, causing deterioration of mechanical properties or deterioration of heat aging resistance.

<Requirement (ix)>

The ethylene/α-olefin/non-conjugated polyene copolymer of the present invention is not particularly limited, and is preferable that a complex viscosity η*($\omega_{=0.01}$) at a frequency ω=0.01 rad/s (Pa·sec), a complex viscosity η*($\omega_{=10}$) at a frequency ω=10 rad/s (Pa·sec), both obtained from linear viscoelasticity measurement (190° C.) by using a rheometer, and an apparent iodine value derived from the non-conjugated polyene (C) satisfy the following expression (5).

Log{η*($\omega_{=0.01}$)}/Log{η*($\omega_{=10}$)}≤0.0753×{Apparent iodine value derived from non-conjugated polyene(C)}+1.42   Expression (5)

wherein the complex viscosity $\eta^*(\omega_{=0.01})$ and the complex viscosity $\eta(\omega_{=10})$ are determined in the same manner as the complex viscosity $\eta^*(\omega_{=0.1})$ and the complex viscosity $\eta^*(\omega_{=100})$ in the requirement (iv) except for the measurement frequencies.

The apparent iodine value derived from the non-conjugated polyene (C) is determined by the following expression.

Apparent iodine value derived from (C)=weight fraction of (C)×253.81/molecular weight of (C)

In the above expression (5), the left side represents the shear rate dependence which is an index of a long-chain branches, and the right side represents an index of the content of the non-conjugated polyene (C) which is not consumed as long-chain branches during polymerization. It is preferable because when the requirement (ix) is satisfied and the above expression (5) is also satisfied, the degree of long-chain branching is not too high. On the other hand, it is found when the above expression (5) is not satisfied, a large proportion of the copolymerized non-conjugated polyene (C) is consumed for the formation of long-chain branching.

The ethylene/α-olefin/non-conjugated polyene copolymer of the present invention preferably contains a sufficient amount of the constitutional unit derived from the non-conjugated polyene (C), and the weight fraction of the constitutional unit derived from the non-conjugated polyene (C) in the copolymer (weight fraction of (C) (wt %)) and the weight average molecular weight (Mw) of the copolymer preferably satisfy the following expression (6).

6−0.45×Ln(Mw)≤Weight fraction of (C)≤10        Expression (6)

The ethylene/α-olefin/non-conjugated polyene copolymer of the present invention preferably has the number of the constitutional unit ($n_C$) derived from the non-conjugated polyene (C) based on the weight average molecular weight (Mw) of 6 or more, more preferably 6 or more and 40 or less, further preferably 7 or more and 39 or less, and particularly preferably 10 or more and 38 or less.

The ethylene/α-olefin/non-conjugated polyene copolymer of the present invention as described above contains a sufficient amount of the constitutional unit derived from the non-conjugated polyene (C) such as VNB, has a low long-chain branching content, excellent cure characteristics in the case of crosslinking with a peroxide, good moldability and good processability, and is well-balanced in physical properties such as mechanical characteristics, and in particular, excellent in heat aging resistance. In particular, the ethylene/α-olefin/non-conjugated polyene copolymer according to the present invention exhibit an unexpected significant effect that it has a high crosslinking density after crosslinking despite having good processability due to containing low molecular weight components. Usually, a large amount of low molecular weight components tends to reduce the crosslinking density, but in the case of the ethylene/α-olefin/non-conjugated polyene copolymer according to the present invention, crosslinking of the low molecular weight components is presumed to provide such an unexpected significant effect. This provides an effect of eliminating the problem of stickiness, and the like which are common in EPDM containing a large amount of conventional low molecular weight components.

Further, it is desirable that the ethylene/α-olefin/non-conjugated polyene copolymer of the present invention preferably has the number of the constitutional unit ($n_D$) derived from the non-conjugated polyene (D) based on the weight average molecular weight (Mw) of 29 or less, more preferably 10 or less, further preferably less than 1.

Such an ethylene/α-olefin/non-conjugated polyene copolymer of the present invention is preferable because the content of the constitutional unit derived from the non-conjugated polyene (D) such as ENB is suppressed within a range that does not impair the object of the present invention, and because the copolymer is unlikely to cause post-crosslinking and has a sufficient heat aging resistance.

Here, the number of the constitutional unit ($n_C$) derived from the non-conjugated polyene (C) or the number of the constitutional unit ($n_D$) derived from the non-conjugated polyene (D) based on the weight average molecular weight (Mw) of the ethylene/α-olefin/non-conjugated polyene copolymer can be determined from the molecular weight of the non-conjugated polyene (C) or (D), the weight fraction of the constitutional unit derived from the non-conjugated polyene (C) or (D) in the copolymer (weight fraction of (C) or (D) (wt %)), and the weight average molecular weight (Mw) of the copolymer by the following expressions.

($n_C$)=(Mw)×{Weight fraction of(C)/100}/Molecular weight of non-conjugated polyene(C)

($n_D$)=(Mw)×{Weight fraction of(D)/100}/Molecular weight of non-conjugated polyene(D)

The ethylene/α-olefin/non-conjugated polyene copolymer of the present invention is preferable because when the numbers of the constitutional units ($n_C$) and ($n_D$) each derived from the non-conjugated polyenes (C) and (D) based on the weight average molecular weight (Mw) satisfy the above range, the ethylene/α-olefin/non-conjugated polyene copolymer has a low long-chain branching content, excellent cure characteristics in the case of crosslinking with a peroxide, good moldability and good processability, and is well-balanced in physical properties such as mechanical characteristics, unlikely to cause post-crosslinking, and in particular, excellent in heat aging resistance.

[Production of Ethylene/α-Olefin/Non-Conjugated Polyene Copolymer]

The ethylene/α-olefin/non-conjugated polyene copolymer of the present invention is a copolymer obtained by copolymerizing monomers consisting of ethylene (A), an α-olefin (B) having 3 to 20 carbon atoms, a non-conjugated polyene (C), and if necessary, a non-conjugated polyene (D).

The ethylene/α-olefin/non-conjugated polyene copolymer of the present invention may be prepared by using any method, as long as the requirements (i) to (vii) are satisfied, and one obtained by copolymerizing monomers in the presence of a metallocene compound is preferable, one obtained by copolymerizing monomers in the presence of a polymerization catalyst system containing a metallocene compound is more preferable, and one obtained by a method comprising (1) a step of carrying out the copolymerization in the presence of a polymerization catalyst containing a certain metallocene compound and (2) a step of adding an alcohol as a catalyst deactivator to deactivate the polymerization catalyst is further preferable.

<Metallocene Compound>

The ethylene/α-olefin/non-conjugated polyene copolymer of the present invention is desirably obtained by copolymerizing monomers in the presence of a polymerization catalyst system containing at least one metallocene compound selected from the compounds represented by the following general formula [A1]. When the copolymerization of the monomer is carried out by using a polymerization catalyst system containing such a metallocene compound, long-chain branches contained in the resulting copolymer are suppressed, so that the ethylene/α-olefin/non-conjugated polyene copolymer of the present invention satisfying the above requirements can be easily prepared.

[Chem. 3]

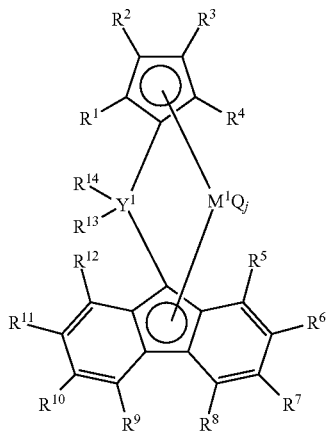

[A1]

wherein $R^1$, $R^2$, $R^3$, $R^4$, $R^5$, $R^8$, $R^9$, and $R^{12}$ each independently represent a hydrogen atom, a hydrocarbon group, a silicon-containing group, or a heteroatom-containing group other than the silicon-containing group, and any two adjacent groups of $R^1$ to $R^4$ may be bonded to each other to form a ring.

As the hydrocarbon group, a hydrocarbon group having 1 to 20 carbon atoms is preferable and specific examples thereof include an alkyl group having 1 to 20 carbon atoms, an arylalkyl group having 7 to 20 carbon atoms, an aryl group having 6 to 20 carbon atoms, and a substituted aryl group. Examples of thereof include a methyl group, an ethyl group, an n-propyl group, an isopropyl group, an allyl group, an n-butyl group, an isobutyl group, a sec-butyl group, a t-butyl group, an amyl group, an n-pentyl group, an neopentyl group, an n-hexyl group, an n-heptyl group, an n-octyl group, an n-nonyl group, an n-decanyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, a 1-methyl-1-isopropyl-2-methylpropyl group, a cyclopentyl group, a cyclohexyl group, a cycloheptyl group, a cyclooctyl group, an norbornyl group, an adamantyl group, a phenyl group, an o-tolyl group, an m-tolyl group, a p-tolyl group, a xylyl group, an isopropylphenyl group, a t-butylphenyl group, a naphthyl group, a biphenyl group, a terphenyl group, a phenanthryl group, an anthracenyl group, a benzyl group, and a cumyl group; and also include oxygen-containing groups such as a methoxy group, an ethoxy group, and a phenoxy group; nitrogen-containing groups such as a nitro group, a cyano group, an N-methylamino group, an N,N-dimethylamino group, and an N-phenylamino group; boron-containing groups such as a borantriyl group and diboranyl group; and sulfur-containing groups such as a sulfonyl group and sulfenyl group.

The above hydrocarbon groups may have a hydrogen atom substituted with a halogen atom and examples thereof include a trifluoromethyl group, a trifluoromethylphenyl group, a pentafluorophenyl group, and a chlorophenyl group.

Examples of the silicon-containing group include silyl groups, siloxy groups, hydrocarbon-substituted silyl groups, and hydrocarbon-substituted siloxy groups. Examples thereof include a methylsilyl group, a dimethylsilyl group, a trimethylsilyl group, an ethylsilyl group, a diethylsilyl group, a triethylsilyl group, a diphenylmethylsilyl group, a triphenylmethylsilyl group, a dimethylphenylsilyl group, a dimethyl-t-butylsilyl group, and a dimethyl(pentafluorophenyl)silyl group.

$R^6$ and $R^{11}$ are the same atom or the same group selected from a hydrogen atom, a hydrocarbon group, a silicon-containing group, and a heteroatom-containing group other than the silicon-containing group, and $R^7$ and $R^{10}$ are the same atom or the same group selected from a hydrogen atom, a hydrocarbon group, a silicon-containing group, and a heteroatom-containing group other than the silicon-containing group, and $R^6$ and $R^7$ may be bonded to each other to form a ring, and $R^{10}$ and $R^{11}$ may be bonded to each other to form a ring, provided that all of $R^6$, $R^7$, $R^{10}$, and $R^{11}$ are not a hydrogen atom.

$R^{13}$ and $R^{14}$ each independently represent an aryl group. $M^1$ represents a zirconium atom.
$Y^1$ represents a carbon atom or a silicon atom.
Q represents a halogen atom, a hydrocarbon group, a halogenated hydrocarbon group, a neutral conjugated or non-conjugated diene having 4 to 20 carbon atoms, an anionic ligand, or a neutral ligand capable of coordinating with a lone pair, j represents an integer of 1 to 4, and when j is an integer of 2 or more, each Q may be the same or different from each other.

Examples of the halogen atom include a fluorine atom, a chlorine atom, a bromine atom, and an iodine atom, and the chlorine atom is preferable.

As the hydrocarbon group, a hydrocarbon group having 1 to 10 carbon atoms is preferable, and specific examples thereof include a methyl group, an ethyl group, an n-propyl group, an isopropyl group, a 2-methylpropyl group, a 1,1-dimethylpropyl group, a 2,2-dimethylpropyl group, a 1,1-diethylpropyl group, a 1-ethyl-1-methylpropyl group, a 1,1,2,2-tetramethylpropyl group, a sec-butyl group, a t-butyl group, a 1,1-dimethylbutyl group, a 1,1,3-trimethylbutyl group, an neopentyl group, a cyclohexylmethyl group, a cyclohexyl group, a 1-methyl-1-cyclohexyl group, and a benzyl group; and a methyl group, an ethyl group, and a benzyl group are preferable.

As the neutral conjugated or non-conjugated diene having 4 to 20 carbon atoms, a neutral conjugated or non-conjugated diene having 4 to 10 carbon atoms is preferable. Specific examples of the neutral conjugated or non-conjugated diene include, s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Specific examples of the anionic ligand include, alkoxy groups such as methoxy, t-butoxy, and phenoxy groups; carboxylate groups such as acetate and benzoate; and sulfonate groups such as mesylate and tosylate.

Specific examples of the neutral ligand capable of coordinating with a lone pair include, organophosphorus compounds such as trimethylphosphine, triethylphosphine, triphenylphosphine, and diphenylmethylphosphine; or ethers such as tetrahydrofuran, diethyl ether, dioxane, and 1,2-dimethoxyethane.

Examples of the cyclopentadienyl groups having substituents $R^1$ to $R^4$ in the above formula [A1] include, but are not limited to, an unsubstituted cyclopentadienyl group in which $R^1$ to $R^4$ are a hydrogen atom; cyclopentadienyl groups monosubstituted at position 3 such as 3-t-butylcyclopentadienyl group, 3-methylcyclopentadienyl group, 3-trimethylsilylcyclopentadienyl group, 3-phenylcyclopentadienyl group, 3-adamantylcyclopentadienyl group, 3-amylcyclopentadienyl group, and 3-cyclohexylcyclopentadienyl group; cyclopentadienyl groups disubstituted at positions 3 and 5 such as 3-t-butyl-5-methylcyclopentadienyl group, 3-t-butyl-5-ethylcyclopentadienyl group, 3-phenyl-5-methylcyclopentadienyl group, 3,5-di-t-butylcyclopentadienyl group, 3,5-dimethylcyclopentadienyl group, 3-phenyl-5-methylcyclopentadienyl group, and 3-trimethylsilyl-5-methylcyclopentadienyl group. From the viewpoint of easiness to synthesize the metallocene compound, production costs, and the copolymerization ability for non-conjugated polyenes, the unsubstituted ($R^1$ to $R^4$ are a hydrogen atom) cyclopentadienyl group is preferable.

Examples of the fluorenyl groups having substituents $R^5$ to $R^{12}$ in the formula [A1] include, but are not limited to, an unsubstituted fluorenyl group in which $R^5$ to $R^{12}$ are a hydrogen atom, fluorenyl groups monosubstituted at position 2 such as 2-methylfluorenyl group, 2-t-butylfluorenyl group, and 2-phenylfluorenyl group, fluorenyl groups monosubstituted at position 4 such as 4-methylfluorenyl group, 4-t-butylfluorenyl group, and 4-phenylfluorenyl group, or fluorenyl groups disubstituted at positions 2 and 7 or positions 3 and 6 such as 2,7-di-t-butylfluorenyl group and 3,6-di-t-butylfluorenyl group, fluorenyl groups tetrasubstituted at positions 2,3,6, and 7 such as 2,7-dimethyl-3,6-di-t-butylfluorenyl group and 2,7-diphenyl-3,6-di-t-butylfluorenyl group, or fluorenyl groups tetrasubstituted at positions 2,3,6, and 7 in which $R^6$ and $R^7$ are bonded to each other to form a ring, and $R^{10}$ and $R^{11}$ are bonded to each other to form a ring as represented by the following general formulas [V-I] and [V-II].

[Chem. 4]

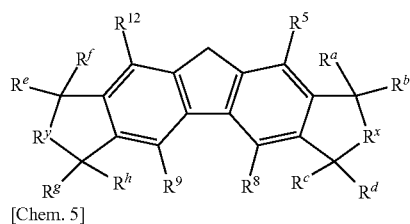

[V-I]

[Chem. 5]

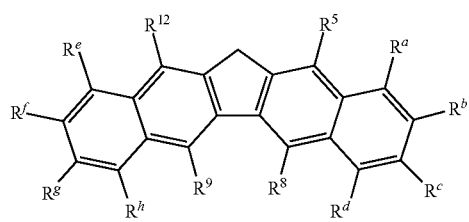

[V-II]

wherein $R^5$, $R^8$, $R^9$, and $R^2$ are defined as for the general formula [A1], $R^a$, $R^b$, $R^c$, $R^d$, $R^e$, $R^f$, $R^g$, and $R^h$ are each independently a hydrogen atom or an alkyl group having 1 to 5 carbon atoms, and each may be bonded to adjacent substituents to form a ring. Specific examples of the alkyl group include a methyl group, an ethyl group, an n-propyl group, an isopropyl group, an n-butyl group, a t-butyl group, an amyl group, and an n-pentyl group. In addition, in the formula [V-I], $R^x$ and $R^y$ each independently represent a hydrocarbon group having 1 to 3 carbon atoms which may have an unsaturated bond, $R^x$ may be form a double bond together with a carbon to which $R^a$ or $R^c$ is bonded, $R^y$ may be form a double bond together with a carbon to which $R^e$ or $R^g$ is bonded, and both $R^x$ and $R^y$ are preferably a saturated or unsaturated hydrocarbon group having 1 or 2 carbons.

Specific examples of the compound represented by the general formula [V-I] or [V-II] include a octamethyloctahydrodibenzofluorenyl group represented by the formula [V-III], a tetramethyldodecahydrodibenzofluorenyl group represented by the formula [V-IV], an octamethyltetrahydrodicyclopentafluorenyl group represented by the formula [V-V], a hexamethyldihydrodicyclopentafluorenyl group represented by the formula [V-VI], and a b,h-dibenzofluorenyl group represented by the formula [V-VII].

[Chem. 6]

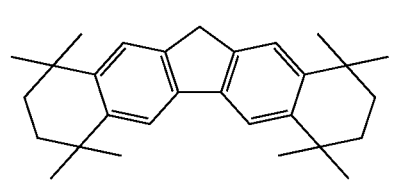

[V-III]

[Chem. 7]

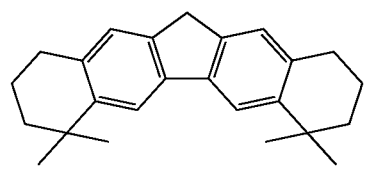

[V-IV]

[Chem. 8]

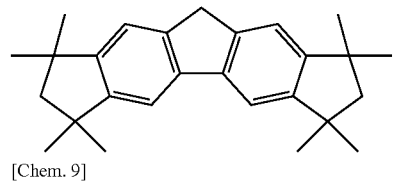

[V-V]

[Chem. 9]

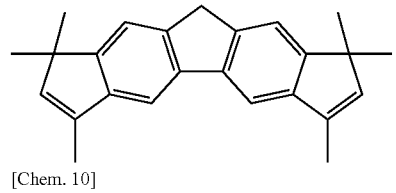

[V-VI]

[Chem. 10]

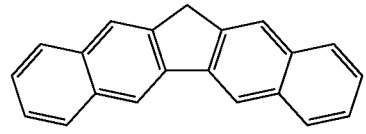

[V-VII]

A metallocene compound represented by the general formula [A1] containing any of these fluorenyl groups is excellent in copolymerization ability for non-conjugated polyenes and when $Y^1$ is a silicon atom, a transition metal compound having fluorenyl groups disubstituted at positions 2 and 7, fluorenyl groups disubstituted at positions 3 and 6, fluorenyl groups tetrasubstituted at positions 2, 3, 6, and 7, or fluorenyl groups tetrasubstituted at positions 2, 3, 6, and 7 represented by the general formula [V-I] is particularly excellent. When $Y^1$ is a carbon atom, a metallocene compound having an unsubstituted fluorenyl group in which $R^5$ to $R^{12}$ are a hydrogen atom, fluorenyl groups disubstituted at positions 3 and 6, fluorenyl groups tetrasubstituted at positions 2, 3, 6, and 7, or fluorenyl groups tetrasubstituted at positions 2, 3, 6, and 7 represented by the general formula [V-I] is particularly excellent.

In the present invention, in the metallocene compound represented by the general formula [A1], when $Y^1$ is a silicon atom with all of $R^3$ to $R^{12}$ being a hydrogen atom, $R^{13}$ and $R^{14}$ are preferably selected from groups other than a methyl group, a butyl group, a phenyl group, a silicon-substituted phenyl group, a cyclohexyl group, and a benzyl group;

when $Y^1$ is a silicon atom with both $R^6$ and $R^{11}$ are a t-butyl group and $R^5$, $R^7$, $R^1$, $R^9$, $R^{10}$, and $R^{12}$ not being a t-butyl group, $R^{13}$ and $R^{14}$ are preferably selected from groups other than a benzyl group and a silicon-substituted phenyl group;

when $Y^1$ is a carbon atom with all of $R^3$ to $R^{12}$ being a hydrogen atom, $R^{13}$ and $R^{14}$ are preferably selected from groups other than a methyl group, an isopropyl group, a t-butyl group, an isobutyl group, a phenyl group, a p-t-butylphenyl group, a p-n-butylphenyl group, a silicon-substituted phenyl group, a 4-biphenyl group, a p-tolyl group, a naphthyl group, a benzyl group, a cyclopentyl group, a cyclohexyl group, and a xylyl group;

when $Y^1$ is a carbon atom with both $R^6$ and $R^{11}$ being the same group selected from a t-butyl group, a methyl group, and a phenyl group, and being a different group or a different atom from $R^5$, $R^7$, $R^8$, $R^9$, $R^{10}$, and $R^{12}$, $R^{13}$ and $R^{14}$ are preferably selected from groups other than a methyl group, a phenyl group, a p-t-butylphenyl group, a p-n-butylphenyl group, a silicon-substituted phenyl group, and a benzyl group;

when $Y^1$ is a carbon atom with $R^6$ being a dimethylamino group, a methoxy group, or a methyl group and $R^5$, $R^7$, $R^8$, $R^9$, $R^{10}$, $R^{11}$, and $R^{12}$ being a different group or a different atom from $R^6$, $R^{13}$ and $R^{14}$ are preferably selected from groups other than a methyl group and a phenyl group;

when $Y^1$ is a carbon atom with sites constituted by a fluorenyl group and $R^5$ to $R^{12}$ being b,h-dibenzofluorenyl or a,i-dibenzofluorenyl, $R^{13}$ and $R^{14}$ are preferably selected from groups other than a methyl group and a phenyl group.

Hereinafter, specific examples of the metallocene compound represented by the general formula [A1] in the present invention will be described, but the scope of the present invention is not particularly limited thereto.

Specific examples of the metallocene compound represented by the general formula [A1] in the present invention include, when $Y^1$ is a silicon atom,
diphenylsilylene(cyclopentadienyl)(2,7-di-t-butylfluorenyl) zirconium dichloride,
diphenylsilylene(cyclopentadienyl)(3,6-di-t-butylfluorenyl) zirconium dichloride,
diphenylsilylene(cyclopentadienyl)(2,7-dimethyl-3,6-di-t-butylfluorenyl)zirconium dichloride,
diphenylsilylene(cyclopentadienyl)(2,7-diphenyl-3,6-di-t-butylfluorenyl)zirconium dichloride,
diphenylsilylene(cyclopentadienyl)(octamethyloctahydrodibenzofluorenyl)zirconium dichloride,
diphenylsilylene(cyclopentadienyl)(tetramethyldodecahydrodibenzofluorenyl)zirconium dichloride,
diphenylsilylene(cyclopentadienyl)(octamethyltetrahydrodicyclopentafluorenyl)zirconium dichloride,
diphenylsilylene(cyclopentadienyl)(hexamethyldihydrodicyclopentafluorenyl)zirconium dichloride,
diphenylsilylene(cyclopentadienyl)(b,h-dibenzofluorenyl) zirconium dichloride,
di(p-tolyl)silylene(cyclopentadienyl)(fluorenyl)zirconium dichloride,
di(p-tolyl)silylene(cyclopentadienyl)(2,7-di-t-butylfluorenyl)zirconium dichloride,
di(p-tolyl)silylene(cyclopentadienyl)(3,6-di-t-butylfluorenyl)zirconium dichloride,
di(p-tolyl)silylene(cyclopentadienyl)(2,7-dimethyl-3,6-di-t-butylfluorenyl)zirconium dichloride,
di(p-tolyl)silylene(cyclopentadienyl)(2,7-diphenyl-3,6-di-t-butylfluorenyl)zirconium dichloride,
di(p-tolyl)silylene(cyclopentadienyl)(octamethyloctahydrodibenzofluorenyl)zirconium dichloride,
di(p-tolyl)silylene(cyclopentadienyl)(tetramethyldodecahydrodibenzofluorenyl)zirconium dichloride,
di (p-tolyl)silylene(cyclopentadienyl)(octamethyltetrahydrodicyclopentafluorenyl)zirconium dichloride,
di(p-tolyl)silylene(cyclopentadienyl)(hexamethyldihydrodicyclopentafluorenyl)zirconium dichloride,
di(p-tolyl)silylene(cyclopentadienyl)(b,h-dibenzofluorenyl) zirconium dichloride,
di(m-tolyl)silylene(cyclopentadienyl)(fluorenyl)zirconium dichloride,
di(m-tolyl)silylene(cyclopentadienyl)(2,7-di-t-butylfluorenyl)zirconium dichloride,
di(m-tolyl)silylene(cyclopentadienyl)(3,6-di-t-butylfluorenyl)zirconium dichloride,
di(m-tolyl)silylene(cyclopentadienyl)(2,7-dimethyl-3,6-di-t-butylfluorenyl)zirconium dichloride,
di(m-tolyl)silylene(cyclopentadienyl)(2,7-diphenyl-3,6-di-t-butylfluorenyl)zirconium dichloride,
di(m-tolyl)silylene(cyclopentadienyl)(octamethyloctahydrodibenzofluorenyl)zirconium dichloride,
di(m-tolyl)silylene(cyclopentadienyl)(tetramethyldodecahydrodibenzofluorenyl)zirconium dichloride,
di (m-tolyl)silyl ene(cyclopentadienyl)(octamethyltetrahydrodicyclopentafluorenyl)zirconium dichloride,
di(m-tolyl)silylene(cyclopentadienyl)(hexamethyldihydrodicyclopentafluorenyl)zirconium dichloride, and
di(m-tolyl)silylene(cyclopentadienyl)(b,h-dibenzofluorenyl) zirconium dichloride.

When $Y^1$ is a carbon atom, examples thereof include
diphenylmethylene(cyclopentadienyl)(3,6-di-t-butylfluorenyl)zirconium dichloride,
diphenylmethylene(cyclopentadienyl)(2,7-dimethyl-3,6-di-t-butylfluorenyl)zirconium dichloride,
diphenylmethylene(cyclopentadienyl)(2,7-diphenyl-3,6-di-t-butylfluorenyl)zirconium dichloride,
diphenylmethylene(cyclopentadienyl)(octamethyloctahydrodibenzofluorenyl)zirconium dichloride,
diphenylmethylene(cyclopentadienyl)(tetramethyldodecahydrodibenzofluorenyl)zirconium dichloride, diphenylmethylene(cyclopentadienyl)(octamethyltetrahydrodicyclopentafluorenyl)zirconium dichloride,
diphenylmethylene(cyclopentadienyl)(hexamethyldihydrodicyclopentafluorenyl)zirconium dichloride,
diphenylmethylene(cyclopentadienyl)(b,h-dibenzofluorenyl)zirconium dichloride,
di (p-tolyl)methylene(cyclopentadienyl)(2,7-di-t-butylfluorenyl)zirconium dichloride,
di(p-tolyl)methylene(cyclopentadienyl)(3,6-di-t-butylfluorenyl)zirconium dichloride,
di(p-tolyl)methylene(cyclopentadienyl)(2,7-dimethyl-3,6-di-t-butylfluorenyl)zirconium dichloride,
di(p-tolyl)methylene(cyclopentadienyl)(2,7-diphenyl-3,6-di-t-butylfluorenyl)zirconium dichloride,
di(p-tolyl)methylene(cyclopentadienyl)(octamethyloctahydrodibenzofluorenyl)zirconium dichloride,
di (p-tolyl)methylene(cyclopentadienyl)(tetramethyldodecahydrodibenzofluorenyl)zirconium dichloride,
di (p-tolyl)methylene (cyclopentadienyl)(octamethyltetrahydrodicyclopentafluorenyl)zirconium dichloride,
di (p-tolyl)methylene(cyclopentadienyl)(hexamethyldihydrodicyclopentafluorenyl)zirconium dichloride,
di(p-tolyl)methylene(cyclopentadienyl)(b,h-dibenzofluorenyl)zirconium dichloride,
di(m-tolyl)methylene(cyclopentadienyl)(fluorenyl)zirconium dichloride,
di(m-tolyl)methylene(cyclopentadienyl)(2,7-di-t-butylfluorenyl)zirconium dichloride,
di(m-tolyl)methylene(cyclopentadienyl)(3,6-di-t-butylfluorenyl)zirconium dichloride,
di(m-tolyl)methylene(cyclopentadienyl)(2,7-dimethyl-3,6-di-t-butylfluorenyl)zirconium dichloride,
di(m-tolyl)methylene(cyclopentadienyl)(2,7-diphenyl-3,6-di-t-butylfluorenyl)zirconium dichloride,
di(m-tolyl)methylene(cyclopentadienyl)(octamethyloctahydrodibenzofluorenyl)zirconium dichloride,
di (m-tolyl)methylene(cyclopentadienyl)(tetramethyldodecahydrodibenzofluorenyl)zirconium dichloride,
di (m-tolyl)methylene (cyclopentadienyl)(octamethyltetrahydrodicyclopentafluorenyl)zirconium dichloride,
di (m-tolyl)methylene(cyclopentadienyl)(hexamethyldihydrodicyclopentafluorenyl)zirconium dichloride,
di(m-tolyl)methylene(cyclopentadienyl)(b,h-dibenzofluorenyl)zirconium dichloride,
di(p-t-butylphenyl)methylene(cyclopentadienyl)(3,6-di-t-butylfluorenyl)zirconium dichloride,
di(p-t-butylphenyl)methylene(cyclopentadienyl)(2,7-dimethyl-3,6-di-t-butylfluorenyl)zirconium dichloride,
di(p-t-butylphenyl)methylene(cyclopentadienyl)(2,7-diphenyl-3,6-di-t-butylfluorenyl)zirconium dichloride,
di (p-t-butyl phenyl)methylene(cyclopentadienyl)(octamethyloctahydrodibenzofluorenyl)zirconium dichloride,
di (p-t-butyl phenyl)methylene(cyclopentadienyl)(tetramethyldodecahydrodibenzofluorenyl)zirconium dichloride,
di (p-t-butylphenyl)methylene(cyclopentadienyl)(octamethyltetrahydrodicyclopentafluorenyl)zirconium dichloride,
di (p-t-butylphenyl)methylene(cyclopentadienyl)(hexamethyldihydrodicyclopentafluorenyl)zirconium dichloride,
di(p-t-butylphenyl)methylene(cyclopentadienyl)(b,h-dibenzofluorenyl)zirconium dichloride,
di(4-biphenyl)methylene(cyclopentadienyl)(2,7-di-t-butylfluorenyl)zirconium dichloride,
di(4-biphenyl)methylene(cyclopentadienyl)(3,6-di-t-butylfluorenyl)zirconium dichloride,
di(4-biphenyl)methylene(cyclopentadienyl)(2,7-dimethyl-3,6-di-t-butylfluorenyl)zirconium dichloride,
di(4-biphenyl)methylene(cyclopentadienyl)(2,7-diphenyl-3,6-di-t-butylfluorenyl)zirconium dichloride,
di (4-biphenyl)methylene(cyclopentadienyl)(octamethyloctahydrodibenzofluorenyl)zirconium dichloride,
di (4-biphenyl)methylene(cyclopentadienyl)(tetramethyldodecahydrodibenzofluorenyl)zirconium dichloride,
di (4-biphenyl)methylene(cyclopentadienyl)(octamethyltetrahydrodicyclopentafluorenyl)zirconium dichloride,
di (4-biphenyl)methylene(cyclopentadienyl)(hexamethyldihydrodicyclopentafluorenyl)zirconium dichloride,
di(4-biphenyl)methylene(cyclopentadienyl)(b,h-dibenzofluorenyl)zirconium dichloride,
di (p-chlorophenyl)methylene(cyclopentadienyl)(fluorenyl)zirconium dichloride,
di (p-chlorophenyl)methylene(cyclopentadienyl)(2,7-di-t-butylfluorenyl)zirconium dichloride,
di (p-chlorophenyl)methylene(cyclopentadienyl)(3,6-di-t-butylfluorenyl)zirconium dichloride,
di (p-chlorophenyl)methylene(cyclopentadienyl)(2,7-dimethyl-3,6-di-t-butyl fluorenyl)zirconium dichloride,
di (p-chlorophenyl)methylene(cyclopentadienyl)(2,7-diphenyl-3,6-di-t-butyl fluorenyl)zirconium dichloride,
di (p-chlorophenyl)methylene(cyclopentadienyl)(octamethyloctahydrodibenzofluorenyl)zirconium dichloride,
di (p-chlorophenyl)methylene(cyclopentadienyl)(tetramethyldodecahydrodibenzofluorenyl)zirconium dichloride,
di (p-chlorophenyl)methylene(cyclopentadienyl)(octamethyltetrahydrodicyclopentafluorenyl)zirconium dichloride,
di (p-chlorophenyl)methylene(cyclopentadienyl)(hexamethyldihydrodicyclopentafluorenyl)zirconium dichloride,
di(p-chlorophenyl)methylene(cyclopentadienyl)(b,h-dibenzofluorenyl)zirconium dichloride,
di(m-chlorophenyl)methylene(cyclopentadienyl)(fluorenyl)zirconium dichloride,
di(m-chlorophenyl)methylene(cyclopentadienyl)(2,7-di-t-butylfluorenyl)zirconium dichloride,
di(m-chlorophenyl)methylene(cyclopentadienyl)(3,6-di-t-butylfluorenyl)zirconium dichloride,
di(m-chlorophenyl)methylene(cyclopentadienyl)(2,7-dimethyl-3,6-di-t-butylfluorenyl)zirconium dichloride,
di(m-chlorophenyl)methylene(cyclopentadienyl)(2,7-diphenyl-3,6-di-t-butylfluorenyl)zirconium dichloride,
di (m-chlorophenyl)methylene(cyclopentadienyl)(octamethyloctahydrodibenzofluorenyl)zirconium dichloride,
di (m-chlorophenyl)methylene(cyclopentadienyl)(tetramethyldodecahydrodibenzofluorenyl)zirconium dichloride,
di (m-chlorophenyl)methylene(cyclopentadienyl)(octamethyltetrahydrodicyclopentafluorenyl)zirconium dichloride,
di (m-chlorophenyl)methylene(cyclopentadienyl)(hexamethyldihydrodicyclopentafluorenyl)zirconium dichloride,
di(m-chlorophenyl)methylene(cyclopentadienyl)(b,h-dibenzofluorenyl)zirconium dichloride,
di(m-trifluoromethylphenyl)methylene(cyclopentadienyl)(fluorenyl)zirconium dichloride,
di(m-trifluoromethylphenyl)methylene(cyclopentadienyl)(2,7-di-t-butylfluorenyl)zirconium dichloride,
di(m-trifluoromethylphenyl)methylene(cyclopentadienyl)(3,6-di-t-butylfluorenyl)zirconium dichloride,
di(m-trifluoromethylphenyl)methylene(cyclopentadienyl)(2,7-dimethyl-3,6-di-t-butylfluorenyl)zirconium dichloride,
di(m-trifluoromethylphenyl)methylene(cyclopentadienyl)(2,7-diphenyl-3,6-di-t-butylfluorenyl)zirconium dichloride, di (m-trifluoromethylphenyl)methylene (cyclopentadienyl)(octamethyloctahydrodibenzofluorenyl)zirconium dichloride, di (m-trifluoromethylphenyl)methylene(cyclopentadienyl)(tetramethyldodecahydrodibenzofluorenyl)zirconium dichloride, di (m-trifluoromethylphenyl)methylene (cyclopentadienyl)(octamethyltetrahydrodicyclopentafluorenyl) zirconium dichloride, di (m-trifluoromethylphenyl)methylene(cyclopentadienyl)(hexamethyldihydrodicyclopentafluorenyl)zirconium dichloride, di(m-trifluoromethylphenyl)methylene(cyclopentadienyl)(b,h-dibenzofluorenyl)zirconium dichloride, di(2-naphthyl)methylene(cyclopentadienyl)(2,7-di-t-butylfluorenyl)zirconium dichloride, di(2-naphthyl)methylene(cyclopentadienyl)(3,6-di-t-butylfluorenyl)zirconium dichloride, di(2-naphthyl)methylene(cyclopentadienyl)(2,7-dimethyl-3,6-di-t-butylfluorenyl)zirconium dichloride, di(2-naphthyl)methylene(cyclopentadienyl)(2,7-diphenyl-3,6-di-t-butylfluorenyl)zirconium dichloride, di (2-naphthyl)methylene(cyclopentadienyl)(octamethyloctahydrodibenzofluorenyl)zirconium dichloride, di (2-naphthyl)methylene(cyclopentadienyl)(tetramethyldodecahydrodibenzofluorenyl)zirconium dichloride, di (2-naphthyl)methylene(cyclopentadienyl)(octamethyltetrahydrodicyclopentafluorenyl)zirconium dichloride, di (2-naphthyl)methylene(cyclopentadienyl)(hexamethyldihydrodicyclopentafluorenyl)zirconium dichloride, and di(2-naphthyl)methylene(cyclopentadienyl)(b,h-dibenzofluorenyl)zirconium dichloride.

As examples of the structural formula of the metallocene compound represented by the general formula [A1], structural formulas of di(p-tolyl)methylene(cyclopentadienyl)(octamethyloctahydrodibenzofluorenyl)zirconium dichloride ((A) described below) and di(p-chlorophenyl)methylene(cyclopentadienyl)(octamethyloctahydrodibenzofluorenyl)zirconium dichloride ((B) described below) are shown below.

[Chem. 11]

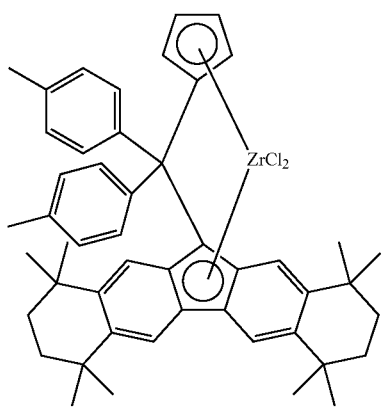

(A)

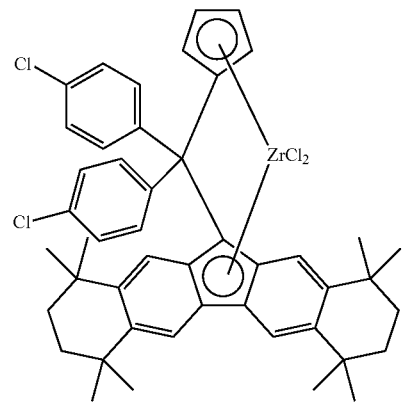

(B)

The above metallocene compound may be used singly or in combination of two or more kinds thereof.

The metallocene compound represented by the above formula [A1] that can be suitably used for preparing the ethylene/α-olefin/non-conjugated polyene copolymer of the present invention is not particularly limited, and can be produced by any methods. Specifically, the metallocene compound can be produced in accordance with the methods described in, for example, J. Organomet. Chem., 63, 509 (1996); WO 2005/100410; WO 2006/123759; WO 01/27124; Japanese Patent Laid-Open No. 2004-168744; Japanese Patent Laid-Open No. 2004-175759; and Japanese Patent Laid-Open No. 2000-212194.

<Polymerization Catalyst Containing Metallocene Compound>

Examples of polymerization catalysts suitably used for producing the ethylene/α-olefin/non-conjugated polyene copolymer of the present invention include those containing the aforementioned metallocene compound [A1] and capable of copolymerizing monomers.

A preferred example thereof include a polymerization catalyst constituted by (a) a metallocene compound represented by the general formula [A1], (b) at least one compound selected from (b-1) an organometallic compound, (b-2) an organoaluminum oxy-compound, and (b-3) a compound which react with the metallocene compound (a) to form an ion pair (hereinafter referred to as the "ionized ionic compound"), and further, if necessary, (c) a particulate carrier. Hereinafter, respective components will be specifically described.

«Compound (b)»

The compound (b) is at least one compound selected from (b-1) the organometallic compound, (b-2) the organoaluminum oxy-compound, and (b-3) the ionized ionic compound, and preferably contains at least the organometallic compound (b-1).

(b-1) Organometallic Compound

As the organometallic compound (b-1), an organometallic compound in Group 1, 2, 12, and 13 of the periodic table, such as the following general formulas [VII] to [IX], is used.

An organoaluminum compound represented by the general formula [VII]:

(b-1a) General Formula: $R^a{}_m Al(OR^b)_n H_p X_q$ [VII]

(wherein $R^a$ and $R^b$, each of which may be the same or different, represent a hydrocarbon group having 1 to 15, preferably 1 to 4 carbon atoms; X represents a halogen atom; m, n, p, and q are numbers defined as $0 < m \le 3$, $0 \le n < 3$, $0 \le p < 3$, $0 \le q < 3$, and $m+n+p+q=3$).

Examples of such compounds include trialkylaluminum such as trimethylaluminum, triethylaluminum, triisobutylaluminum, and tri-n-octylaluminum; tricycloalkylaluminum, isobutylaluminumdichloride, diethylaluminumchloride, ethylaluminumdichloride, ethylaluminumsesquichloride, methylaluminumdichloride, dimethylaluminumchloride, diisobutylaluminumhydride.

A complex alkylated compound of a metal of Group 1 of the periodic table and aluminum, represented by the general formula [VIII]:

(b-1b) General Formula: $M^2AlR^a_4$      [VIII]

(wherein $M^2$ represents Li, Na, or K, and $R^a$ is a hydrocarbon group having 1 to 15, preferably 1 to 4 carbon atoms).

Examples of such compounds include $LiAl(C_2H_5)_4$ and $LiAl(C_7H_{15})_4$.

A dialkyl compound having a metal of Group 2 or 12 of the periodic table, represented by the general formula [IX]

(b-1c) General Formula: $R^aR^bM^3$      [IX]

(wherein $R^a$ and $R^b$, each of which may be the same or different, represent a hydrocarbon group having 1 to 15, preferably 1 to 4 carbon atoms, and $M^3$ is Mg, Zn, or Cd).

Among the organometallic compounds (b-1), organoaluminum compounds such as triethylaluminum, triisobutylaluminum and tri-n-octylaluminum are preferable. Such organometallic compounds (b-1) may be used singly or in combination of two or more kinds thereof.

(b-2) Organoaluminum Oxy-Compound

The organoaluminum oxy-compound (b-2) may be a conventionally known aluminoxane and may be a benzene-insoluble organoaluminum oxy-compound such as those exemplified in Japanese Patent Laid-Open No. H02-78687.

A conventionally known aluminoxane can be produced by, for example, the following method, and is usually obtained as a hydrocarbon solvent solution.

(1) A method of reacting an absorption water or a crystalline water with an organoaluminum compound through adding an organoaluminum compound such as trialkylaluminum to a hydrocarbon medium suspension such as an absorption water-containing compound or a crystalline water-containing salt, for example, magnesium chloride hydrate, copper sulfate hydrate, aluminum sulfate hydrate, nickel sulfate hydrate or the first cerium chloride hydrate.

(2) A method of applying water, ice or water vapor directly to an organoaluminum compound such as trialkylaluminum in a medium such as benzene, toluene, ethyl ether or tetrahydrofuran.

(3) A method of reacting an organic tin oxide such as dimethyl tin oxide or dibutyl tin oxide with an organoaluminum compound such as trialkylaluminum in a medium such as decane, benzene or toluene.

The aluminoxane may contain a small amount of organometallic components. The aluminoxane solution recovered may have a solvent or unreacted organoaluminum compound distilled off therefrom, followed by being re-dissolved in a solvent or suspended in a poor solvent of aluminoxane.

Examples of the organoaluminum compound used in preparing aluminoxane include an organoaluminum compound similar to those exemplified as an organoaluminum compound belonging to the (b-1a).

Among these, trialkylaluminum and tricycloalkylaluminum are preferable, and above all, trimethylaluminum and triisobutylaluminum are particularly preferable.

An organoaluminum compound such as above-mentioned is used singly or in combination of two or more kinds.

A benzene-insoluble organoaluminum oxy-compound which is an aspect of the organoaluminum oxy-compound (b-2) used in the present invention is preferably one which has an Al component dissolved in a 60° C. benzene at usually 10 wt % or less, preferably 5 wt % or less, particularly preferably 2 wt % or less with respect to 100 wt % benzene based on the conversion to Al atoms, i.e., one which is insoluble or poorly-soluble to benzene.

Examples of the organoaluminum oxy-compound (b-2) used in the present invention include an organoaluminum oxy-compound containing boron represented by the following general formula [X].

[Chem. 12]

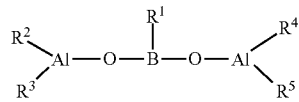

[X]

wherein $R^1$ represents a hydrocarbon group having 1 to 10 carbon atoms, and $R^2$ to $R^5$, each of which may be the same or different, and represent a hydrogen atom, a halogen atom, and a hydrocarbon group having 1 to 10 carbon atoms.

An organoaluminum oxy-compound containing a boron represented by the general formula [X] can be produced by reacting an alkyl boronic acid represented by the following general formula [XI]:

General Formula: $R^1$—$B(OH)_2$      [XI]

(wherein $R^1$ represents the same group as $R^1$ in the general formula [X]), with an organoaluminum compound in an inert solvent in an inert gas atmosphere at a temperature of −80° C. to room temperature for 1 minute to 24 hours.

Examples of the alkyl boronic acid represented by the general formula [XI] include methyl boronic acid, ethyl boronic acid, isopropyl boronic acid, n-propyl boronic acid, n-butyl boronic acid, isobutyl boronic acid, n-hexyl boronic acid, cyclohexyl boronic acid, phenyl boronic acid, 3,5-difluorophenyl boronic acid, pentafluorophenyl boronic acid, and 3,5-bis(trifluoromethyl)phenyl boronic acid.

Among these, methyl boronic acid, n-butyl boronic acid, isobutyl boronic acid, 3,5-difluorophenyl boronic acid, and pentafluorophenyl boronic acid are preferable. These are used singly or in combination of two or more kinds.

Examples of the organoaluminum compound to be reacted with such alkyl boronic acids include an organoaluminum compound similar to those exemplified as an organoaluminum compound belonging to the (b-1a). Among these, trialkylaluminum and tricycloalkylaluminum are preferable, and trimethylaluminum, triethylaluminum, and triisobutylaluminum are particularly preferable.

An organoaluminum oxy-compound (b-2) such as the above-mentioned is used singly or in combination of two or more kinds.

(b-3) Ionized Ionic Compound

Examples of the ionized ionic compound (b-3) include Lewis acids, ionic compounds, borane compounds, and carborane compounds described in Japanese Patent Laid-Open No. 1-501950, Japanese Patent Laid-Open No. 1-502036, Japanese Patent Laid-Open No. 3-179005, Japanese Patent Laid-Open No. 3-179006, Japanese Patent Laid-Open No. 3-207703, Japanese Patent Laid-Open No.

3-207704, U.S. Pat. No. 5,321,106, and the like. Further examples also include heteropoly compounds and isopoly compounds. Such an ionized ionic compound (b-3) is used singly or in combination of two or more kinds.

Specific examples of the Lewis acids include a compound represented by BR3 (wherein R is a phenyl group which may have a substituent such as fluorine, methyl group, and trifluoromethyl group, or fluorine), for example, trifluoroboron, triphenylboron, tris(4-fluorophenyl)boron, tris(3,5-difluorophenyl)boron, tris(4-fluorometyhylphenyl)boron, tris(pentafluorophenyl)boron, tris(p-tolyl)boron, tris(o-tolyl)boron, and tris(3,5-dimethylphenyl)boron.

Examples of the ionic compounds include a compound represented by the following general formula [XII].

[Chem. 13]

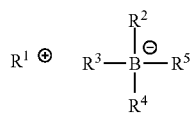

[XII]

wherein $R^{1+}$ is $H^+$, a carbonium cation, an oxonium cation, an ammonium cation, a phosphonium cation, a cycloheptyltrienyl cation, a ferrocenium cation having a transition metal, or the like. $R^2$ to $R^5$, each of which may be the same or different, are organic groups, preferably aryl groups or substituted aryl groups.

Specific examples of the carbonium cation include a trisubstituted carbonium cation such as a triphenyl carbonium cation, a tri(methylphenyl)carbonium cation, and a tri(dimethylphenyl)carbonium cation.

Specific examples of the ammonium cation include a trialkylammonium cation such as a trimethylammonium cation, a triethylammonium cation, a tripropylammonium cation, a tributylammonium cation, and a tri(n-butyl)ammonium cation;
  an N,N-dialkylanilinium cation such as an N,N-dimethylanilinium cation, an N,N-diethylanilinium cation, and an N,N,2,4,6-pentamethylanilinium cation;
  a dialkylammonium cation such as a di(isopropyl)ammonium cation, and a dicyclohexylammonium cation.

Specific examples of the phosphonium cation include a triarylphosphonium cation such as a triphenylphosphonium cation, a tri(methylphenyl)phosphonium cation, and a tri(dimethylphenyl)phosphonium cation.

As $R^{1+}$, a carbonium cation, an ammonium cation, and the like are preferable, and in particular, a triphenyl carbonium cation, an N,N-dimethylanilinium cation, and an N,N-diethylanilinium cation are preferable.

Examples of the ionic compounds include trialkyl substituted ammonium salts, N,N-dialkylanilinium salts, dialkylammonium salts, and triarylphosphonium salts.

Specific examples of the trialkyl substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(N,N-dimethylphenyl)boron, tri(n-butyl)ammoniumtetra(p-trifluoromethylphenyl)boron, tri(n-butyl)ammoniumtetra(3,5-ditrifluoromethylphenyl)boron, and tri(n-butyl)ammoniumtetra(o-tolyl)boron.

Specific examples of the N,N-dialkylanilinium salts include N,N-dimethylaniliniumtetra(phenyl)boron, N,N-diethylaniliniumtetra(phenyl)boron, and N,N,2,4,6-pentamethylaniliniumtetra(phenyl)boron.

Specific examples of the dialkylammonium salts include di(1-propyl)ammoniumtetra(pentafluorophenyl)boron and dicyclohexylammoniumtetra(phenyl)boron.

Further, examples of the ionic compounds include triphenylcarbeniumtetrakis(pentafluorophenyl)borate, N,N-dimethylaniliniumtetrakis(pentafluorophenyl)borate, ferroceniumtetra(pentafluorophenyl)borate, a triphenylcarbeniumpentaphenylcyclopentadienyl complex, an N,N-diethylaniliniumpentaphenylcyclopentadienyl complex, and boron compounds represented by the following formula [XIII] or [XIV]. In the following formula, Et represents an ethyl group.

[Chem. 14]

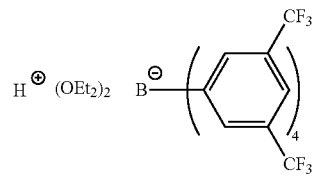

[XIII]

[Chem. 15]

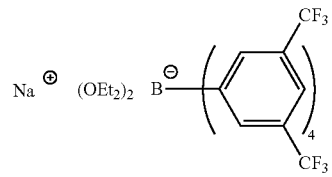

[XIV]

Specific examples of the borane compounds include decaborane; a salt of an anion such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, and bis[tri(n-butyl)ammonium]dodecachlorododecaborate; a salt of a metal borane anion such as tri(n-butyl)ammoniumbis(dodecahydridododecaborate) cobaltate (III), and bis[tri(n-butyl)ammonium]bis(dodecahydridododecaborate) nickelate (III).

Specific examples of the carborane compounds include a salt of an anion such as 4-carbanonaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydrido-11-methyl-2,7-dicarbaundecaborane, tri(n-butyl)ammonium1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9- dicarbaundecaborate, tri(n-butyl)ammoniumundecahydrido-9-trimethylsilyl-7,8-dicarbaundecaborate, and tri(n-butyl) ammoniumundecahydrido-4,6-dibromo-7-carbaundecaborate;

a salt of a metal carborane anion such as tri(n-butyl) ammoniumbis(nonahydrido-1,3-dicarbanonaborate)cobaltate (III), tri(n-butyl)ammoniumbis(undecahydrido-7,8-dicarbaundecaborate)ferrate (III), tri(n-butyl)ammoniumbis (undecahydrido-7,8-dicarbaundecaborate)cobaltate (III), tri (n-butyl)ammoniumbis(undecahydrido-7,8-dicarbaundecaborate)nickelate (III), tri(n-butyl)ammo- niumbis(undecahydrido-7,8-dicarbaundecaborate)cuprate (III), tri(n-butyl)ammoniumbis(undecahydrido-7,8-dicarbaundecaborate)aurato (III), tri(n-butyl)ammoniumbis(nonahydrido-7,8-dimethyl-7,8-dicarbaundecaborate)ferrate (III), tri(n-butyl)ammoniumbis(nonahydrido-7,8-dimethyl-7,8-dicarbaundecaborate) chromate (III), tri(n-butyl)ammoniumbis(tribromooctahydrido-7,8-dicarbaundecaborate)cobaltate (III), tris[tri(n-butyl)ammonium]bis(undecahydrido-7-carbaundecaborate) chromate (III), bis[tri(n-butyl)amm- onium]bis(undecahydrido-7-carbaundecaborate)manganate (iv), bis[tri(n-butyl) ammonium]bis(undecahydrido-7-carbaundecaborate)cobaltate (III), and bis[tri(n-butyl)ammonium]bis(undecahydrido-7-carbaundecaborate)nickelate (iv).

A heteropoly compound comprises an atom selected from silicon, phosphorus, titanium, germanium, arsenic, and tin, and an atom or two or more atoms selected from vanadium, niobium, molybdenum, and tungsten. Specifically, phosphorusvanadic acid, germanovanadic acid, arsenicvanadic acid, phosphorusniobic acid, germanoniobic acid, siliconomolybdic acid, phosphorusmolybdic acid, titaniummolybdic acid, germanomolybdic acid, arsenicmolybdic acid, tinmolybdic acid, phosphorustungstic acid, germanotungstic acid, tintungstic acid, phosphorusmolybdovanadic acid, phosphorustungstovanadic acid, germanotungstovanadic acid, phosphorusmolybdotungstovanadic acid, germanomolybdotungstovanadic acid, phosphorusmolybdotungstic acid, phosphorusmolybdoniobic acid, and salts of these acids such as salts with, for example, any of metals of Group 1 or 2 of the periodic table specifically including lithium, sodium, potassium, rubidium, cesium, beryllium, magnesium, calcium, strontium, and barium, and organic salts such as triphenylethyl salt can be used, but are not limited thereto.

Among the ionized ionic compound (b-3), the aforementioned ionic compounds are preferable, and among these, triphenylcarbeniumtetrakis(pentafluorophenyl)borate and N,N-dimethylaniliniumtetrakis(pentafluorophenyl)borate are more preferable.

In the present invention, when a metallocene-based catalyst containing the metallocene compound (a) represented by the general formula [A1], an organometallic compound (b-1) such as triisobutylaluminum, an organoaluminum oxy-compound (b-2) such as methylaluminoxane, and an ionized ionic compound (b-3) such as triphenylcarbeniumtetrakis (pentafluorophenyl)borate is used as the polymerization catalyst, a very high polymerization activity can be exhibited in producing the ethylene/α-olefin/non-conjugated polyene copolymer.

(c) Particulate Carrier

The particulate carrier (c) used as necessary in the present invention is an inorganic compound or an organic compound, and is a granular or particulate solid.

As the inorganic compound, porous oxides, inorganic halides, clays, clay minerals, or ion-exchanging layered compounds are preferable. Specific examples thereof include those described in WO2015/122495.

The clays, clay minerals, and ion-exchanging layered compounds used in the present invention may be used as they are, or may be used after subjecting to a treatment of ball milling, sieving, or the like. Moreover, they may be used after subjecting to water adsorption or dehydration under heating. Further, they may be used singly or in combination of two or more kinds thereof.

Among these, clays or clay minerals are preferable, and montmorillonite, vermiculite, hectorite, teniolite, and synthetic mica are particularly preferable.

Examples of the organic compounds include a granular or particulate solid having a particle size in the range of 10 to 300 μm. Specific examples thereof include (co)polymers produced with an α-olefin having 2 to 14 carbon atoms such as ethylene, propylene, 1-butene, and 4-methyl-1-pentene as the main component, (co)polymers produced with vinylcyclohexane or styrene as the main component, and modified products thereof.

The metallocene-based catalyst used in the present invention may contain in addition to the metallocene compound (a), at least one compound (b) selected from the organometallic compound (b-1), the organoaluminum oxy-compound (b-2), and the ionized ionic compound (b-3), and the carrier (c) used as necessary, and further, if necessary, a certain organic compound component (d).

(d) Organic Compound Component

In the present invention, the organic compound component (d) is used to improve the polymerization performance and physical properties of the polymer produced if necessary. Examples of such an organic compound include, but are not limited to alcohols, phenol compounds, carboxylic acids, phosphorus compounds, and sulfonate salts.

<Production Method and Condition>

The ethylene/α-olefin/non-conjugated polyene copolymer according to the present invention (hereinafter referred to sometimes as the "ethylene/α-olefin/non-conjugated polyene copolymer (S)") is produced by copolymerizing monomers consisting of ethylene (A), an α-olefin (B) having 3 to 20 carbon atoms, a non-conjugated polyene (C), and if necessary, a non-conjugated polyene (D).

In copolymerizing such a monomer, usage and addition order of respective components constituting the aforementioned polymerization catalyst are arbitrarily selected, and the following methods are exemplified.

(1) A method of adding the metallocene compound (a) singly to a polymerizer.
(2) A method of adding the metallocene compound (a) and the compound (b) to a polymerizer in any order.
(3) A method of adding a catalyst component, which has the metallocene compound (a) supported on the carrier (c), and the compound (b) to a polymerizer in any order.
(4) A method of adding a catalyst component, which has the compound (b) supported on the carrier (c), and the metallocene compound (a) to a polymerizer in any order.
(5) A method of adding a catalyst component, which has the metallocene compound (a) and the compound (b) supported on the carrier (c), to a polymerizer.

In each of the methods (2) to (5), at least two of the metallocene compound (a), the compound (b), and the carrier (c) may be put in contact preliminarily.

In each of the methods (4) and (5), wherein a compound (b) is supported, another compound (b) which is not supported may be added in any order, if necessary. In this case, this compound (b) may be the same as or different from the compound (b) supported on the carrier (c).

A solid catalyst component having the metallocene compound (a) supported on the carrier (c) or a solid catalyst component having the metallocene compound (a) and the compound (b) supported on the carrier (c) may have an olefin polymerized preliminarily and may further have a catalyst component supported on the preliminarily polymerized solid catalyst component.

In the present invention, the ethylene/α-olefin/non-conjugated polyene copolymer can be suitably obtained by copolymerizing monomers in the presence of the metallocene-based catalyst as described above.

In copolymerizing monomers by using the metallocene-based catalyst as described above, the metallocene compound (a) is usually used in an amount of $10^{-12}$ to $10^{-2}$ mol, preferably $10^{-10}$ to $10^{-8}$ mol per liter of reaction volume.

The compound (b-1) is used in an amount such that the molar ratio [(b-1)/M] of the compound (b-1) to all transition metal atoms (M) in the metallocene compound (a) is usually 0.01 to 50000, and preferably 0.05 to 10000. The compound (b-2) is used in an amount such that the molar ratio [(b-2)/M] of aluminum atoms in the compound (b-2) to all transition metals (M) in the metallocene compound (a) is usually 10 to 50000, and preferably 20 to 10000. The compound (b-3) is used in an amount such that the molar ratio [(b-3)/M] of the compound (b-3) to all transition metals (M) in the metallocene compound (a) is usually 1 to 20, preferably 1 to 15.

In the present invention, the ethylene/α-olefin/non-conjugated polyene copolymer can be produced by either of a liquid phase polymerization method such as solution (dissolution) polymerization and suspension polymerization, or a gas phase polymerization method, and the method preferably has a step of obtaining a polymerization reaction liquid described below, but is not particularly limited thereto.

The step of obtaining a polymerization reaction liquid is a step of obtaining a polymerization reaction liquid of the ethylene/α-olefin/non-conjugated polyene copolymer by copolymerizing monomers consisting of ethylene (A), an α-olefin (B) having 3 to 20 carbon atoms, a non-conjugated polyene (C) and if necessary, a non-conjugated polyene (D) using an aliphatic hydrocarbon as a polymerization solvent in the presence of the metallocene-based catalyst according to the present invention, preferably in the presence of a metallocene-based catalyst containing a transition metal compound in which $R^{13}$ and $R^{14}$, each bonded to $Y^1$ in the general formula [A1], is a phenyl group or a phenyl group substituted by an alkyl group or a halogen group, and $R^7$ and $R^{10}$ have an alkyl substituent.

Examples of the polymerization solvent include aliphatic hydrocarbons and aromatic hydrocarbons. Specific examples thereof include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane, and they may be used singly or in combination of two or more kinds thereof. An olefin itself can also be used as a solvent. Among these, hexane is preferable from the viewpoint of separation and purification of the resulting ethylene/α-olefin/non-conjugated polyene copolymer.

The polymerization temperature is usually −50 to +200° C., preferably in the range of 0 to +150° C., more preferably in the range of +70 to +110° C., and a higher temperature (+70° C. or more) is desirable from the viewpoint of catalyst activity, copolymerization ability, and productivity, though it depends on the target molecular weight to be achieved by the metallocene-based catalyst system used and polymerization activity.

The polymerization pressure is usually under the condition of normal pressure to 10 MPa gauge pressure, preferably 1.1 to 5 MPa gauge pressure, more preferably 1.2 to 2.0 MPa gauge pressure, and the polymerization reaction can be carried out by any methods such as a batch type, a semi-continuous type, and a continuous type. Further, the polymerization can be carried out in two or more separated stages which differ in reaction conditions. In the present invention, among these, a method for carrying out copolymerization by feeding monomers continuously to a reactor is preferably adopted.

The reaction time (the average residence time when the copolymerization is performed by a continuous method) varies depending on the conditions such as catalyst concentration and polymerization temperature and is usually 0.5 minutes to 5 hours, preferably 5 minutes to 3 hours, more preferably 10 minutes to 2 hours.

The molecular weight of the ethylene/α-olefin/non-conjugated polyene copolymer to be obtained can be controlled by having hydrogen present in a polymerization system or by changing polymerization temperature. Further, it can be controlled by changing the amount of the compound (b) to be used. Specific examples thereof include triisobutylaluminum, methylaluminoxane, and diethyl zinc. When a hydrogen is added, its amount is appropriately about 0.001 to 100 NL per kg of olefin.

The molar ratio of the ethylene (A) to the above α-olefin (B) charged (ethylene (A)/α-olefin (B)) is preferably 40/60 to 99.9/0.1, more preferably 50/50 to 90/10, further preferably 55/45 to 85/15, most preferably 55/45 to 78/22.

The amount of the non-conjugated polyene (C) charged is usually 0.07 to 10 wt %, preferably 0.1 wt % to 8.0 wt %, more preferably 0.5 wt % to 5.0 wt % per 100 wt % in total of the ethylene (A), the α-olefin(B), and the non-conjugated polyene (C) (total amount of monomer charged).

In the present invention, after (1) the step of carrying out the copolymerization in the presence of the polymerization catalyst, (2) a step of adding a catalyst deactivator to deactivate the polymerization catalyst is preferably carried out.

As the catalyst deactivator, alcohols can be used, and alcohols are preferably methanol or ethanol, particularly preferably ethanol.

[Thermoplastic Resin Composition]

The thermoplastic resin composition of the present invention comprises the ethylene/α-olefin/non-conjugated polyene copolymer of the present invention described above.

The thermoplastic resin composition of the present invention may contain various additives that can be blended into the resin composition, a filler, and the ethylene/α-olefin/non-conjugated polyene copolymer of the present invention as appropriate.

The thermoplastic resin composition of the present invention can be crosslinked and suitably used for various applications, and preferably contains a crosslinking agent in the thermoplastic resin composition. As the crosslinking agent, known crosslinking agents can be used without particular limitation, and among these, organic peroxides are preferable.

When the thermoplastic resin composition of the present invention contains an organic peroxide, the content of the organic peroxide (mol) preferably satisfies the following expression (7).

Content of organic peroxide (mol)×Number of oxygen-oxygen bonds in a molecule of organic peroxide≤Weight fraction of(C)/Molecular weight of(C)×100   Expression (7)

wherein the weight fraction of (C) represents a weight fraction of the constitutional unit derived from the non-conjugated polyene (C) in the ethylene/α-olefin/non-conjugated polyene copolymer (wt %), and the molecular weight of (C) represents a molecular weight of the non-conjugated polyene (C).

The thermoplastic resin composition of the present invention is preferably the rubber composition described later.

[Rubber Composition]

The ethylene/α-olefin/non-conjugated polyene copolymer according to the present invention exhibits good rubber characteristics and suitably used as a raw material of the rubber composition.

The rubber composition according to the present invention comprises the ethylene/α-olefin/non-conjugated polyene copolymer (S) of the present invention described above. A preferred aspect of the rubber composition according to the present invention (hereinafter referred to as the "rubber composition (X)") further contains a rubber component (T) selected from the group consisting of diene-based rubbers, butyl rubber, and halogenated butyl rubber, and a content ratio of the ethylene/α-olefin/non-conjugated polyene copolymer (S) to the rubber component (T) (mass ratio; (S)/(T)) is in the range of 5/95 to 50/50.

<Rubber Component (T)>

As the rubber component (T), known diene-based rubbers, butyl rubber, and halogenated butyl rubber having double bonds in their main chains may be used without limitation, and they may be used singly or in combination of two or more kinds thereof. As the diene-based rubbers, polymer or copolymer rubbers containing a conjugated diene compound as the main monomer are preferably used. In the present invention, examples of the diene-based rubbers also include natural rubber (NR) and hydrogenated rubber. As the rubber component (T), usually uncrosslinked rubber can be adopted, which desirably has an iodine value of 100 or more, preferably 200 or more, more preferably 250 or more.

Examples of such a rubber component (T) include diene-based rubbers such as natural rubber (NR), isoprene rubber (IR), styrene butadiene rubber (SBR), butadiene rubber (BR), chloroprene rubber (CR), acrylonitrile butadiene rubber (NBR), nitrile rubber, and hydrogenated nitrile rubber; butyl rubber, and halogenated butyl rubber.

Although butyl rubber and halogenated butyl rubber are generally classified into non-diene-based rubbers, they have unsaturated carbon bonds in their main chains similar to diene-based rubbers, and when comparing with other non-diene-based rubbers such as ethylene propylene rubber, they have the same problem of poor weather resistance as the diene-based rubbers. In the present invention, even if butyl rubber or halogenated butyl rubber is used as the rubber component (T), weather resistance can be improved as in the case of diene-based rubbers.

In the present invention, the rubber component (T) is preferably diene-based rubbers, above all, more preferably natural rubber (NR), isoprene rubber (IR), styrene butadiene rubber (SBR), and butadiene rubber (BR), and particularly preferably styrene butadiene rubber (SBR). These rubber components (T) may be used singly or in combination of two or more kinds thereof.

As the natural rubber (NR), a natural rubber standardized by the Green Book (International Standards of Quality and Packing for Natural Rubber Grades) can be used. An isoprene rubber (IR) having a specific gravity of 0.91 to 0.94 and a Mooney viscosity [$ML_{1+4}$ (100° C.), JIS K6300] of 30 to 120 are preferably used.

A styrene butadiene rubber (SBR) having a specific gravity of 0.91 to 0.98 and a Mooney viscosity [$ML_{1+4}$ (100° C.), JIS K6300] of 20 to 120 are preferably used. A butadiene rubber (BR) having a specific gravity of 0.90 to 0.95 and a Mooney viscosity [$ML_{1+4}$ (100° C.), JIS K6300] of 20 to 120 are preferably used.

The rubber composition according to the present invention (X) contains the ethylene/α-olefin/non-conjugated polyene copolymer (S) described above and the rubber component (T) as the essential component in such an amount that a mass ratio [(S)/(T)] of the ethylene/α-olefin/non-conjugated polyene copolymer (S) and the rubber component (T) satisfies 5/95 to 50/50, preferably 15/85 to 45/55, more preferably 20/80 to 40/60.

The total content of the ethylene/α-olefin/non-conjugated polyene copolymer (S) and the rubber component (T) in the rubber composition according to the present invention (X) is 3 mass % or more, preferably 5 mass % or more, desirably 90 mass % or less, though the upper limit is not particularly limited. The rubber composition according to the present invention is also excellent in rubber elasticity, weather resistance, and ozone resistance, and in particular, excellent in mechanical characteristics, weather resistance, and fatigue resistance. The rubber composition is also excellent in abrasion resistance. Therefore, when the rubber composition according to the present invention is applied to tires, tires that achieve both excellent braking performance and excellent fuel consumption performance and excellent in rubber elasticity, weather resistance, and ozone resistance, in particular, excellent in mechanical characteristics and fatigue resistance can be obtained. In addition, tires also excellent in abrasion resistance can be obtained.

<Optional Components>

The rubber composition according to the present invention (including the rubber composition (X), the same applies hereinafter) may further contain optional components such as a softener, a filler, other resin components, a crosslinking agent, a foaming agent, an antioxidant (a stabilizer), a weather-resistant agent, a plasticizer, a coloring agent, various additives blended into conventionally known rubber compositions depending on the application thereof within a range that does not impair the object of the present invention, as appropriate.

Softener

As the softener, softeners conventionally blended into rubbers are widely used.

Specific examples thereof include petroleum-based softeners such as paraffinic process oil, naphthenic process oil, and aromatic process oil;

synthetic oil-based softeners;

co-oligomers of ethylene and α-olefin;

paraffin wax;

liquid paraffin;

white oils;

petrolatum;

coal tar softeners such as coal tar and coal tar pitch;

vegetable oil-based softeners such as castor oil, cotton oil, linseed oil, rapeseed oil, coconut oil, palm oil, soybean oil, peanut oil, Japan wax, rosin, pine oil, dipentene, pine tar, and tall oil;

factices such as black factice, white factice, and candy factice;

wax such as beeswax, carnauba wax, and lanolin;

fatty acids and fatty acid salts such as ricinoleic acid, palmitic acid, myristic acid, barium stearate, calcium stearate, magnesium stearate, zinc stearate, and zinc laurate;

ester-based plasticizers such as dioctyl phthalate, dioctyl adipate, and dioctyl sebacate;

coumarone-indene resins;

phenol-formaldehyde resins;

terpene-phenol resins;

polyterpene resins; and petroleum-based hydrocarbon resins such as synthetic polyterpene resin, aromatic hydrocarbon resin, aliphatic hydrocarbon resin, aliphatic cyclic hydrocarbon resin, aliphatic-alicyclic petroleum resin, aliphatic-aromatic petroleum resin, hydrogenated alicyclic hydrocarbon resin, hydrogenated hydrocarbon resin, liquid polybutene, liquid polybutadiene, and atactic polypropylene.

Among these, petroleum-based softeners, phenol-formaldehyde resins, and petroleum-based hydrocarbon resins are preferable, petroleum-based softeners and petroleum-based hydrocarbon resins are further preferable, and petroleum-based softeners are particularly preferable.

Among petroleum-based softeners, petroleum-based process oils are preferable, and above all, paraffinic process oils, naphthenic process oil, aromatic process oil, and the like are further preferable, and paraffinic process oil is particularly preferable. Among petroleum-based hydrocarbon resins, aliphatic cyclic hydrocarbon resins are preferable.

Among these softeners, paraffinic process oils are particularly preferable.

The softener may be used singly or in combination of two or more kinds thereof.

The content of the softener in the rubber composition of the present invention is 0.1 to 300 parts by weight, preferably 1 to 250 parts by weight, more preferably 5 to 200 parts by weight with respect to 100 parts by weight of the ethylene/α-olefin/non-conjugated polyene copolymer. Within the above range, moldability and processability such as extrudability, press formability, injection moldability, and the like, and roll processability of the rubber composition are excellent, which is preferable.

Filler

Fillers are not particularly limited, and inorganic fillers are preferable because they improve mechanical strengths such as tensile strength, tear strength, and wear resistance, of the rubber composition.

Examples of the inorganic filler include carbon blacks such as SRF, GPF, FEF, MAF, HAF, ISAF, SAF, FT, and MT; surface-treated carbon blacks obtained by subjecting these carbon blacks to surface treatment by using a silane coupling agent, and the like; silica, activated calcium carbonate, light calcium carbonate, heavy calcium carbonate, fine powder talc, talc, fine powder silicic acid, and clay.

The filler may be used singly or in combination of two or more kinds thereof.

The content of the filler in the rubber composition of the present invention is 1 to 300 parts by weight, preferably 5 to 250 parts by weight, more preferably 10 to 200 parts by weight with respect to 100 parts by weight of the ethylene/α-olefin/non-conjugated polyene copolymer according to the present invention. Within the above range, kneadability and processability of the rubber composition are excellent and mechanical nature and compression set of the rubber molded body are also excellent, which is preferable. In addition, a crosslinked molded article in which mechanical natures such as tensile strength, tear strength, and wear resistance are improved can be obtained, while hardness thereof can be enhanced without impairing other physical properties of the crosslinked molded article, and production costs of the crosslinked molded article can also be reduced.

Other Resin Components

The rubber composition of the present invention may contain resin components other than the aforementioned ethylene/α-olefin/non-conjugated polyene copolymer, if necessary. Such other resin components are not particularly limited, but polyolefin resins are preferable.

The rubber composition of the present invention containing a polyolefin resin can control product hardness while reducing the compound viscosity at a processing temperature, resulting in the improvement of processability. In addition, the above rubber composition is preferable because it can be treated as a thermoplastic elastomer, resulting in its easier handling properties and more choice of kneading methodology.

Usually, a polyolefin resin having a number average molecular weight of 10,000 or more, as measured by GPC in terms of standard polystyrene, is suitably used as the polyolefin resin.

Examples of the polyolefin resin include α-olefin homopolymers and α-olefin copolymers. Examples of the α-olefin homopolymers include polyethylene and polypropylene, and examples of the α-olefin copolymers include ethylene/α-olefin having 3 to 20 carbon atoms copolymers and ethylene/α-olefin having 3 to 20 carbon atoms/non-conjugated polyene copolymers (which are different from the ethylene/α-olefin/non-conjugated polyene copolymer according to the present invention). Examples of the ethylene/α-olefin having 3 to 20 carbon atoms copolymers include ethylene/propylene rubber (EPR), propylene/ethylene rubber (PER), ethylene/butene rubber (EBR), and ethylene/octene rubber (EOR).

Examples of the ethylene/α-olefin having 3 to 20 carbon atoms/non-conjugated polyene copolymers (which are different from the ethylene/α-olefin/non-conjugated polyene copolymer according to the present invention) include ethylene/propylene terpolymer (EPT) and ethylene/butene terpolymer (EBT).

Among these, polyethylene, ethylene/α-olefin copolymers, and polypropylene are preferable as the polyolefin resin.

The polyolefin resin may be used singly or in combination of two or more kinds thereof.

When the rubber composition of the present invention contains the polyolefin resin, the content of the polyolefin resin is 1 to 100 parts by weight, preferably 5 to 80 parts by weight, more preferably 10 to 50 parts by weight with respect to 100 parts by weight of the aforementioned ethylene/α-olefin/non-conjugated polyene copolymer. Within the above range, the hardness of the molded article formed from the rubber composition can be controlled, while reducing the compound viscosity at a processing temperature, resulting in the improvement of processability. In addition, the above rubber composition is preferable because it can be treated as a thermoplastic elastomer, resulting in its easier handling properties and more choice of kneading methodology.

Crosslinking Agent

The rubber composition according to the present invention is a crosslinkable composition and crosslinking the rubber composition allows the crosslinked molded article according to the present invention described later to be produced. Crosslinking may be carried out by heating and the like using a crosslinking agent, or through radiation crosslinking by irradiating radiation such as electron beam, X-ray, γ-ray, α-ray, and β-ray. Among radiation crosslinkings, electron beam crosslinking is preferable.

The crosslinked molded article according to the present invention is preferably produced by radiation crosslinking, in particular, by electron beam crosslinking, and in this case, the rubber composition may contain no crosslinking agent.

When the rubber composition is crosslinked by heating, the rubber composition preferably contains a crosslinking agent.

Examples of the crosslinking agent include a crosslinking agent which is generally used to crosslink rubbers such as sulfur compounds, organic peroxides, phenol resins, hydrosilicone compounds, amino resins, quinones or derivatives thereof, amine compounds, azo compounds, epoxy compounds, and isocyanate. Among these crosslinking agents, sulfur compounds, organic peroxides, and phenol resins are preferable. Since the ethylene/α-olefin/non-conjugated polyene copolymer according to the present invention can achieve particularly excellent crosslinking characteristics when crosslinked by using an organic peroxide, the rubber composition of the present invention particularly preferably contains an organic peroxide as a crosslinking agent.

When the crosslinking agent is an organic peroxide, specific examples thereof include dicumyl peroxide, di-tert-butylperoxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropylcarbonate, diacetyl peroxide, lauroyl peroxide, and tert-butyl cumyl peroxide.

Among these, from the viewpoint of reactivity, odor properties, and scorch stability, difunctional organic peroxides having two peroxide bonds (—O—O—) in a molecule such as 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, and n-butyl-4,4-bis(tert-butylperoxy)valerate are preferable, and above all, 2,5-di-(tert-butylperoxy)hexane and 2,5-dimethyl-2,5-di-(tert-butylperoxy)hexane are most preferable.

When the crosslinking agent is an organic peroxide, the amount of the organic peroxide blended is 0.1 to 20 parts by weight, preferably 0.2 to 15 parts by weight, further preferably 0.5 to 10 parts by weight with respect to 100 parts by weight of the ethylene/α-olefin/non-conjugated polyene copolymer. The amount of the organic peroxide blended within the above range is suitable because the resulting rubber molded body has no bloom on its surface, and the rubber molded body exhibits excellent crosslinking characteristics.

When an organic peroxide is used as a crosslinking agent, the rubber composition of the present invention preferably contains the following crosslinking aid.

When an organic peroxide is used as a crosslinking agent, examples of the crosslinking aid preferably contained in the rubber composition include sulfur; quinone dioxime based crosslinking aids such as p-quinonedioxime; acrylic crosslinking aids such as ethylene glycol dimethacrylate and trimethylolpropane trimethacrylate; allyl crosslinking aids such as diallyl phthalate and triallyl isocyanurate; other maleimide-based crosslinking aids; and divinylbenzene. The amount of the crosslinking aid blended is usually 0.5 to 10 mol, preferably 0.5 to 7 mol, more preferably 1 to 5 mol per 1 mol of the organic peroxide. In addition, it is desirable that the amount of the crosslinking aid blended be 0.5 to 2 mol, preferably 0.5 to 1.5 mol, further preferably almost equimolar amount per 1 mol of the organic peroxide.

In the rubber composition of the present invention, the amount of the organic peroxide blended is preferably an amount contained in the thermoplastic resin composition of the present invention as described above, that is, the content of the organic peroxide (mol) is an amount satisfying the following expression (7).

Content of organic peroxide(mol)×Number of oxygen-oxygen bonds in a molecule of organic peroxide≤Weight fraction of(C)/Molecular weight of(C)×100    Expression (7)

wherein the weight fraction of (C) represents the weight fraction of the constitutional unit derived from the non-conjugated polyene (C) (wt %) in the ethylene/α-olefin/non-conjugated polyene copolymer, and the molecular weight of (C) represents the molecular weight of the non-conjugated polyene (C).

The crosslinking agent may be used singly or in combination of two or more kinds thereof.

When the crosslinking agent is a sulfur compound, specific examples thereof include sulfur, sulfur chloride, sulfur dichloride, morpholine disulfide, alkylphenol disulfide, tetramethylthiuram disulfide, and selenium dithiocarbamate.

When the crosslinking agent is a sulfur compound, the amount of the sulfur compound blended is usually 0.3 to 10 parts by weight, preferably 0.5 to 7.0 parts by weight, further preferably 0.7 to 5.0 parts by weight with respect to 100 parts by weight of the ethylene/α-olefin/non-conjugated polyene copolymer. The amount of the sulfur compound blended within the above range is suitable because the resulting rubber molded body has no bloom on its surface, and the rubber composition exhibits excellent crosslinking characteristics.

When a sulfur compound is used as a crosslinking agent, the rubber composition of the present invention preferably contains the following crosslinking aid.

When a sulfur compound is used as a crosslinking agent, examples of the crosslinking aid preferably contained in the rubber composition include zinc oxide and zinc white. The amount of the crosslinking aid blended is usually 1 to 20 parts by weight with respect to 100 parts by weight of the ethylene/α-olefin/non-conjugated polyene copolymer.

When a sulfur compound is used as a crosslinking agent, it is desirable that sulfur and a vulcanizing accelerator be used in combination.

Specific examples of the vulcanizing accelerator include, thiazole-based vulcanizing accelerators such as N-cyclohexyl-2-benzothiazolesulfenamide (CBS) (for example, "NOCCELER NS" (trade name; produced by OUCHI SHINKO CHEMICAL INDUSTRIAL CO., LTD)), N-oxydiethylene-2-benzothiazolesulfenamide, N,N'-diisopropyl-2-benzothiazolesulfenamide, 2-mercaptobenzothiazole (for example, "Sanceler M" (trade name; produced by Sanshin Chemical Industry Co., LTD.)), 2-(4-morphorinodithio)benzothiazole (for example, "NOCCELER MDB-P" (trade name; produced by Sanshin Chemical Industry Co., LTD.)), 2-(2,4-dinitrophenyl)mercaptobenzothiazole, 2-(2,6-diethyl-4-morphorinothio)benzothiazole, and dibenzothiazyl disulfide; guanidine-based vulcanizing accelerators such as diphenylguanidine, triphenylguanidine, and di-ortho-tolylguanidine; aldehydeamine-based vulcanizing accelerators such as acetaldehyde/aniline condensate and butylaldehyde/aniline condensate; imidazoline-based vulcanizing accelerators such as 2-mercaptoimidazoline; thiourea-based vulcanization accelerators such as diethyl thiourea and dibutyl thiourea; thiuram-based vulcanizing accelerators such as tetramethylthiuram monosulfide and tetramethylthiuram disulfide (TMTD) (for example, "NOCCELER TT" (trade name; produced by OUCHI SHINKO CHEMICAL INDUSTRIAL CO., LTD)); dithioic acid salt-based vulcanizing accelerators such as zinc dimethyldithiocarbamate, zinc diethyldithiocarbamate, zinc dibutyldithiocarbamate (ZnBDC) (for example, "Sanceler Bz" (trade name; produced by Sanshin Chemical Industry Co., LTD.)) and tellurium diethyldithiocarbamate; thiourea-based vulcanizing accelerators such as ethylenethiourea, N,N'-diethylthiourea, and N,N'-dibutylthiourea; xanthate-based vulcanizing accelerators such as zinc dibutylxanthate; and other zinc white (for example, zinc oxides such as "META-Z102" (trade name; produced by Inoue Calcium Corporation)).

The amount of these vulcanizing accelerators blended is usually 0.1 to 20 parts by weight, preferably 0.2 to 15 parts by weight, further preferably 0.5 to 10 parts by weight with respect to 100 parts by weight of the ethylene/α-olefin/non-conjugated polyene copolymer. The amount of the vulcanizing accelerator blended within the above range is suitable because the resulting rubber molded body has no bloom on its surface and is excellent in crosslinking characteristics.

A vulcanizing aid can be selected depending on the application thereof as appropriate, and may be used singly or in a mixture of two or more kinds thereof. Specific examples of the vulcanizing aid include magnesium oxide and zinc white (zinc oxide such as "META-Z102" (trade name; produced by Inoue Calcium Corporation)). Usually, the amount thereof blended is usually 1 to 20 parts by weight with respect to 100 parts by weight of the ethylene/α-olefin/non-conjugated polyene copolymer.

Foaming Agent

The rubber composition of the present invention may contain a foaming agent. When the rubber composition of the present invention contains a foaming agent, it usually contains also the crosslinking agent. Use of a rubber composition containing a crosslinking agent and a foaming agent allows to crosslink and foam the rubber composition and to obtain a foamed material.

Examples of the foaming agent include inorganic foaming agents such as sodium bicarbonate and sodium carbonate; and organic foaming agents such as nitroso compounds such as N,N'-dinitrosopentamethylenetetramine and N,N'-dinitrosoterephthalamide; azo compounds such as azodicarbonamide (ADCA) and azobisisobutyronitrile; hydrazide compounds such as benzenesulfonyl hydrazide and p,p'-oxybis(benzenesulfonyl hydrazide) (OBSH); azide compounds such as calcium azide and 4,4'-diphenylsulfonylazide. As the foaming agent, ADCA and OBSH are preferable. The foaming agent may be used singly or in combination of two or more kinds thereof.

When the rubber composition of the present invention contains a foaming agent, the amount of the foaming agent blended is usually 0.2 to 30 parts by weight, preferably 0.5 to 25 parts by weight, more preferably 0.5 to 20 parts by weight with respect to 100 parts by weight of the ethylene/α-olefin/non-conjugated polyene copolymer.

Foaming Aid

When the rubber composition of the present invention contains a foaming agent, if necessary, a foaming aid may further be contained. The foaming aid exhibits the effects of reducing the decomposition temperature of a foaming agent, promoting decomposition, and uniforming the cells.

Examples of such a foaming aid include organic acids such as salicylic acid, phthalic acid, stearic acid, oxalic acid, and citric acid, and salts thereof, and urea or derivatives thereof.

When the rubber composition of the present invention contains a foaming aid, the amount of the foaming aid blended is usually 0.2 to 30 parts by weight, preferably 0.5 to 25 parts by weight, more preferably 0.5 to 20 parts by weight with respect to 100 parts by weight of the ethylene/α-olefin/non-conjugated polyene copolymer.

Antioxidant

The rubber composition according to the present invention preferably contain an antioxidant from the viewpoint of prolonging the service life of the material. Such an antioxidant include aromatic secondary amine-based stabilizers such as phenylnaphtylamine, 4,4'-(α,α-dimethylbenzyl)diphenylamine, and N,N'-di-2-naphthyl-p-phenylenediamine;

phenol-based stabilizers such as 2,6-di-t-butyl-4-methyl phenol and tetrakis-[methylene-3-(3',5'-di-t-butyl-4'-hydroxyphenyl)propionate]methane;

thioether-based stabilizers such as bis[2-methyl-4-(3-n-alkylthiopropionyloxy)-5-t-butylphenyl]sulfide; benzimidazole-based stabilizers such as 2-mercaptobenzimidazole;

dithiocarbamate-based stabilizers such as nickel dibutyldithiocarbamate;

quinoline-based stabilizers such as a polymerization product of 2,2,4-trimethyl-1,2-dihydroquinoline. They may be used singly or in combination of two or more kinds thereof.

Processing Aid

The rubber composition of the present invention may contain a processing aid. The processing aid generally blended into rubbers as a processing aid can be widely used. Specific examples thereof include ricinoleic acid, stearic acid, palmitic acid, lauric acid, barium stearate, zinc stearate, calcium stearate, or esters. Among these, stearic acid is preferable.

When the rubber composition of the present invention contains a processing aid, the amount of the processing aid blended is usually 0.1 to 10 parts by weight, preferably 0.5 to 8 parts by weight, more preferably 1 to 6 parts by weight with respect to 100 parts by weight of the ethylene/α-olefin/non-conjugated polyene copolymer. Within the above range, the resulting rubber composition has no bloom on its surface, and further, crosslinking is not inhibited during crosslinking of the rubber composition, which is preferable. Moreover, a rubber composition containing a processing aid is excellent in moldabilities such as extrudability, press formability, and injection moldability, and roll processability, which is preferable.

Surfactant

The rubber composition of the present invention may contain a surfactant. Examples of the surfactant include amines such as di-n-butylamine, dicyclohexylamine, monoethanolamine, triethanolamine, "Acting B" (manufactured by YOSHITOMI PHARMACEUTICAL INDUSTRIES, LTD.), "Acting SL" (manufactured by YOSHITOMI PHARMACEUTICAL INDUSTRIES, LTD.), polyethylene glycol, diethylene glycol, polyethylene glycol, lecithin, triallyltrimellitate, and zinc compounds of aliphatic or aromatic carboxylic acids (example; "Struktol activator 73", "Struktol IB 531", and "Struktol FA541" manufactured by Schill & Seilacher GmbH), "ZEONET ZP" (manufactured by ZEON CORPORATION), octadecyltrimethylammonium bromide, synthesized hydrotalcite, and special quaternary ammonium compounds (example; "Arquad 2HF" (LION AKZO Co., Ltd.).

When the rubber composition of the present invention contains a surfactant, the amount of the surfactant blended is usually 0.2 to 10 parts by weight, preferably 0.3 to 5 parts by weight, further preferably 0.5 to 4 parts by weight with respect to 100 parts by weight of the ethylene/α-olefin/non-conjugated polyene copolymer. The surfactant can be selected depending on the application thereof as appropriate and may be used singly or in a mixture of two or more kinds thereof.

Age Resistor

The rubber composition of the present invention may contain an age resistor. The rubber composition of the present invention containing an age resistor can prolong the life of a product obtained from the composition. As the age resistor, conventionally known age resistors such as amine-based age resistors, phenol-based age resistors, and sulfur-based age resistors can be used.

Specific examples of the age resistor include aromatic secondary amine-based age resistors such as phenylbuthylamine and N,N-di-2-naphthyl-p-phenylenediamine; phenol-based age resistors such as dibutylhydroxytoluene and tetrakis[methylene(3,5-di-t-butyl-4-hydroxy)hydrocinnamate]methane; thioether-based age resistors such as bis[2-methyl-4-(3-n-alkylthiopropionyloxy)-5-t-butylphenyl]sulfide; dithiocarbamate-based age resistors such as nickel dibutyldithiocarbamate; sulfur-based age resistors such as 2-mercaptobenzoylimidazole, the zinc salt of 2-mercaptobenzimidazole, dilauryl thiodipropionate, and distearyl thiodipropionate.

When the rubber composition of the present invention contains an age resistor, the amount of the age resistor blended is usually 0.01 to 10 parts by weight, preferably 0.02 to 7 parts by weight, further preferably 0.03 to 5 parts by weight with respect to 100 parts by weight of the ethylene/α-olefin/non-conjugated polyene copolymer. Within the above range, the molded article obtained from the rubber composition of the present invention is excellent in heat aging resistance, which is preferable.

Pseud Anti-Gelation Agent

The rubber composition of the present invention may contain a pseud anti-gelation agent. Examples of the pseud anti-gelation agent include "NHM-007" (manufactured by Mitsui Chemicals, Inc.).

When the rubber composition of the present invention contains a pseud anti-gelation agent, the amount of the pseud anti-gelation agent blended is usually 0.1 to 15 parts by weight, preferably 0.5 to 12 parts by weight, further preferably 1.0 to 10 parts by weight with respect to 100 parts by weight of the ethylene/α-olefin/non-conjugated polyene copolymer.

Other Additives

The rubber composition of the present invention may further contain other additives. Examples of the other additives include a heat stabilizer, a weathering stabilizer, an antistatic agent, a coloring agent, a lubricant, and a thickener.

The rubber composition according to the present invention (X) can contain various optional components without particular limitation as described above. However, since the ethylene/α-olefin/non-conjugated polyene copolymer (S) and the rubber component (T), each constituting the rubber composition (X), have good compatibility with each other, use of the rubber composition (X) containing them enables to produce a crosslinked molded article without causing phase separation, and moreover, the ethylene/α-olefin/non-conjugated polyene copolymer (S) imparts excellent weather resistance to the crosslinked molded article, when the content of a weather-resistant agent, an antioxidant, or the like in the rubber composition (X) is suppressed, a crosslinked molded article excellent in weather resistance can be easily obtained. As a result, the content of additives such as a weather-resistant agent and an antioxidant can be suitably suppressed, and it is economical and can prevent the quality of the crosslinked molded article from worsening due to bleeding out.

<Preparation Method of Rubber Composition>

The rubber composition of the present invention is the rubber composition containing the aforementioned ethylene/α-olefin/non-conjugated polyene copolymer and preferably contains components such as a softener, a filler, and a crosslinking agent. Examples thereof include a rubber composition containing 0.1 to 300 parts by weight of a softener and 1 to 300 parts by weight of a filler with respect to 100 parts by weight of the ethylene/α-olefin/non-conjugated polyene copolymer, and the preparation method thereof is not particularly limited.

Examples of the preparation method of the rubber composition include a method for mixing respective components contained in the rubber composition by using, for example, a conventionally known kneading machine such as a mixer, a kneader, and a roll, and further, a continuous kneading machine such as a biaxial extruder, and a method for preparing a solution in which respective components contained in the rubber composition are dissolved or dispersed, followed by removing the solvent.

The rubber composition according to the present invention (X) can be prepared by simultaneously or sequentially blending the ethylene/α-olefin/non-conjugated polyene copolymer (S), the rubber component (T), and if necessary, optional components.

The preparation method of the rubber composition (X) is not particularly limited, and general preparation methods of rubber blends can be adopted without particular limitation. For example, when the rubber composition of the present invention (X) contains optional components, at least some of the optional components may be mixed with the ethylene/α-olefin/non-conjugated polyene copolymer (S) or the rubber component (T) in advance, followed by blending the remaining optional components, or the ethylene/α-olefin/non-conjugated polyene copolymer (S) and the rubber component (T) may be blended before optional components are added thereto and blended.

For example, preparation can be conducted by kneading the ethylene/α-olefin/non-conjugated polyene copolymer (S), the rubber component (T), and other components to be blended if necessary, at a temperature of 80 to 170° C. for 3 to 10 minutes by using an internal mixer such as a Banbury Mixer, a kneader, an Intermix; adding a crosslinking agent if necessary; and further adding a crosslinking promoter, a crosslinking aid, a foaming agent, and the like if necessary; and then kneading by using a roll such as an open roll or a kneader at a roll temperature of 40 to 80° C. for 5 to 30 minutes, followed by sheeting. The ribbon-shaped or sheet-shaped rubber composition (X) can thus usually be obtained. When the kneading temperature with the above internal mixer is low, the crosslinking agent, the crosslinking promoter, the foaming agent, and the like can be simultaneously kneaded.

<Crosslinked Molded Article>

The crosslinked molded article of the present invention can be obtained by crosslinking the aforementioned rubber composition of the present invention. Upon crosslinking, molds may or may not be used. When molds are not used, the rubber composition is usually continuously formed and crosslinked.

Examples of the method for crosslinking the rubber composition include (a) a method of preforming a rubber composition containing a crosslinking agent usually by molding methods such as extrusion, press forming, and injection molding, or rolling into a desired shape, and then heating simultaneously with molding or introducing the molded product into a crosslinking bath to heat, and (b) a method of preforming a rubber composition containing a crosslinking agent in the same manner as the method (a), and then irradiating an electron beam thereto.

The method (a) provides a crosslinked article via a crosslinking reaction proceeding by heating with the aid of the crosslinking agent in the rubber composition. The method (b) provides a crosslinked article via a crosslinking reaction proceeding by an electron beam. In the method (b), the preformed rubber composition is usually irradiated with an electron beam having an energy of 0.1 to 10 MeV so that the absorbed dose of the rubber composition may be usually 0.5 to 36 Mrad, preferably 0.5 to 20 Mrad, further preferably 1 to 10 Mrad.

Crosslinking of the rubber composition (X) can be carried out by preforming the uncrosslinked rubber composition (X) into a desired shape usually by various molding methods using a molding machine such as an extrusion machine, a calender roll, a press, an injection molding machine, or a transfer molding machine, and then heating simultaneously with molding or introducing the molded product into a crosslinking bath to heat, or through radiation crosslinking by irradiating radiation such as electron beam, X-ray, γ-ray, α-ray, and β-ray. As a molding method or a preforming method, known molding methods of molding into a desired shape by using extrusion, injection molding, inflation molding, blow molding, extrusion blow molding, press forming, vacuum forming, calendering, and foam molding can be adopted as appropriate. When the crosslinked molded article is a foamed material, it can be produced by foam-molding the uncrosslinked rubber composition blended with a foaming agent, which is then crosslinked by irradiation of an electron beam or heating, or by proceeding crosslinking simultaneously with foam molding. Further, the step of crosslinking the rubber composition (X) may be carried out by combining crosslinking by heating and electron beam crosslinking.

When the above rubber composition (X) is crosslinked by heating, usually, the rubber composition (X) containing a crosslinking agent such as sulfur, sulfur compounds, and peroxides is preferably used and heated at a temperature of 150 to 270° C. for 1 to 30 minutes in a crosslinking bath using a heating means such as hot air, a fluidized bed of glass beads, UHF (ultra high frequency electromagnetic waves), steam, or LCM (molten salt bath). Crosslinking with sulfur and crosslinking with a peroxide have an advantage of not requiring a special apparatus in the crosslinking step, and thus they are conventionally widely used in the crosslinking step of the rubber composition.

When crosslinking is carried out by electron beam crosslinking in which crosslinking is carried out by electron beam irradiation, it is preferable that the rubber composition (X) usually containing no crosslinking agent should be used and the preformed rubber composition (X) should be irradiated with an electron beam to produce a crosslinked molded article. Crosslinking by electron beam irradiation can be carried out without using a crosslinking agent, and has an advantage that a small amount of volatile is generated in the crosslinking step.

Specifically, the production of a crosslinked molded article involving the crosslinking step by electron beam irradiation can be carried out as follows. First, the ethylene/α-olefin/non-conjugated polyene copolymer (S), the rubber component (T), and if necessary, various additives, a crosslinking aid, and the like are kneaded at a temperature of 80 to 170° C. for 3 to 10 minutes by using a mixer such as a Banbury Mixer, then kneaded at a roll temperature of 40 to 80° C. for 5 to 30 minutes by using a roll such as an open roll, and thereafter sheeted to prepare a ribbon-shaped or sheet-shaped rubber composition (X), or respective components are blended in a container to prepare the rubber composition (X). The rubber composition (X) thus prepared are molded in the form of a sheet, or into a desired shape by an extrusion machine, a calender roll, an injection molding machine or a press, or extruded from an extruder into a strand shape, followed by crushing into pellets by a cutter, or the like, and irradiating an electron beam. Alternatively, a powder of the ethylene/α-olefin/non-conjugated polyene copolymer (S), the rubber component (T), and the like impregnated with compounds such as a crosslinking aid may be directly irradiated with an electron beam to prepare the crosslinked product of the rubber composition (X). Irradiation of an electron beam is carried out by using an electron beam having an energy of usually 0.1 to 10 MeV (mega electron volt), preferably 0.3 to 5 MeV such that the absorbed dose may be usually 0.5 to 100 kGy (kiloGray), preferably 0.5 to 70 kGy.

γ-ray irradiation is more transparent to the rubber composition (X) as compared to electron beam irradiation, and particularly when it is irradiated on the rubber composition (X) in the form of a pellet, sufficient crosslinking into the inside of the pellet can be achieved with a small amount of direct irradiation. Irradiation of γ-ray can be carried out such that the amount of the γ-ray irradiation on the rubber composition (X) can be usually 0.1 to 50 kGy, preferably 0.3 to 50 kGy.

In the present invention, the step of crosslinking the rubber composition (X) is preferably carried out by the step containing the electron beam crosslinking, more preferably carried out by the electron beam crosslinking. The electron beam crosslinking by the electron beam irradiation is conventionally used in the case of crosslinking the surface of an uncrosslinked molded article. In the present invention, since the rubber composition (X) is excellent in crosslinking characteristics due to high crosslinking characteristics of the ethylene/α-olefin/non-conjugated polyene copolymer (S) which constitutes the rubber composition (X), homogeneous crosslinking without causing phase separation is achieved and a crosslinked molded article can be suitably produced even when crosslinking of the rubber composition (X) is carried out into the inside thereof by electron beam crosslinking.

The degree of crosslinking of the crosslinked molded article can be represented by gel fraction. Usually, the gel fraction of the crosslinked article is 1 to 80%. However, for the crosslinked molded article in the present invention, the degree of crosslinking is not limited within this range and a crosslinked article having a low degree of crosslinking represented by a gel fraction of less than 10%, particularly less than 0.5%, provide an effect of exhibiting excellent surface appearance as in the case of the crosslinked molded article of the present invention having a high degree of crosslinking.

The crosslinked molded article according to the present invention can be utilized for various products having rubber properties without limitation. The crosslinked molded article according to the present invention is only required to constitute at least a part of the product, and the crosslinked molded article according to the present invention preferably constitute the entirety of the product, and moreover, the crosslinked molded article of the present invention is also preferably a laminate or a composite which constitute at least a part of the product. Examples of the laminate include a multilayer laminate having two or more layers, at least one layer of which is the crosslinked molded article according to the present invention, and examples thereof include forms such as a multilayer film and sheet, multilayer container, multilayer tube, and multilayer coated film laminate contained in a water-based paint as a constituent.

Since the crosslinked molded article according to the present invention is particularly excellent in weather resistance, it can be suitably used in applications used outdoors for a long period of time such as tires and materials for covering wires, and in particular, suitably used in applications for tire members which constitute at least a part of various tires.

Examples of the tire member include a tire inner liner, a tire innertube, a tire flap, a tire shoulder, a tire bead, a tire tread, and a tire side-wall. Among these, the crosslinked molded article according to the present invention can be suitably used, in particular, in applications for a tire tread and a tire side-wall.

The crosslinked molded article of the present invention not only retains excellent mechanical strength originally possessed by diene-based rubbers, but also is homogeneous due to excellent co-crosslinkability exhibited by the rubber composition (X), and is excellent in weather resistance, and exhibits excellent dynamic mechanical strength. The tire member using the crosslinked molded article of the present invention, such as a tire tread and a tire side-wall is not only excellent in weather resistance, but also excellent in dynamic fatigue resistance.

<Foamed Material>

The foamed material of the present invention can be obtained by crosslinking and foaming the rubber composition of the present invention containing the aforementioned foaming agent.

Since the rubber composition contains a foaming agent, heating the rubber composition causes a crosslinking reaction by a crosslinking agent and decomposition of the foaming agent, which generates carbon dioxide and nitrogen gas. For this reason, a foamed material having a bubble structure can be obtained.

<Application>

The rubber composition of the present invention is significantly excellent in low-temperature characteristics, mechanical characteristics, moldability such as extrudability, press formability, and injection moldability, and roll processability, and a molded article excellent in low-temperature characteristics (such as the flexibility at a low temperature and rubber elasticity), mechanical characteristics, and the like, can be suitably obtained from the rubber composition of the present invention.

Since the rubber composition of the present invention can produce a crosslinked article excellent in processability, moldability, and crosslinking characteristics, and also excellent in heat resistance stability by using the aforementioned ethylene/α-olefin/non-conjugated polyene copolymer, the crosslinked article obtained from the rubber composition of the present invention can be suitably used for applications where long use at high temperatures envisaged.

The rubber composition of the present invention and the molded article obtained from the composition such as a crosslinked article and the foamed material can be used for various applications. Specifically, they are suitably used for rubbers for tires, O-rings, rolls for industrial use, packings (for example, condenser packing), gasket, belts (for example, thermal insulation belt, belt for copying machines, and conveyance belt), hoses such as hose for automobiles (for example, turbocharger hose, water hose, brake reservoir hose, radiator hose, and air hose), anti-vibration rubbers, anti-vibration materials, or vibration-damping materials (for example, engine mount and motor mount), muffler hanger, sponges (for example, weather strip sponge, thermal insulation sponge, protection sponge, and fine foam sponge), cables (ignition cable, cabtyre cable, and high tension cable), materials for covering wires (material for covering high voltage wires, material for covering low voltage wires, material for covering wires in ships), glass run channel, colored skin materials, paper feed rolls, roofing sheets, and the like. Among these, they are suitably used in automobile interior and exterior parts and applications requiring heat resistance, and suitable for hose applications such as brake reservoir hose used as automobile interior parts and radiator hose.

In the present invention, the ethylene/α-olefin/non-conjugated polyene copolymer having appropriate characteristics based on the application thereof can be selected and used within a range satisfying the requirement described above. For example, an ethylene/α-olefin/non-conjugated polyene copolymer having a relatively high molecular weight can be suitably used for muffler hanger applications, and specifically, an ethylene/α-olefin/non-conjugated polyene copolymer having a weight average molecular weight (Mw) of 200,000 to 600,000 can be preferably used.

[Resin Composition]

The resin composition of the present invention contains the ethylene/α-olefin/non-conjugated polyene copolymer (S) described above, powdered silica and/or powdered silicate salt (E), and an organic peroxide (G) and/or SiH group-containing compound containing at least two SiH groups in a molecule (H) as a crosslinking agent, and if necessary, contains a metal salt of an α,β-unsaturated carboxylic acid (F).

<(E) Powdered Silica and/or Powdered Silicate Salt>

The powdered silica and/or powdered silicate salt (E) has a specific surface area of 5 to 500 m$^2$/g (BET adsorption amount: ISO 5794/1, Annex D), preferably 10 to 400 m$^2$/g. Examples of the powdered silica and powdered silicate salt (E) include dry silica, wet silica, and synthetic silicate-type silica. Examples of the silicate salt include magnesium silicate. In the present invention, the powdered silica and/or powdered silicate salt (E) can be used singly or in combination thereof. In the present invention, the powder is not particularly limited, but means one having an average particle size of about 10 to 50 μmm.

Such powdered silica and/or powdered silicate salt (E) is used in an amount of usually 5 to 90 parts by weight, preferably 20 to 80 parts by weight in the total amount of the powdered silica and powdered silicate salt with respect to 100 parts by weight of the above ethylene/α-olefin/non-conjugated polyene copolymer (S) in the resin composition of the present invention. When the resin composition of the present invention is used for an anti-vibration rubber product, the resin composition is required to exhibit dynamic characteristics represented by a vibrational damping effect depending on the application of the anti-vibration rubber product, and thus, it can be used by controlling the blending ratio of the powdered silica and/or powdered silicate salt (E) depending on the application thereof <(F) Metal Salt of α,β-Unsaturated Carboxylic Acid>

Examples of the metal salt of the α,β-unsaturated carboxylic acid (F) include at least one compound preferably selected from metal acrylate, a metal methacrylate, and a metal maleate.

Examples of the metal acrylate, metal methacrylate, and metal maleate include alkaline metal salts of acrylic acid, methacrylic acid, and maleic acid (for example, lithium salts, sodium salts, and potassium salts), alkali earth metal salts (for example, magnesium salts, and calcium salts), heavy metal salts (for example, zinc salts), aluminum salts, and specifically, lithium acrylate, sodium acrylate, potassium acrylate, magnesium diacrylate, calcium diacrylate, zinc diacrylate, aluminum triacrylate, lithium methacrylate, sodium methacrylate, potassium methacrylate, zinc methacrylate, magnesium dimethacrylate, calcium dimethacrylate, zinc dimethacrylate, aluminum trimethacrylate, lithium maleate, sodium maleate, potassium maleate, magnesium maleate, zinc maleate, and aluminum maleate. As the metal salt of α,β-unsaturated carboxylic acid, zinc methacrylate and zinc dimethacrylate are particularly preferable, and zinc methacrylate is most preferable. The metal salt of α,β-unsaturated carboxylic acid may be used singly or in combination of two or more kinds thereof.

Such a metal salt of the α,β-unsaturated carboxylic acid (F) is contained in the resin composition of the present invention if necessary, and used in an amount of usually 20 parts by weight or less, preferably 0.1 to 20 parts by weight, more preferably 0.2 to 10 parts by weight in the total amount of the metal salt of α,β-unsaturated carboxylic acid with respect to 100 parts by weight of the above ethylene/α-olefin/non-conjugated polyene copolymer (S). Use of the metal salt of α,β-unsaturated carboxylic acid improves the interaction between the ethylene/α-olefin/non-conjugated polyene copolymer (S) as a polymer and the powdered silica and/or powdered silicate salt (E), which allows to obtain a crosslinked rubber product excellent in dynamic characteristics and mechanical properties. In particular, when the resin composition of the present invention contains the organic peroxide (G) described later as a crosslinking agent, the metal salt of the α,β-unsaturated carboxylic acid (F) is preferably contained because the interaction between the powdered silica and/or powdered silicate salt (E) and the metal salt of the α,β-unsaturated carboxylic acid (F) is particularly excellent.

<(G) Organic Peroxide>

When the resin composition of the present invention contains an organic peroxide (G) as a crosslinking agent, conventionally known organic peroxides usually used in crosslinking rubbers can be used as the organic peroxide (G). Specific examples of the organic peroxide include an organic peroxide similar to those exemplified in the above rubber composition. These organic peroxides may be used singly or in combination of two or more kinds thereof.

The organic peroxide (G) is used in an amount of 0.1 to 15 parts by weight, preferably 0.5 to 12 parts by weight in the total amount of the organic peroxide with respect to 100 parts by weight of the above ethylene/α-olefin/non-conjugated polyene copolymer (S) in the resin composition of the present invention, from the viewpoint of obtaining target physical properties by sufficient crosslinking, preventing adverse effects due to excessive decomposed products, and costs.

When the resin composition of the present invention contains the organic peroxide (G) as a crosslinking agent, the resin composition may contain a crosslinking aid as an optional component. Specific examples of the crosslinking aid include sulfur; quinone dioxime-based compounds such as p-quinonedioxime; methacrylate based compounds such as polyethylene glycol dimethacrylate; allyl compounds such as diallyl phthalate and triallyl cyanurate; maleimide-based compounds; and divinylbenzene. Such a crosslinking aid is used in an amount of 0.5 to 2 mol, preferably in about equimolar amount per 1 mol of the organic peroxide to be used.

<(H) SiH Group-Containing Compound Containing at Least Two SiH Groups in Molecule>

When the resin composition of the present invention contains the SiH group-containing compound containing at least two SiH groups in a molecule (H) (hereinafter also simply referred to as the "SiH group-containing compound (H)") as a crosslinking agent, the SiH group-containing compound (H) reacts with the ethylene/α-olefin/non-conjugated polyene copolymer (S) and functions as a crosslinking agent. Although this SiH group-containing compound (H) does not have any particular limitation for its molecule structure and conventionally produced resinous substances in the form of, for example, linear, ring-shaped, or branching structure, or a three-dimensional network structure can be used, it is necessary to contain hydrogen atoms directly bonding to at least two, preferably 3 or more silicon atoms, that is, SiH groups, in a molecule.

As such a SiH group-containing compound (H), a compound usually represented by the general compositional formula

can be used.

In the above general compositional formula, $R^4$ represents a substituted or unsubstituted monovalent hydrocarbon group having 1 to 10 carbon atoms, particularly having 1 to 8 carbon atoms, with no aliphatic unsaturated bond, and examples of such a monovalent hydrocarbon group include a phenyl group and alkyl groups substituted with a halogen such as trifluoropropyl group, as well as the alkyl group exemplified in the above-described R. Among these, a methyl group, an ethyl group, a propyl group, a phenyl group, a trifluoropropyl group are preferable, and a methyl group and a phenyl group are particularly preferable.

In addition, b satisfies 0≤b<3, preferably 0.6<b<2.2, particularly preferably 1.5≤b<2, c satisfies 0<c≤3, preferably 0.002≤c<2, particularly preferably 0.01≤c≤1, and b+c satisfies 0<b+c≤3, preferably 1.5<b+c≤2.7.

This SiH group-containing compound (H) is an organohydrogenpolysiloxane having preferably 2 to 1000, particularly preferably 2 to 300, most preferably 4 to 200 silicon atoms in a molecule, and specific examples thereof include siloxane oligomers such as 1,1,3,3-tetramethyldisiloxane, 1,3,5,7-tetramethyltetracyclosiloxane, and 1,3,5,7,8-pentamethylpentacyclosiloxane; methylhydrogenpolysiloxane endblocked by the trimethylsiloxy group at both molecular chain terminals, dimethyl siloxane/methyl hydrogen siloxane copolymer endblocked by the trimethylsiloxy group at both molecular chain terminals, methyl hydrogen polysiloxane endblocked by the silanol group at both molecular chain terminals, dimethyl siloxane/methyl hydrogen siloxane copolymer endblocked by the silanol group at both molecular chain terminals, dimethyl polysiloxane endblocked by the dimethylhydrogensiloxy group at both molecular chain terminals, methyl hydrogen polysiloxane endblocked by the dimethylhydrogen siloxy group at both molecular chain terminals, dimethyl siloxane/methyl hydrogen siloxane copolymer endblocked by the dimethylhydrogen siloxy group at both molecular chain terminals, and a silicone resin which is composed of $R^4_2(H)SiO_{1/2}$ unit and $SiO_{4/2}$ unit, and which may optionally contain $R^4_3SiO_{1/2}$ unit, $R^4_2SiO_{2/2}$ unit, $R^4(H)SiO_{2/2}$ unit, $(H)SiO_{3/2}$ unit, or $R^4SiO_{3/2}$ unit.

Examples of the methylhydrogenpolysiloxane endblocked by the trimethylsiloxy group at both molecular chain terminals include compounds represented by the following formula and compounds in which a part or the whole of methyl groups in the following formula are substituted with an ethyl group, a propyl group, a phenyl group, a trifluoropropyl group, and the like.

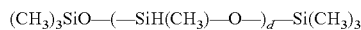

$(CH_3)_3SiO\text{—}(\text{—}SiH(CH_3)\text{—}O\text{—})_d\text{—}Si(CH_3)_3$

[wherein d is an integer of 2 or more]

Examples of the dimethyl siloxane/methyl hydrogen siloxane copolymer endblocked by the trimethylsiloxy group at both molecular chain terminals include compounds represented by the following formula and compounds in which a part or the whole of methyl groups in the following formula are substituted with an ethyl group, a propyl group, a phenyl group, a trifluoropropyl group, and the like.

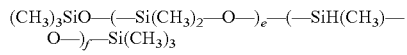

$(CH_3)_3SiO\text{—}(\text{—}Si(CH_3)_2\text{—}O\text{—})_e\text{—}(\text{—}SiH(CH_3)\text{—}O\text{—})_f\text{—}Si(CH_3)_3$

[wherein e is an integer of 1 or more, and f is an integer of 2 or more]

Examples of the methyl hydrogen polysiloxane endblocked by the silanol group at both molecular chain terminals include compounds represented by the following formula and compounds in which a part or the whole of methyl groups in the following formula are substituted with an ethyl group, a propyl group, a phenyl group, a trifluoropropyl group, and the like.

$HOSi(CH_3)_2O\text{—}(\text{—}SiH(CH_3)\text{—}O\text{—})_2\text{—}Si(CH_3)_2OH$ Examples of the dimethyl siloxane/methyl hydrogen siloxane copolymer endblocked by the silanol group at both molecular chain terminals include compounds represented by the following formula and compounds in which a part or the whole of methyl groups in the following formula are substituted with an ethyl group, a propyl group, a phenyl group, a trifluoropropyl group, and the like.

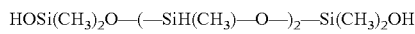

$HOSi(CH_3)_2O\text{—}(\text{—}Si(CH_3)_2\text{—}O\text{—})_e\text{—}(\text{—}SiH(CH_3)\text{—}O\text{—})_f\text{—}Si(CH_3)_2OH$

[wherein e is an integer of 1 or more, and f is an integer of 2 or more]

Examples of the dimethyl polysiloxane endblocked by the dimethylhydrogensiloxy group at both molecular chain terminals include compounds represented by the following formula and compounds in which a part or the whole of methyl groups in the following formula are substituted with an ethyl group, a propyl group, a phenyl group, a trifluoropropyl group, and the like.

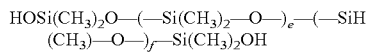

$HSi(CH_3)_2O\text{—}(\text{—}Si(CH_3)_2\text{—}O\text{—})_e\text{—}Si(CH_3)_2H$

[wherein e is an integer of 1 or more]

Examples of the methyl hydrogen polysiloxane endblocked by the dimethylhydrogen siloxy group at both molecular chain terminals include compounds represented by the following formula and compounds in which a part or the whole of methyl groups in the following formula are substituted with an ethyl group, a propyl group, a phenyl group, a trifluoropropyl group, and the like.

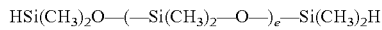

$HSi(CH_3)_2O\text{—}(\text{—}SiH(CH_3)\text{—}O\text{—})_e\text{—}Si(CH_3)_2H$

[wherein e is an integer of 1 or more]

Examples of the dimethyl siloxane/methyl hydrogen siloxane copolymer endblocked by the dimethylhydrogen siloxy group at both molecular chain terminals include compounds represented by the following formula and compounds in which a part or the whole of methyl groups in the following formula are substituted with an ethyl group, a propyl group, a phenyl group, a trifluoropropyl group, and the like.

$HSi(CH_3)_2O\text{—}(\text{—}Si(CH_3)_2\text{—}O\text{—})_e\text{—}(\text{—}SiH(CH_3)\text{—}O\text{—})_h\text{—}Si(CH_3)_2H$

[wherein each of e and h is an integer of 1 or more]

Such compounds can be produced by known methods and they can be easily obtained by equilibrating, for example, octamethylcyclotetrasiloxane and/or tetramethylcyclotetrasiloxane with a compound containing triorganosilyl group or diorganohydrogensiloxy group which can be a terminal group, such as hexyamethyl disiloxane or 1,3-dihydro-1,1,3,3-tetramethyldisiloxane, under the presence of a catalyst, such as sulphuric acid, trifluoromethanesulfonic acid, and methanesulphonic acid, at a temperature of about −10° C. to +40° C.

The SiH group-containing compound (H) may be used singly or in combination of two or more kinds thereof.

Such a SiH group-containing compound (H) is used in an amount of usually 0.1 to 15 parts by weight, preferably 0.5 to 10 parts by weight in the total amount of the SiH group-containing compound (H) with respect to 100 parts by weight of the above ethylene/α-olefin/non-conjugated polyene copolymer (S) in the resin composition of the present invention. When the SiH group-containing compound (H) is used in an amount within the above range, a resin composition capable of producing a crosslinked rubber molded body that has excellent compression set resistance, an adequate crosslinking density, and excellent strength characteristics and elongation properties can be obtained. Use of the SiH group-containing compound (H) in an amount higher than 15 parts by weight may be disadvantageous in terms of costs.

<Addition Reaction Catalyst>

When the resin composition of the present invention contains the SiH group-containing compound (H), the resin composition may contain an addition reaction catalyst having a function of promoting addition reaction (hydrosilylation reaction of the alkene) between the alkenyl group of the above ethylene/α-olefin/non-conjugated polyene copolymer (S) and the SiH group of the SiH group-containing compound (H) as an optional component.

The addition reaction catalyst is not particularly limited, as long as it promotes such an addition reaction, and examples thereof include addition reaction catalysts consisting of platinum group elements such as platinum-based catalysts, palladium-based catalysts, and rhodium-based catalysts (Group 8 metal catalysts such as Group 8 metals in the periodical table, metal complexes of Group 8, and metal compounds of Group 8), and above all, platinum-based catalysts are preferable.

The platinum-based catalysts may be known platinum-based catalysts usually used in curing of addition-curable type, and examples thereof include a powdered metal platinum catalyst described in U.S. Pat. No. 2,970,150, a chloroplatinic acid catalyst described in U.S. Pat. No. 2,823,218, complex compounds of platinum and hydrocarbon described in U.S. Pat. Nos. 3,159,601 and 159,662, complex compounds of chloroplatinic acid and olefin described in U.S. Pat. No. 3,516,946, and complex compounds of platinum and vinylsiloxane described in U.S. Pat. Nos. 3,775,452 and 3,814,780. More specific examples thereof include simple substance platinum (platinum black), a chloroplatinic acid, a platinum-olefin complex, a platinum-alcohol complex, or a catalyst having a carrier of platinum supported on a carrier such as an alumina and silica.

The above palladium-based catalysts are made of palladium, a palladium compound, a palladium chloride acid, and the like, and the above rhodium-based catalysts are made of rhodium, a rhodium compound, a rhodium chloride acid, and the like.

Examples of the addition reaction catalyst other than the above include a Lewis acid and cobalt carbonyl. The addition reaction catalyst is used in an amount of usually 0.1 to 100,000 wt ppm, preferably 0.1 to 10,000 wt ppm, further preferably 1 to 5,000 wt ppm, particularly preferably 5 to 1,000 wt ppm with respect to the ethylene/α-olefin/non-conjugated polyene copolymer (S).

When the addition reaction catalyst is used in an amount within the above range, a rubber composition capable of producing a crosslinked rubber molded body that has an adequate crosslinking density, and excellent strength characteristics and elongation properties can be obtained. Use of the addition reaction catalyst in an amount higher than 100,000 wt ppm may be disadvantageous in terms of costs, which is not preferable.

In the present invention, a crosslinked rubber molded body can be obtained by irradiating the uncrosslinked rubber molded body of a rubber composition containing no addition reaction catalyst described above with light, γ-ray, electron beam, or the like.

<Reaction Inhibitor>

The resin composition of the present invention may contain a reaction inhibitor in addition to the above addition reaction catalyst as an optional component. Examples of the reaction inhibitor include benztriazole, ethynyl group-containing alcohols (for example, ethynyl cyclohexanol), acrylonitrile, amide compounds (for example, N,N-diallylacetamide, N,N-diallylbenzamide, N,N,N',N'-tetraallyl-o-phthalic acid diamide, N,N,N',N'-tetraallyl-m-phthalic acid diamide, and N,N,N',N'-tetraallyl-p-phthalic acid diamide), sulfur, phosphorus, nitrogen, amine compounds, sulfur compounds, phosphorus compounds, tin, tin compounds, tetramethyltetravinylcyclotetrasiloxane, and organic peroxides such as hydroperoxide.

The reaction inhibitor is used in an amount of 0 to 50 parts by weight, usually 0.0001 to 50 parts by weight, preferably 0.0001 to 30 parts by weight, more preferably 0.0001 to 20 parts by weight, further preferably 0.0001 to 10 parts by weight, particularly preferably 0.0001 to 5 parts by weight with respect to 100 parts by weight of the ethylene/α-olefin/non-conjugated polyene copolymer (S). When the reaction inhibitor is used in an amount of 50 parts by weight or less, a rubber composition having a high crosslinking rate and excellent productivity for crosslinked rubber molded body can be obtained. Use of the reaction inhibitor in an amount higher than 50 parts by weight may be disadvantageous in terms of costs, which is not preferable.

The resin composition of the present invention is only required to contain either one of the above organic peroxide (G) and the SiH group-containing compound (H), as a crosslinking agent, but may contain both of them.

<(J) Compound Containing at Least One Unsaturated Hydrocarbon Group and at Least One Hydrolysable Silyl Group>

The resin composition of the present invention may contain a compound containing at least one unsaturated hydrocarbon group and at least one hydrolysable silyl group (J) as an optional component. Examples of such a compound (J) include a silane coupling agent having an unsaturated hydrocarbon group, and specific examples thereof include γ-methacryloyloxypropyltrimethoxysilane, vinyltrimethoxysilane, vinyl/tris(β-methoxyethoxy)silane, vinyltriethoxysilane, and γ-methacryloxypropylmethyldimethoxysilane.

Such a compound (J) also functions as a crosslinking agent and the content thereof in the resin composition is preferably less than $8\times10^{-6}$ mol, further preferably less than $8\times10^{-?}$ mol, per $m^2$ of total surface area of the fine powder silicic acid and/or silicate salt (E), from the viewpoint of achieving an adequate crosslinking density and securing a sufficient elongation.

<Other Silane Coupling Agent>

The resin composition of the present invention may contain a silane coupling agent other than the above component (J), that is, a silane coupling agent containing no unsaturated hydrocarbon group such as bis[3-(triethoxysilyl)propyl]tetrasulfide as an optional component. Since such a silane coupling agent does not function as a crosslinking agent, it can be blended in an amount of usually $1\times10^{-3}$ mol per $m^2$ of surface area of the fine powder silicic acid and/or silicate salt(E).

<Age Resistor>

The resin composition of the present invention may contain an age resistor.

When an age resistor is used in the present invention, at least one selected from sulfur-based age resistors, phenol-based age resistors, and amine-based age resistors can be used, and sulfur-based age resistors usually used in rubbers are used as the sulfur-based age resistors. Specific examples of the age resistor include one described in WO 2015/122495.

In the present invention, the sulfur-based age resistor, the phenol-based age resistor, and the amine-based age resistor may be used singly, but two or more are preferably used in combination, from the viewpoint of maintaining heat aging resistance at high temperature for a long period of time. In the present invention, the sulfur-based age resistor is used in an amount of usually 0.2 to 10 parts by weight, preferably 0.2 to 8 parts by weight, further preferably 0.2 to 6 parts by weight with respect to 100 parts by weight of the ethylene/α-olefin/non-conjugated polyene copolymer (S). Use of a sulfur-based age resistor in an amount as described above is preferable, because the effect of improving heat aging resistance is high, and moreover, crosslinking of the resin composition of the present invention is not inhibited.

The phenol-based age resistor is used in an amount of usually 0.2 to 5 parts by weight, preferably 0.5 to 4 parts by weight, further preferably 0.5 to 3 parts by weight with respect to 100 parts by weight of the ethylene/α-olefin/non-conjugated polyene copolymer (S). Use of a phenol-based age resistor in an amount as described above is preferable, because the effect of improving heat aging resistance is high, and moreover, crosslinking of the resin composition of the present invention is not inhibited.

The amine-based age resistor is used in an amount of usually 0.05 to 5 parts by weight, preferably 0.1 to 4 parts by weight, further preferably 0.2 to 3 parts by weight with respect to 100 parts by weight of the ethylene/α-olefin/non-conjugated polyene copolymer (S). Use of an amine-based age resistor in an amount as described above is preferable, because the effect of improving heat aging resistance is high, and moreover, crosslinking of the copolymer rubber described above is not inhibited.

<Processing Aid>

The resin composition of the present invention may contain a processing aid as an optional component within a range that does not impair the object of the present invention.

As the processing aid, compounds usually used in the processing of rubbers can be used. Specific examples thereof include higher fatty acids such as ricinoleic acid, stearic acid, palmitic acid, and lauric acid; salts of higher fatty acids such as barium stearate, zinc stearate, and calcium stearate; esters of higher fatty acids such as ricinoleic acid, stearic acid, palmitic acid, and lauric acid.

Although such processing aids are used in an amount of usually 10 parts by weight or less, preferably 5 parts by weight or less with respect to 100 parts by weight of the ethylene/α-olefin/non-conjugated polyene copolymer (S), the optimal amount thereof is desirably determined in accordance with the required values of physical properties as appropriate.

<Softener>

The resin composition of the present invention may contain a softener as an optional component within a range that does not impair the object of the present invention.

As the softener, known softeners usually used in rubbers can be used. Specific examples thereof include petroleum-based softeners such as process oil, lubricating oil, liquid paraffin, petroleum asphalt, and Vaseline; coal tar softeners such as coal tar and coal tar pitch; fatty oil-based softeners such as castor oil, linseed oil, rapeseed oil, soybean oil, and coconut oil; tall oil; rubber substitute (factice); wax such as beeswax, carnauba wax, and lanolin; fatty acids or fatty acid salts thereof such as ricinoleic acid, palmitic acid, stearic acid, barium stearate, calcium stearate, and zinc laurate; and synthetic polymer materials such as petroleum resins, atactic polypropylene, and coumarone indene resins. Among these, petroleum-based softeners, in particular, process oil is preferably used.

The softener may be used singly or in combination of two or more kinds thereof. The amount thereof can be used in an amount of 0 to 100 parts by weight, preferably 2 to 80 parts by weight with respect to 100 parts by weight of the ethylene/α-olefin/non-conjugated polyene copolymer (S).

<Foaming Agent>

In some applications, the resin composition of the present invention may contain a foaming agent as an optional component, within a range that does not impair the object of the present invention.

Specific examples of the foaming agent include inorganic foaming agents such as sodium bicarbonate, sodium carbonate, ammonium bicarbonate, ammonium carbonate, and ammonium nitrite; nitroso compounds such as N,N'-dimethyl-N,N'-dinitroterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonylhydrazide compounds such as benzenesulfonyl hydrazide, toluenesulfonyl hydrazide, p,p'-oxybis(benzenesulfonyl hydrazide), diphenylsulfone-3,3'-disulfonyl hydrazide; and azide compounds such as calcium azide, 4,4-diphenyldisulfonylazide, p-toluenesulfonylazide.

These foaming agents can be used in an amount of 0.5 to 30 parts by weight, preferably 1 to 20 parts by weight with respect to 100 parts by weight of the ethylene/α-olefin/non-conjugated polyene copolymer (S). Use of the foaming agent with the above amount enables to produce a foamed material having a specific gravity of about 0.03 to 0.8 g/cm$^3$, the optimal amount thereof is desirably determined in accordance with the required values of physical properties as appropriate.

If necessary, a foaming aid may be used in combination with a foaming agent. The foaming aid has functions of reducing the decomposition temperature of the foaming agent, promoting decomposition, and uniforming the cells. Examples of such a foaming aid include organic acids such as salicylic acid, phthalic acid, stearic acid, and oxalic acid; and urea or derivatives thereof.

Although these foaming aids are used in an amount of 0.01 to 10 parts by weight, preferably 0.1 to 5 parts by weight with respect to 100 parts by weight of the ethylene/α-olefin/non-conjugated polyene copolymer (S), the optimal amount thereof is desirably determined in accordance with the required values of physical properties as appropriate.

<Optional Components>

The resin composition of the present invention may contain various optional components such as various additives that can be added to the rubber composition or a filler, resin components other than those described above in addition to respective components described above within a range that does not impair the object of the present invention, if necessary.

<Production of Resin Composition and Crosslinked Molded Article>

The resin composition of the present invention can be prepared by sequentially or simultaneously blending the respective components described above by known methods.

Although the resin composition of the present invention may be used in an uncrosslinked state, it can exhibit its properties most markedly when used as a crosslinked product such as a crosslinked molded article or a crosslinked foamed molded article.

In order to produce a crosslinked molded article such as the resin composition of the present invention and an anti-vibration rubber product, it is only required to once prepare an uncrosslinked resin composition, followed by molding the rubber composition into an intended shape to carry out crosslinking, as in the case of crosslinking known rubber compositions. Preparation, molding, and crosslinking of the resin composition may be carried out each independently or continuously.

The uncrosslinked resin composition of the present invention is prepared by, for example, kneading the aforementioned ethylene/α-olefin/non-conjugated polyene copolymer (S), the powdered silica and/or powdered silicate salt (E), and in addition to that, an inorganic filler and a softener, at a temperature of 80 to 190° C., preferably 80 to 170° C. for 2 to 20 minutes, preferably 3 to 10 minutes by using an internal mixer (closed mixer) such as a Banbury Mixer, a kneader, or an Intermix; then adding and mixing the metal salt of the α,β-unsaturated carboxylic acid (F), and in addition, the organic peroxide (G) and/or the SiH group-containing compound containing at least two SiH groups in a molecule (H), both of which are crosslinking agents, and if necessary, various additives such as an addition reaction catalyst, a reaction inhibitor, a crosslinking promoter, a crosslinking aid, a foaming agent, an age resistor, a coloring agent, a dispersion agent, and a retardant by using a roll such as an open roll or a kneader; kneading at a roll temperature of 40 to 60° C. for 3 to 30 minutes; and thereafter extruding/sheeting the kneaded material to obtain a ribbon-shaped or sheet-shaped resin composition.

When the kneading temperature in an internal mixer is low, the ethylene/α-olefin/non-conjugated polyene copolymer (S), the powdered silica and/or powdered silicate salt (E), and if necessary, an inorganic filler and a softener can be simultaneously kneaded with crosslinking agents and various additives to prepare a resin composition.

The resin composition of the present invention prepared as described above is molded into an intended shape by various molding methods using an extrusion machine, a calender roll, a press, an injection molding machine, or a transfer molding machine, and can be crosslinked simultaneously with molding or by introducing the molded product into a crosslinking bath. Crosslinking can be carried out by heating at a temperature of 100 to 270° C. for 1 to 30 minutes, or irradiating radiation such as light, γ-ray, or electron beam. Crosslinking can also be carried out at ambient temperature.

Since the resin composition of the present invention contains the organic peroxide (G) and/or the SiH group-containing compound containing at least two SiH groups in a molecule (H) as a crosslinking agent, crosslinking can be carried out by heating, or by irradiating radiation such as light, γ-ray, electron beam, or the like, or by using a method of combining these two.

Such crosslinking may be carried out by using a mold or may be carried out without using a mold. In the case of using no mold, processes of crosslinking are usually carried out continuously. As a heating method in a crosslinking bath, a heating bath using hot air, a fluidized bed of glass beads, UHF (ultra high frequency electromagnetic waves), steam, or the like can be used.

The resin composition of the present invention has a high crosslinking rate and excellent productivity, and is capable of crosslinking in hot air such as HAV (hot air vulcanization tank), UHF (ultra high frequency electromagnetic waves), and moreover, the crosslinked molded article of the present invention obtained from the resin composition of the present invention is excellent in product appearance owing to no bleeding of the crosslinking agent onto the product surface, and excellent in compression set resistance and heat aging resistance, and is also environmentally friendly because it does not release nitrosamine compounds and the like that are suspected as a so-called carcinogen. The crosslinked molded article of the present invention is excellent in vibration isolation performance and can be suitably used as an anti-vibration rubber product, and specifically, it can be suitably used in applications such as anti-vibration rubber for automobiles, muffler hanger for automobiles, anti-vibration rubber for railroads, anti-vibration rubber for industrial machines, isolation rubber for construction, engine mount, packing, bush, pad, gasket, air suspension, ring mount, shock-absorbing stopper, fender, flexible joint, and dynamic damper.

According to the present invention, such a resin composition, crosslinked molded article, and anti-vibration rubber product can be produced at low costs.

EXAMPLES

Hereinafter, the present invention will be described in greater detail by way of Examples, but the present invention is in no way limited by these Examples. Evaluation methods for respective properties in Examples and Comparative Examples are as follows.

<Composition of Ethylene/α-Olefin/Non-Conjugated Polyene Copolymer>

The weight fraction (wt %) of respective constitutional units of the ethylene/α-olefin/non-conjugated polyene copolymer was determined from measured values obtained by using $^{13}$C-NMR. The measured value was obtained by measuring the $^{13}$C-NMR spectrum of the copolymer by using a nuclear magnetic resonance apparatus, Model ECX400P (manufactured by JEOL Ltd.) at a measurement temperature: 120° C. in a measuring solvent: orthodicholorbenzene/deuterated benzene=4/1 with a cumulative number: 8000.

<Iodine Value>

The iodine values for the ethylene/α-olefin/non-conjugated polyene copolymer rubber were determined by a titration method. Specifically, the measurement was conducted by the following method.

In 60 ml of carbon tetrachloride, 0.5 g of the ethylene/α-olefin/non-conjugated polyene copolymer rubber was dissolved, to which a small amount of Wijs reagent and a 20% potassium iodide solution were added, followed by titration with a 0.1 mol/L sodium thiosulfate solution. A starch indicator was added at around the endpoint, followed by well stirring and titration until the light purple color disappeared, and a g of iodine was calculated as an amount of halogen consumed relative to 100 g of the sample.

<Intrinsic Viscosity>

The intrinsic viscosity [η] was measured at a temperature: 135° C. in a measuring solvent: decalin by using an automatic viscometer manufactured by Rigosha & Co., Ltd.

<Weight Average Molecular Weight (Mw), Number Average Molecular Weight (Mn), Molecular Weight Distribution (Mw/Mn)>

The weight average molecular weight (Mw), the number average molecular weight (Mn), and the molecular weight distribution (Mw/Mn) are numerical values in terms of polystyrene measured by gel permeation chromatography (GPC). The measuring apparatus and the measurement conditions are as follows. The molecular weight was calculated based on the conversion method by creating a calibration curve using a commercial monodisperse polystyrene.

Apparatus: a gel permeation chromatograph Alliance GPC-2000 model (manufactured by Waters Corporation),
Analyzer: Empower 2 (manufactured by Waters Corporation),
Column: TSKgel GMH6-HT×2+TSKgel GMH6-HTL×2 (7.5 mm I.D.×30 cm, manufactured by Tosoh Corporation),
Column temperature: 140° C.,
Mobile phase: o-dichlorobenzene (containing 0.025% BHT),
Detector: differential refractometer (RI),
Flow rate: 1.0 mL/min,
Injection volume: 400 μL,
Sampling interval: 1 s,
Column calibration: monodisperse polystyrene (manufactured by Tosoh Corporation),
Molecular weight conversion: in terms of EPR in the old method/calibrating method taking viscosity into account.

<Low Molecular Weight Component>

When two or more peaks were shown in a chart obtained by GPC measurement described above, a proportion (%) of an area of the peak appearing on the side having the smallest molecular weight relative to the total peak area is defined as the content of the low molecular weight components having a molecular weight of 2000 or less. When only one peak was shown in the chart obtained by GPC measurement, the content of the low molecular weight components was defined as 0%.

<Complex Viscosity η*>

As a rheometer, a viscoelasticity measuring apparatus Ares (manufactured by Rheometric Scientific) was used and a complex viscosity $\eta^*_{(\omega=0.01)}$ at a frequency ω=0.01 rad/s, a complex viscosity $\eta^*_{(\omega=0.1)}$ at a frequency ω=0.1 rad/s, a complex viscosity $\eta^*_{(\omega=10)}$ at a frequency ω=10 rad/s, and a complex viscosity $\eta^*_{(\omega=100)}$ at a frequency ω=100 rad/s (all of which are represented in units of Pa·sec) were measured under the conditions of 190° C. and a strain of 1.0%. In addition, the P value ($\eta^*_{(\omega=0.1)}/\eta^*_{(\omega=100)}$) that is a ratio of the complex viscosity (η*ratio) between $\eta^*_{(\omega=0.1)}$ and $\eta^*_{(\omega=100)}$ was Calculated from the Results Obtained.

<Number of Long-chain Branches per 1000 Carbon Atoms ($LCB_{1000c}$)>

It was measured by the method described above.

<Hardness Test (Duro-A Hardness)>

According to JIS K 6253, sheet hardness (Type A durometer, HA) was measured by using test specimens having a thickness of about 12 mm, which were made of six sheet-shaped rubber molded articles of 2 mm having flat surfaces with a smooth surface placed on the top of a flat portion of each other. Test specimens having contamination by foreign substances, bubbles, and scratches were not used. The dimension of the measurement surface of the test specimens was defined such that the measurement could be performed while the tip of the probe was placed at a position at least 12 mm away from the end of the test specimen.

<Tensile Test>

According to JIS K 6251, tensile test was carried out under the conditions of a measurement temperature of 23° C., at a tensile rate of 500 mm/minute to measure tensile strength at break ($T_B$) [MPa] and elongation at break ($E_B$) [%] of sheets. That is, the sheet-shaped crosslinked molded article was punched to prepare a dumbbell No. 3 test specimen according to JIS K 6251 (2001). By using this test specimen, the tensile test was carried out according to the method defined in the above JIS K 6251 under the conditions of a measurement temperature of 25° C. and a tensile rate of 500 mm/minute to measure 100% modulus ($M_{100}$), 200% modulus ($M_{200}$), 300% modulus ($M_{300}$), tensile stress at break ($T_B$), and tensile elongation at break ($E_B$). Tensile product was defined by tensile strength at break ($T_B$)×elongation at break ($E_B$).

<Crosslinking Density>

Crosslinking density ν was calculated by the following Flory-Rehner equation (a) utilizing equilibrium swelling. $V_R$ in the equation (a) was determined by subjecting a crosslinked sheet of 2 mm to toluene extraction under the conditions of 37° C.×72 h.

[Math. 4]

$$\nu[number/cc] = \frac{V_R + \text{Ln}(1-V_R) + \mu V_R^2}{-V_0(V_R^{1/3} - V_R/2)} \times A \quad (a)$$

$V_R$: volume fraction of net rubber in swelled crosslinked rubber
$V_0$: molecular volume of solvent (toluene) (108.15 cc@37° C.)
μ: Constant of interaction between rubber and solvent (EPDM-toluene: 0.49)[4]
A: Avogadro number <Compression Set (CS)>

According to JIS K 6262, crosslinked articles having a diameter of 29 mm, a height (thickness) of 12.5 mm were used as the test specimens. They were compressed up to 25% height with respect to the height thereof (12.5 mm) before applying a load, then placed in a Geer oven at 150° C. together with their mold, and subjected to thermal treatment for 22 hours. Then, the test specimens were taken out to be allowed to cool for 30 minutes, followed by measuring the height of the test specimens to calculate the compression set (%) by using the expression below.

Compression set (%)={(t0−t1)/(t0−t2)}×100 t0: height of test specimen before test
t1: height of test specimen subjected to thermal treatment and then allowed to cool for 30 minutes
t2: height of test specimen set on measuring mold <Heat Aging Resistance>

Crosslinked articles in the form of a 2 mm sheet were aged in a Geer oven at 170° C. for 168 h. For the sheets after aging, hardness was measured according to JIS K 6253, by using test specimens having a thickness of about 12 mm, which were made of six sheet-shaped rubber molded articles of 2 mm having flat surfaces with a smooth surface placed on the top of a flat portion of each other. Test specimens having contamination by foreign substances, bubbles, and scratches were not used. The dimension of the measurement surface of the test specimens was defined such that the measurement could be performed while the tip of the probe was placed at a position at least 12 mm away from the end of the test specimen.

ΔH=Hardness after aging−Hardness before aging

For test specimens after thermal aging, tensile test was carried out according to JIS K 6251 under the conditions of a measurement temperature of 23° C. and a tensile rate of 500 mm/minute to measure tensile strength at break ((TB) and elongation at break (EB) of the sheets. Tensile product was defined by tensile strength at break (TB)×elongation at break (EB).

AR(%)/TB=TB after aging/TB before aging×100

AR(%)/EB=EB after aging/EB before aging×100

AR(%)/Tensile product=tensile product after aging/ tensile product before aging TB×100

<Roll Processability>

Winding properties on a roll when a mixture obtained by adding an organic peroxide to the rubber blend (A-1) described later is kneaded by using a 8-inch roll (a surface temperature of a front roll: 50° C., a surface temperature of a back roll: 50° C., a rotational rate of a front roll: 16 rpm, a rotational rate of a back roll: 18 rpm) were evaluated according to the following criteria.

1: Sheets are not connected
2: Sheets are connected but not wind (bagging)
3: Winding, slight cracking on sheets, poor edge
4: Winding, slight cracking on sheets, good edge
5: Winding, no cracking on sheets, good edge Example 1

Using the continuous polymerization apparatus shown in the Figure, an ethylene/propylene/VNB copolymer was produced as follows.

Example 1

Using the continuous polymerization apparatus shown in FIG. 1, an ethylene/propylene/VNB copolymer was produced as follows.

Into a polymerization reactor C with a volume of 300 liters, 58.3 L/hr of a dehydrated and a purified hexane solvent was continuously fed from a tube 6, and 4.5 mmol/hr of triisobutylaluminum (TiBA), 0.150 mmol/hr of ($C_6H_5$)

$_3$CB (C$_6$F$_5$)$_4$, and 0.030 mmol/hr of di(p-tolyl)methylene (cyclopentadienyl)(octamethyloctahydrodibenzofluorenyl) zirconium dichloride were continuously fed from a tube 7. Simultaneously, into the polymerization reactor C, 6.6 kg/hr of ethylene, 9.3 kg/hr of propylene, 18 liters/hr of hydrogen, and 340 g/hr of VNB were continuously fed from tubes 2, 3, 4, and 5, respectively, and copolymerization was carried out under the conditions of a polymerization temperature of 87° C., the total pressure of 1.6 MPaG, and a residence time of 1.0 hour.

The solution of the ethylene/propylene/VNB copolymer produced in the polymerization reactor C was continuously discharged through a tube 8 at a flow rate of 88.0 liters/hr so that the temperature was raised to 170° C. (the pressure was raised to 4.1 MPaG), and then the solution was fed into a phase separator D. At this time, ethanol as a catalyst deactivator was continuously introduced into the tube 8 in an amount of 0.1 mol times with respect to TiBA in the liquid component extracted from the polymerization reactor C.

In the phase separator D, the solution of the ethylene/propylene/VNB copolymer was separated into a thick phase (lower phase) containing a majority of the ethylene/propylene/VNB copolymer and a dilute phase (upper phase) containing a small amount of polymer.

The separated thick phase was introduced into a heat exchanger K through a tube 11 at a rate of 85.4 liters/hr, and further introduced into a hopper E, followed by evaporating off the solvent here to obtain the ethylene/propylene/VNB copolymer in an amount of 7.8 kg/hr.

The physical properties of the resulting ethylene/propylene/VNB copolymer were evaluated as described above. The results are shown in Table 2. The molecular weight distribution of the resulting ethylene/propylene/VNB copolymer exhibited bimodality.

The concentration of the ethylene/propylene/VNB copolymer was measured by sampling from a tube 9, a tube 10, and the tube 11. The concentration was 43.8 g/liter-solvent in the tube 9, 4.3 g/liter-solvent in the tube 10, and 103.7 g/liter-solvent in the tube 11. It was found from these results that the copolymer was concentrated to about 2.4 times polymer concentration in the phase separator D. On the other hand, the copolymer concentration of the dilute phase is 4.3 g/liter-solvent, and scaling due to deposition of the polymer and the like was not observed during cooling in a heat exchanger G, which allowed to operate for a long period of time.

<Production of Crosslinked Molded Article>

100 parts by weight of the resulting ethylene/propylene/VNB copolymer (A), 5 parts by weight of zinc oxide (ZnO #1/2 types of zinc oxide, manufactured by HAKUSUI TECH CO., LTD.) as a crosslinking aid, 1 part by weight of stearic acid (STEARIC ACID CAMELLIA, manufactured by NOF CORPORATION) as a processing aid, 80 parts by weight of carbon black (ASAHI #60, manufactured by ASAHI CARBON CO., LTD.), and 50 parts by weight of paraffinic oil (PS-430, manufactured by Idemitsu Kosan Co., Ltd.) as a softener were kneaded by using a BB-2 type Banbury Mixer (manufactured by Kobe Steel, Ltd.) to obtain a rubber blend. In the kneading, the copolymer (A) was masticated for 0.5 minutes, then the zinc oxide, the stearic acid, the carbon black, and the paraffinic oil were charged thereinto and kneaded for 2 minutes. Thereafter, a ram was raised to be cleaned, followed by kneading for one minute to obtain a rubber blend (A-1).

To the rubber blend (A-1), 6.8 parts by weight of a 40% dilution of dicumyl peroxide (Park Mill D-40, manufactured by NOF CORPORATION) as an organic peroxide were added, and the resulting mixture was wound and kneaded on a 8-inch roll (manufactured by Nippon Roll MFG. Co., Ltd.) operating with a front roll at a surface temperature of 50° C. and a rotational rate of 16 rpm and a back roll at a surface temperature of 50° C. and a rotational rate of 18 rpm. At this time, roll processability was evaluated based on the above criteria.

In the kneading, the mixture was given three cuts right and left and rounded six times to obtain a rubber composition in the form of a sheet of 2.2 to 2.5 mm in thickness.

The resulting rubber composition sheet was crosslinked by using a 100 t press forming machine (KMF100-1E, manufactured by Koutaka Kougyo Shyo) under the conditions of a mold temperature of 170° C. for 10 minutes to obtain a crosslinked article (A-2) sheet of 2 mm in thickness, 15 cm in length, and 15 cm in width. The crosslinked article (A-2) sheet was used to measure the tensile strength at break (TB), the elongation at break (EB), and the hardness (HA).

The resulting crosslinked article (A-2) sheet was crosslinked by using a 100 t press forming machine (KMF100-1E, manufactured by Koutaka Kougyo Shyo) under the conditions of a mold temperature of 170° C. for 20 minutes to obtain a crosslinked article (A-3) of 12.5 mm in thickness and 29 cm in diameter. The crosslinked article (A-3) was used to measure the compression set.

The evaluation results of the rubber composition and the crosslinked article are shown in Table 2.

Examples 2 to 4

The ethylene/propylene/VNB copolymer was produced in the same manner as in Example 1 except that the production conditions of the ethylene/propylene/VNB copolymer were changed to the conditions shown in Table 1. The production results are shown in Table 1. Physical properties of the resulting ethylene/propylene/VNB copolymer were evaluated in the same manner as in Example 1. The results are shown in Table 2. The molecular weight distribution of the resulting ethylene/propylene/VNB copolymer exhibited bimodality.

Comparative Example 1

The polymerization reaction of ethylene, propylene, and 5-vinyl-2-norbornene (VNB) was continuously carried out by using a polymerizer with a volume of 300 liters equipped with a stirring blade at 87° C., as follows.

While continuously feeding 32.6 L/hr of hexane into the polymerizer as a polymerization solvent, 3.6 kg/hr of ethylene, 6.1 kg/hr of propylene, 290 g/hr of VNB, and 6.3 NL/hr of hydrogen were continuously fed thereinto. While maintaining the polymerization pressure at 1.6 MPaG and the polymerization temperature at 87° C., 0.0015 mmol/hr of di(p-tolyl)methylene(cyclopentadienyl)(octamethyloctahydrodibenzofluorenyl)zirconium dichloride was continuously fed into the polymerizer as the main catalyst. In addition, 0.0075 mmol/hr of (C$_6$H5)$_3$CB(C$_6$F$_5$)$_4$ as a cocatalyst and 20 mmol/hr of triisobutylaluminum (TiBA) as an organoaluminum compound were continuously fed into the polymerizer.

Thus, a solution containing 15.2 mass % of the ethylene/propylene/VNB copolymer made of ethylene, propylene, and VNB. A small amount of methanol was added into the polymerization reaction liquid extracted from the lower part of the polymerizer to stop the polymerization reaction and the ethylene/propylene/VNB copolymer was separated from the solvent by a steam stripping treatment, followed by drying under reduced pressure at 80° C. for a whole day and night.

Through the above operations, the ethylene/propylene/VNB copolymer (A-1) made of ethylene, propylene, and VNB was obtained at a rate of 4.7 kg per hour. The physical properties of the resulting copolymer (A-1) were measured by the method described above. The results are shown in Table 2.

TABLE 1

|  |  | Example 1 | Example 2 | Example 3 | Example 4 |
|---|---|---|---|---|---|
| Hexane | [L/h] | 58.3 | 58.3 | 58.3 | 58.3 |
| TiBA | [mmol/h] | 4.5 | 4.5 | 4.5 | 4.5 |
| $(C_6H_5)_3CB(C_6F_5)_4$ | [mmol/h] | 0.15 | 0.15 | 0.15 | 0.15 |
| Metallocene compound | [mmol/h] | 0.03 | 0.03 | 0.03 | 0.03 |
| Ethylene | [kg/h] | 6.6 | 6.6 | 6.6 | 6.6 |
| Propylene | [kg/h] | 9.3 | 9.3 | 9.2 | 9.2 |
| Hydrogen | [L/h] | 18 | 18 | 18 | 18 |
| VNB | [g/h] | 340 | 340 | 540 | 540 |
| Residence time | [h] | 1.0 | 1.0 | 1.0 | 1.0 |
| Ethanol/TiBA (tube 8) | [mol times] | 0.1 | 0.5 | 0.2 | 1.0 |
| Thick phase | [L/h] | 85.4 | 85.4 | 85.4 | 85.4 |
| Load | [kg/h] | 7.8 | 7.8 | 7.8 | 7.8 |
| Ethanol/TiBA (polymerization reactor C) | [mol times] | 0.004 | 0.02 | 0.008 | 0.04 |
| Polymer concentration (tube 9) | [g/L] | 43.8 | 43.8 | 43.8 | 43.8 |
| Polymer concentration (tube 10) | [g/L] | 4.3 | 4.3 | 4.3 | 4.3 |
| Polymer concentration (tube 11) | [g/L] | 103.7 | 103.7 | 103.7 | 103.7 |
| Degree of concentration | [times] | 2.4 | 2.4 | 2.4 | 2.4 |

TABLE 2

|  |  | Example 1 | Example 2 | Example 3 | Example 4 | Comparative Example 1 |
|---|---|---|---|---|---|---|
| Ethylene/propylene | [Molar ratio] | 62/38 | 62/38 | 64/36 | 64/36 | 68/32 |
| Iodine value | [g/100 g] | 1.9 | 1.9 | 3.2 | 3.4 | 3.3 |
| VNB content | [wt %] | 0.9 | 0.9 | 1.5 | 1.6 | 1.6 |
| Mw |  | 232000 | 232000 | 304000 | 249000 | 178000 |
| Mn |  | 9590 | 13600 | 13300 | 22100 | 116000 |
| Mw/Mn |  | 24.2 | 17.1 | 22.9 | 11.3 | 1.53 |
| Low molecular weight component | [%] | 15 | 6 | 10 | 3 | 0 |
| Mw × VNB content/100/VNB molecular weight |  | 17.1 | 17.4 | 37.3 | 33.1 | 22.5 |
| $[\eta]$ | [dl/g] | 2.4 | 2.3 | 2.6 | 2.6 | 2.3 |
| P value ($\eta^*(\omega=0.1)/\eta^*(\omega=100)$) |  | 45.6 | 42.1 | 79.9 | 71.2 | 29.1 |
| $P/([\eta]^{2.9})$ |  | 3.8 | 3.9 | 5.3 | 4.6 | 1.7 |
| VNB content × 6 |  | 5.3 | 5.4 | 8.9 | 9.6 | 9.6 |
| $LCB_{1000\ C}$ |  | 0.03 | 0.03 | 0.03 | 0.03 | 0.14 |
| $1 - 0.07 \times Ln(Mw)$ |  | 0.14 | 0.14 | 0.12 | 0.13 | 0.15 |
| <Tensile test> |  |  |  |  |  |  |
| Hardness (Duro-A) |  | 56 | 57 | 58 | 58 | 60 |
| M100 | [MPa] | 1.38 | 1.41 | 2.00 | 1.98 | 1.75 |
| TB | [MPa] | 11.3 | 11.5 | 13.8 | 14.2 | 13.8 |
| EB | [%] | 440 | 438 | 424 | 431 | 415 |
| Tensile product |  | 4972 | 5037 | 5851 | 6120 | 5727 |
| <Crosslinking density> |  |  |  |  |  |  |
| ×10$^{19}$ [number/cc] |  | 5.4 | 5.5 | 6.2 | 6.3 | 2.6 |
| <Cs> |  |  |  |  |  |  |
| 150° C. × 22 h | [%] | 10 | 11 | 9 | 9 | 11 |
| <Heat aging resistance> |  |  |  |  |  |  |
| Hardness (Duro-A) |  | 54 | 55 | 56 | 56 | 61 |
| TB | [MPa] | 3.5 | 7.8 | 9.8 | 10.1 | 5.4 |
| EB | [%] | 220 | 288 | 295 | 302 | 305 |
| Tensile product |  | 770 | 2246 | 2891 | 3050 | 1647 |
| ΔH |  | −2 | −2 | −2 | −2 | +1 |
| AR(%)/TB |  | 31 | 68 | 71 | 71 | 39 |
| AR(%)/EB |  | 50 | 66 | 70 | 70 | 73 |
| AR(%)/Tensile product |  | 15 | 45 | 49 | 50 | 29 |
| <Roll processability> |  |  |  |  |  |  |
| Functional evaluation |  | 5 | 5 | 5 | 5 | 2 |

REFERENCE SIGNS LIST

C polymerization reactor
D phase separator
E hopper
F pump
G heat exchanger
H heat exchanger
I heat exchanger
J heat exchanger
K heat exchanger

The invention claimed is:

1. An ethylene/α-olefin/non-conjugated polyene copolymer (S) having constitutional units derived from ethylene (A), an α-olefin (B) having 3 to 20 carbon atoms, and a non-conjugated polyene (C) having a total of two or more partial structures selected from the group consisting of the following general formulas (I) and (II) in a molecule, and satisfying the following requirements (i) to (vii):

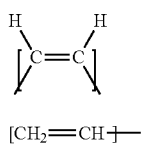

(I)

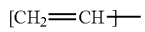

(II)

(i) a molar ratio of ethylene/α-olefin is 40/60 to 99.9/0.1;
(ii) a weight fraction of the constitutional unit derived from the non-conjugated polyene (C) is 0.07 wt % to 10 wt % per 100 wt % of the ethylene/α-olefin/non-conjugated polyene copolymer (S);
(iii) a weight average molecular weight (Mw) of the ethylene/α-olefin/non-conjugated polyene copolymer (S), a weight fraction of the constitutional unit derived from the non-conjugated polyene (C) (weight fraction of (C) wt %), and a molecular weight of the non-conjugated polyene (C) (molecular weight of (C)) satisfy the following expression (1);

4.5≤Mw×Weight fraction of (C)/100/Molecular weight of (C)≤40    Expression (1)

(iv) a ratio P(η*$_{(\omega=0.1)}$/η*$_{(\omega=100)}$) of a complex viscosity η$_{(\omega=0.1)}$ at a frequency ω=0.1 rad/s Pa·sec to a complex viscosity η$_{(\omega=100)}$ at a frequency ω=100 rad/s, both obtained from linear viscoelasticity measurement (190° C.) by using a rheometer, an intrinsic viscosity [η], and the weight fraction of the constitutional unit derived from the non-conjugated polyene (C) (weight fraction of (C)) satisfy the following expression (2);

P/([η]$^{2.9}$)≤Weight fraction of(C)×6    Expression (2)

(v) a ratio of a weight average molecular weight (Mw) to a number average molecular weight (Mn) molecular weight distribution; Mw/Mn measured by gel permeation chromatography (GPC) is in the range of 8 to 30;
(vi) the number average molecular weight (Mn) is 30,000 or less;
(vii) two or more peaks are shown in a chart obtained by GPC measurement and an area of the peak appearing on the side having the smallest molecular weight is in the range of 1 to 20% of the total peak area.

2. The ethylene/α-olefin/non-conjugated polyene copolymer (S) according to claim 1, wherein the intrinsic viscosity [η] is 0.1 to 5 dL/g and the weight average molecular weight (Mw) is 10,000 to 600,000.

3. The ethylene/α-olefin/non-conjugated polyene copolymer (S) according to claim 1, wherein the non-conjugated polyene (C) is 5-vinyl-2-norbornene (VNB).

4. The ethylene/α-olefin/non-conjugated polyene copolymer (S) according to claim 1, further comprising a constitutional unit derived from a non-conjugated polyene (D) having only one partial structure selected from the group consisting of the general formulas (I) and (II) in a molecule in a weight fraction of 0 to 20 wt % (provided that the sum of the weight fractions of (A), (B), (C), and (D) is 100 wt %, and satisfying the following requirement (viii):

(viii) the weight average molecular weight (Mw), the weight fraction of the constitutional unit derived from the non-conjugated polyene (C) (weight fraction of (C) (wt %)), the weight fraction of the constitutional unit derived from the non-conjugated polyene (D) (weight fraction of (D) (wt %)), the molecular weight of the non-conjugated polyene (C) (molecular weight of (C)), and a molecular weight of the non-conjugated polyene (D) (molecular weight of (D)) satisfy the following expression (4):

4.5≤Mw×{(Weight fraction of(C)/100/Molecular weight of(C))+(Weight fraction of(D)/100/Molecular weight of(D))}≤45    Expression (4), 5. The ethylene/α-olefin/non-conjugated polyene copolymer (S) according to claim 4, wherein the non-conjugated polyene (D) is 5-ethylidene-2-norbornene (ENB).

6. A method for producing the ethylene/α-olefin/non-conjugated polyene IS) copolymer according to claim 1, comprising:
(1) a step of carrying out the copolymerization in the presence of a polymerization catalyst containing at least one metallocene compound represented by the following general formula [A1] and (2) a step of adding an alcohol as a catalyst deactivator to deactivate the polymerization catalyst;

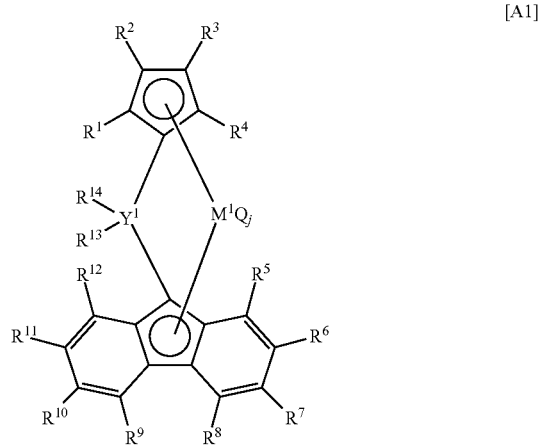

[A1]

wherein R$^1$, R$^2$, R$^3$, R$^4$, R$^5$, R$^8$, R$^9$ and R$^{12}$ each independently represent a hydrogen atom, a hydrocarbon group, a silicon-containing group, or a heteroatom-containing group other than the silicon-containing group, and any two adjacent groups of R$^1$ to R$^4$ may be bonded to each other to form a ring;
R$^6$ and R$^{11}$ are the same atom or the same group selected from a hydrogen atom, a hydrocarbon group, a silicon-containing group, and a heteroatom-containing group other than the silicon-containing group, and R$^7$ and R$^{10}$ are the same atom or the same group selected from a hydrogen atom, a hydrocarbon group, a silicon-containing group, and a heteroatom-containing group other than the silicon-containing group, and R$^6$ and R$^7$ ay be bonded to each other to form a ring, and R$^{10}$ and R$^{11}$ may be bonded to each other to form a ring, provided that all of R$^6$, R$^7$, R$^{10}$, and R$^{11}$ are not a hydrogen atom;
R$^{13}$ and R$^{14}$ ach independently represent an aryl group;
M$^1$ represents a zirconium atom;
Y$^1$ represents a carbon atom or a silicon atom;
Q represents a halogen atom, a hydrocarbon group, a halogenated hydrocarbon group, a neutral conjugated or non-conjugated diene having 4 to 20 carbon atoms, an anionic ligand, or a neutral ligand capable of coordinating with a lone pair, j represents an integer of 1 to 4, and when j is an integer of 2 or more, each Q may be the same or different from each other.

7. The method for producing the ethylene/α-olefin/non-conjugated polyene copolymer (S) according to claim 6, wherein the copolymerization in the step (1) is carried out in the presence of a polymerization catalyst constituted by:
(a) a metallocene compound represented by the general formula [A1],
(b) at least one compound selected from
   (b-1) an organometallic compound,
   (b-2) an organoaluminum oxy-compound, and
   (b-3) a compound which react with the metallocene compound (a) to form an ion pair,
and if necessary,
(c) a particulate carrier,
wherein the polymerization catalyst comprises at least the organometallic compound (b-1) as the compound (b).

8. The method for producing the ethylene/α-olefin/non-conjugated polyene copolymer (S) according to claim 6, wherein the ethylene (A), the α-olefin (B) having 3 to 20 carbon atoms, the non-conjugated polyene (C) having a total of two or more partial structures selected from the group consisting of the following general formulas (I) and (II) in a molecule, and if necessary, a non-conjugated polyene (D) having only one partial structure selected from the group consisting of the general formulas (I) and (II) in a molecule are continuously fed into a reactor to carry out the copolymerization;

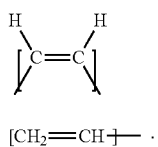

(I)

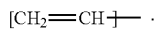

(II)

9. The method for producing the ethylene/α-olefin/non-conjugated polyene copolymer (S) according to claim 8, wherein the non-conjugated polyene (C) is 5-vinyl-2-norbornene (VNB) and the non-conjugated polyene (D) is 5-ethylidene-2-norbornene (ENB).

10. The method for producing the ethylene/α-olefin/non-conjugated polyene copolymer (S) according to claim 6, wherein the catalyst deactivator is methanol or ethanol and the organometallic compound (b-1) is trimethylaluminum or triisobutylaluminum.

11. A thermoplastic resin composition comprising the ethylene/α-olefin/non-conjugated polyene copolymer (S) according to claim 1.

12. The thermoplastic resin composition according to claim 11, wherein the thermoplastic resin composition further comprises an organic peroxide and a content of the organic peroxide mol satisfies the following expression (7):

Content of organic peroxide(mol)×Number of oxygen-oxygen bonds in a molecule of organic peroxide≤Weight fraction of(C)/Molecular weight of(C)×100  Expression (7)

wherein the weight fraction of (C) represents a weight fraction of the constitutional unit derived from the non-conjugated polyene (C) in the ethylene/α-olefin/non-conjugated polyene copolymer (S) wt %, and the molecular weight of (C) represents a molecular weight of the non-conjugated polyene (C).

13. A rubber composition comprising the ethylene/α-olefin/non-conjugated polyene copolymer (S) according to claim 1.

14. The rubber composition according to claim 13, wherein the rubber composition further comprises a rubber component (T) selected from the group consisting of a diene-based rubber, a butyl rubber, and a halogenated butyl rubber, and a content ratio of the ethylene/α-olefin/non-conjugated polyene copolymer (S) to the rubber component (T) mass ratio; (S)/(T) is in the range of 5/95 to 50/50.

15. The rubber composition according to claim 14, wherein the rubber component (T) comprises styrene butadiene rubber.

16. A crosslinked molded article comprising a crosslinked article of the rubber composition according to claim 13.

17. A hose for an automobile, comprising a crosslinked article of the rubber composition according to claim 13.

18. A turbocharger hose comprising a crosslinked article of the rubber composition according to claim 13.

19. A muffler hanger comprising a crosslinked article of the rubber composition according to claim 13.

20. An engine mount comprising a crosslinked article of the rubber composition according to claim 13.

21. A conveyance belt comprising a crosslinked article of the rubber composition according to claim 13.

22. A material for covering a wire, comprising a crosslinked article of the rubber composition according to claim 13.

23. A tire member comprising a crosslinked article of the rubber composition according to claim 13.

24. A tire tread comprising a crosslinked article of the rubber composition according to claim 13.

25. A tire side-wall comprising a crosslinked article of the rubber composition according to claim 13.

26. A tire, wherein one or more tire members selected from the group consisting of a tire inner liner, a tire innertube, a tire flap, a tire shoulder, a tire bead, a tire tread, and a tire side-wall comprise a crosslinked article of the rubber composition according to claim 13.

27. A method for producing a crosslinked molded article comprising a step of crosslinking a rubber composition (X) containing the ethylene/α-olefin/non-conjugated polyene copolymer (S) according to claim 1 and a rubber component (T) selected from the group consisting of a diene-based rubber, a butyl rubber, and a halogenated butyl rubber in a mass ratio of (S)/(T)=5/95 to 50/50.

28. The method for producing a crosslinked molded article according to claim 27, wherein the step of crosslinking is carried out by electron beam crosslinking.

29. A resin composition comprising
100 parts by weight of the ethylene/α-olefin/non-conjugated polyene copolymer (S) according to claim 1,
5 to 90 parts by weight of powdered silica and/or powdered silicate salt (E) having a specific surface area in the range of 5 to 500 m²/g, and
as a crosslinking agent,
0.1 to 15 parts by weight of an organic peroxide (G) and/or
0.1 to 100 parts by weight of a SiH group-containing compound containing at least two SiH groups in a molecule (H).

30. The resin composition according to claim 29 further comprising 0.1 to 20 parts by weight of a metal salt of an α,β-unsaturated carboxylic acid (F).

31. The resin composition according to claim 30, wherein the metal salt of the α,β-unsaturated carboxylic acid (F)

comprises at least one selected from the group consisting of a metal methacrylate and a metal maleate.

32. The resin composition according to claim 29 further comprising a compound containing at least one unsaturated hydrocarbon group and at least one hydrolysable silyl group (J) in an amount less than $8\times10'$ mol per $m^2$ of surface area of the component (E).

33. A crosslinked molded article comprising the crosslinked article of the resin composition according to claim 29.

34. An anti-vibration rubber product comprising the crosslinked article of the resin composition according to claim 29.

35. The anti-vibration rubber product according to claim 34, wherein the anti-vibration rubber product is an anti-vibration rubber for an automobile.

36. The anti-vibration rubber product according to claim 34, wherein the anti-vibration rubber product is a muffler hanger for an automobile.

37. The anti-vibration rubber product according to claim 34, wherein the anti-vibration rubber product is an anti-vibration rubber for a railroad.

38. The anti-vibration rubber product according to claim 34, wherein the anti-vibration rubber product is an anti-vibration rubber for an industrial machine.

39. The anti-vibration rubber product according to claim 34, wherein the anti-vibration rubber product is an isolation rubber for construction.

\* \* \* \* \*